United States Patent
Imai et al.

(10) Patent No.: US 8,916,999 B2
(45) Date of Patent: Dec. 23, 2014

(54) MOTORS CONTAINING SEGMENT CONDUCTOR COILS

(75) Inventors: Hiroshi Imai, Toyohashi (JP); Yusuke Tateishi, Kosai (JP); Keisuke Koide, Nagoya (JP); Tatsunori Banba, Hamamatsu (JP); Takumi Suzuki, Toyohashi (JP); Yoshikazu Fujii, Toyohashi (JP)

(73) Assignee: Asmo Co., Ltd., Shizuoka-ken (JP)

( * ) Notice: Subject to any disclaimer, the term of this patent is extended or adjusted under 35 U.S.C. 154(b) by 91 days.

(21) Appl. No.: 13/335,000

(22) Filed: Dec. 22, 2011

(65) Prior Publication Data

US 2012/0169163 A1    Jul. 5, 2012

(30) Foreign Application Priority Data

| Jan. 1, 2011 | (JP) | 2011-000176 |
| Jan. 4, 2011 | (JP) | 2011-000175 |
| Jan. 4, 2011 | (JP) | 2011-000177 |
| Jan. 4, 2011 | (JP) | 2011-000178 |
| Jan. 4, 2011 | (JP) | 2011-000179 |
| Apr. 20, 2011 | (JP) | 2011-094308 |
| Aug. 30, 2011 | (JP) | 2011-187910 |
| Sep. 26, 2011 | (JP) | 2011-209513 |

(51) Int. Cl.
*H02K 11/00* (2006.01)
*H02K 5/00* (2006.01)
(Continued)

(52) U.S. Cl.
CPC .............. *H02K 3/28* (2013.01); *H02K 1/2746* (2013.01); *H02K 3/50* (2013.01);
(Continued)

(58) Field of Classification Search
USPC ......... 310/201, 208, 156.47, 71, 156.54, 179, 310/68, 89, 400
See application file for complete search history.

(56) References Cited

U.S. PATENT DOCUMENTS 4,825,112 A * 4/1989 Mineyama ...................... 310/71
6,204,586 B1 * 3/2001 Umeda et al. ................. 310/179
(Continued)

FOREIGN PATENT DOCUMENTS

| JP | 9-327139 | 12/1997 |
| JP | H11-18328 | 1/1999 |

(Continued)

OTHER PUBLICATIONS

J.R. Hendershot Jr., Design of Brushless Permanent-Magnet Motors, Magna Physics Publishing and Clarendon Press Oxford 1994, pp. 10, 12 and 13.*

(Continued)

*Primary Examiner* — Tran Nguyen
*Assistant Examiner* — Thomas Truong
(74) *Attorney, Agent, or Firm* — Fish & Richardson P.C.

(57) ABSTRACT

A motor includes a motor case, and a rotor and a stator, which are disposed in the case. The case has a tubular portion, a front cover mounted to an axial end of the portion, and a rear cover mounted to the other axial end of the portion. The rotor has a rotary shaft and the stator includes a plurality of teeth, which extend toward a central axis of the shaft and are circumferentially disposed at equal intervals. Between each circumferentially adjacent pair of the teeth, a slot extending toward the axis is formed. In each slot, a U-shaped segment is inserted in parallel with the axis. The distal ends of the segments projecting out from the slots are electrically interconnected, thereby forming an SC coil including the segments disposed circumferentially. The SC coil includes a receiving terminal, and the terminal includes leads extending in parallel to the axis.

26 Claims, 39 Drawing Sheets

(51) Int. Cl.
*H02K 21/12* (2006.01)
*H02K 3/00* (2006.01)
*H02K 3/28* (2006.01)
*H02K 1/27* (2006.01)
*H02K 3/50* (2006.01)
*H02K 5/22* (2006.01)
*H02K 21/14* (2006.01)
*H02K 29/03* (2006.01)

(52) U.S. Cl.
CPC ............... *H02K 5/225* (2013.01); *H02K 21/14* (2013.01); *H02K 29/03* (2013.01); *H02K 11/0073* (2013.01); *H02K 2201/06* (2013.01); *H02K 2213/03* (2013.01)
USPC ...... 310/71; 310/89; 310/156.45; 310/156.54; 310/179; 310/208

(56) References Cited

U.S. PATENT DOCUMENTS

| | | | |
|---|---|---|---|
| 6,268,669 B1* | 7/2001 | Wakao et al. | 310/67 R |
| 6,522,043 B2* | 2/2003 | Masegi | 310/180 |
| 6,552,463 B2* | 4/2003 | Oohashi et al. | 310/207 |
| 6,633,100 B2* | 10/2003 | Sato et al. | 310/152 |
| 6,836,046 B2* | 12/2004 | Gorohata et al. | 310/180 |
| 6,888,281 B2* | 5/2005 | Koike et al. | 310/179 |
| 6,930,420 B2* | 8/2005 | Kawasaki et al. | 310/90 |
| 6,940,198 B2* | 9/2005 | Ionel et al. | 310/156.47 |
| 7,122,930 B2* | 10/2006 | Yamagishi et al. | 310/156.53 |
| 7,830,060 B2* | 11/2010 | Miyata et al. | 310/180 |
| 2002/0047445 A1 | 4/2002 | Ooiwa | |
| 2005/0206254 A1 | 9/2005 | Tsuge et al. | |
| 2007/0200448 A1 | 8/2007 | Oowatari et al. | |
| 2007/0252469 A1 | 11/2007 | Nishiura et al. | |
| 2010/0148612 A1 | 6/2010 | Takemoto et al. | |
| 2010/0301695 A1* | 12/2010 | Yamada et al. | 310/156.01 |
| 2012/0175987 A1 | 7/2012 | Takemoto et al. | |

FOREIGN PATENT DOCUMENTS

| | | | | |
|---|---|---|---|---|
| JP | 11-98788 | 4/1999 | | |
| JP | 3303773 | 6/1999 | | |
| JP | 2002-78261 | 3/2002 | | |
| JP | 2002218689 A * | 8/2002 | ............... | H02K 3/04 |
| JP | 3593102 | 7/2003 | | |
| JP | 2005-269875 | 9/2005 | | |
| JP | 2007-228756 | 9/2007 | | |
| JP | 2007-295752 | 11/2007 | | |
| JP | 2008-211945 | 9/2008 | | |
| JP | 2009-106051 | 5/2009 | | |
| JP | 2010-263763 | 11/2010 | | |

OTHER PUBLICATIONS

Machine Translation, JP 2002218689 A, Aug. 2, 2002.*
Machine Translation, JP 09327139 A, Dec. 16, 1997.*

* cited by examiner

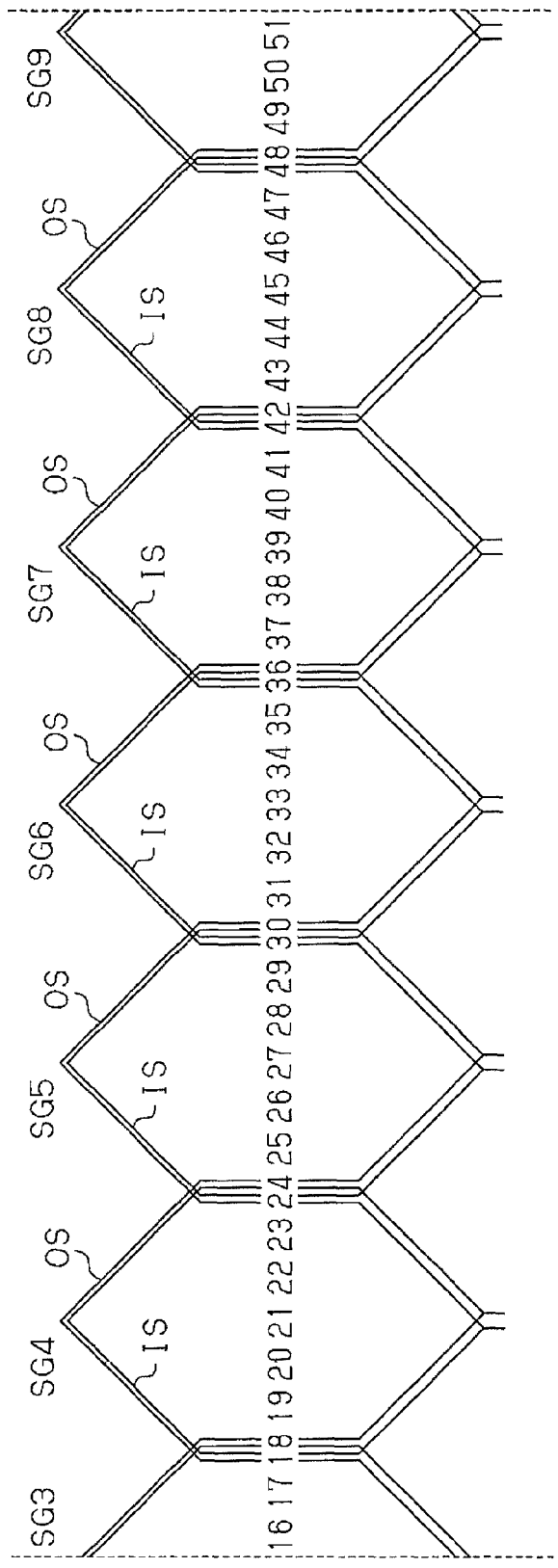

MOTORS CONTAINING SEGMENT CONDUCTOR COILS

BACKGROUND OF THE INVENTION

The present invention relates to a motor.

Recently, it has been desired to reduce cogging torque and the physical size of a motor. In particular, various types of motors mounted in an automobile, for example, an EPS motor used in a power steering device has been desired to have its cogging torque and physical size reduced further.

Accordingly, to reduce the cogging torque and the physical size of a motor, attention has been paid to using a segment conductor (SC) coil as the coil for a stator. For example, a variety of types of brushless motors in which the coil are provided to the stator have been proposed as referenced in Japanese Patent No. 3303773.

The SC coil refers to a coil formed by inserting a U-shaped split conductor referred to as a segment into each slot in a stator core in an axial direction and interconnecting the distal ends of each adjacent pair of the segments in a post-process by welding or the like. If the SC coil is used, the number of slots in the stator core can be increased to reduce the cogging torque and also improve the occupancy ratio of the coil in the slot, thereby reducing the size per unit power output of the motor per power.

In the SC coil stator, the U-shaped segments are interconnected at their respective distal ends by welding or the like, so that, to prevent each adjacent pair of the welding portions from short-circuiting each other, the welding portions are slightly separated radially from each other to increase the distance between those welding portions. It increases the diameter of the stator by the corresponding amount, leading to a disadvantage in terms of the physical size of the motor to some extent.

As the EPS motor used in a power steering device, a motor in which a control circuit unit is mounted on the outer circumferential surface of a tubular frame incorporating the stator has been proposed to reduce the size of the system as a whole as referenced in, for example, Japanese Patent No. 3593102.

Therefore, even if the SC coil is simply turned over to the stator of a motor, the radial size of the motor stays large because of the control circuit unit mounted onto the outer circumferential surface of the tubular frame, so that the motor cannot be miniaturized.

Further, to supply power to the coil from the control circuit unit, it is necessary to insert leads extending from the control circuit unit into the tubular frame and connect one end of each lead to a receiving terminal of the coil in the tubular frame. Moreover, the other end of each lead needs to be connected to an output terminal of a circuit board mounted in the control circuit unit. Therefore, the motor still remains large both axially and radially.

SUMMARY OF THE INVENTION

It is an objective of the present invention to provide a motor that is provided with SC coil in its stator and that can be reduced in size.

To achieve the foregoing objective and in accordance with one aspect of the present invention, a motor that includes a motor case, a rotor, and a stator is provided. The motor case has a tubular portion, a front cover mounted to an axial end of the tubular portion, and a rear cover mounted to the other axial end of the tubular portion. The rotor is disposed in the motor case and has a rotary shaft. The stator is disposed in the motor case. The stator having a plurality of teeth, which extend toward a central axis of the rotary shaft and are disposed in a circumferential direction at equal intervals, slots, each of which is formed between a circumferentially adjacent pair of the teeth and extends toward the central axis, and U-shaped segments inserted into the slots in parallel with the central axis in such a manner that distal ends of the segments projecting out of the slots are interconnected electrically, thereby forming an SC coil including the plurality of segments disposed in the circumferential direction. The SC coil has receiving terminals that have leads extending in parallel with the central axis.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIGS. 10 and 11 are partially developed views of a U1-phase coil in the three-phase coil of a first system in FIGS. 6 and 7, respectively;

DESCRIPTION OF THE PREFERRED EMBODIMENTS

The following will describe a brushless motor according to a first embodiment of the present invention with reference to FIGS. 1 to 19.

Figure 1:
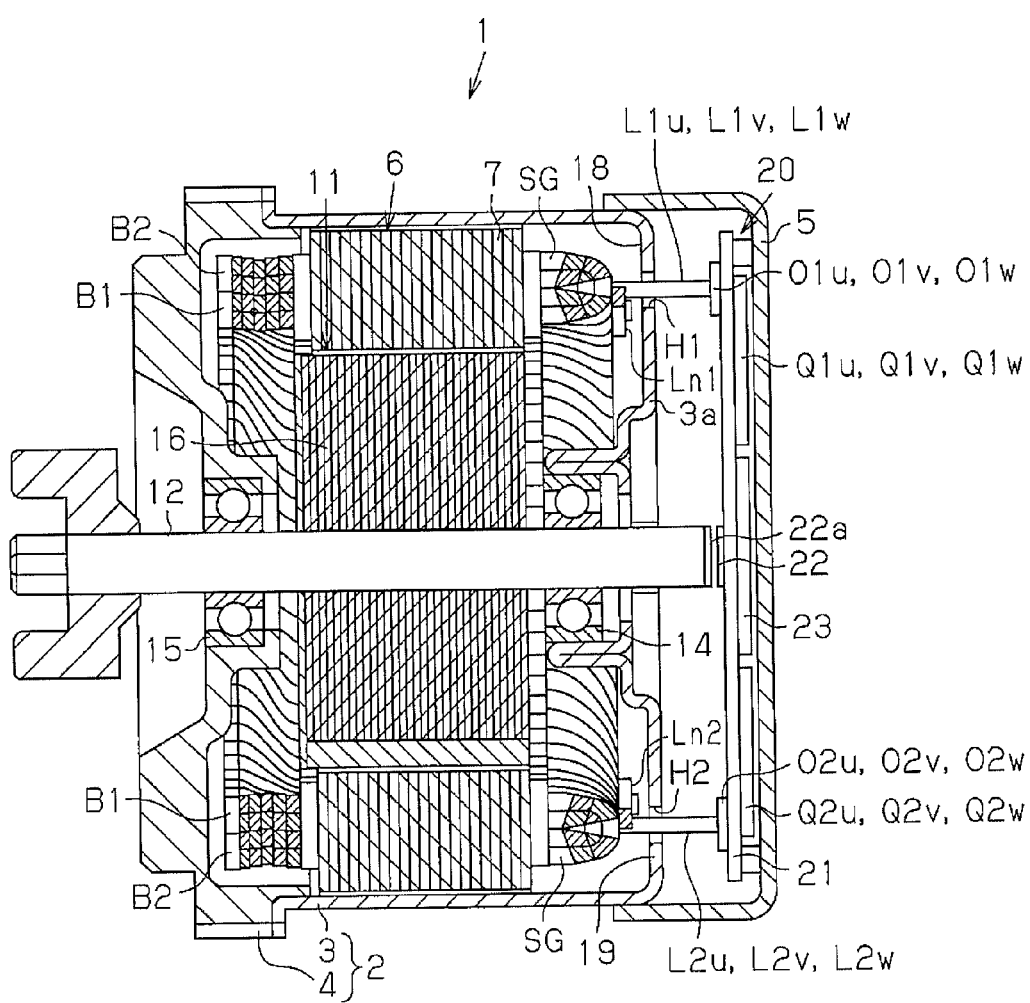
FIG. 1 is a cross-sectional view of a brushless motor according to a first embodiment of the present invention.
Figure 2:
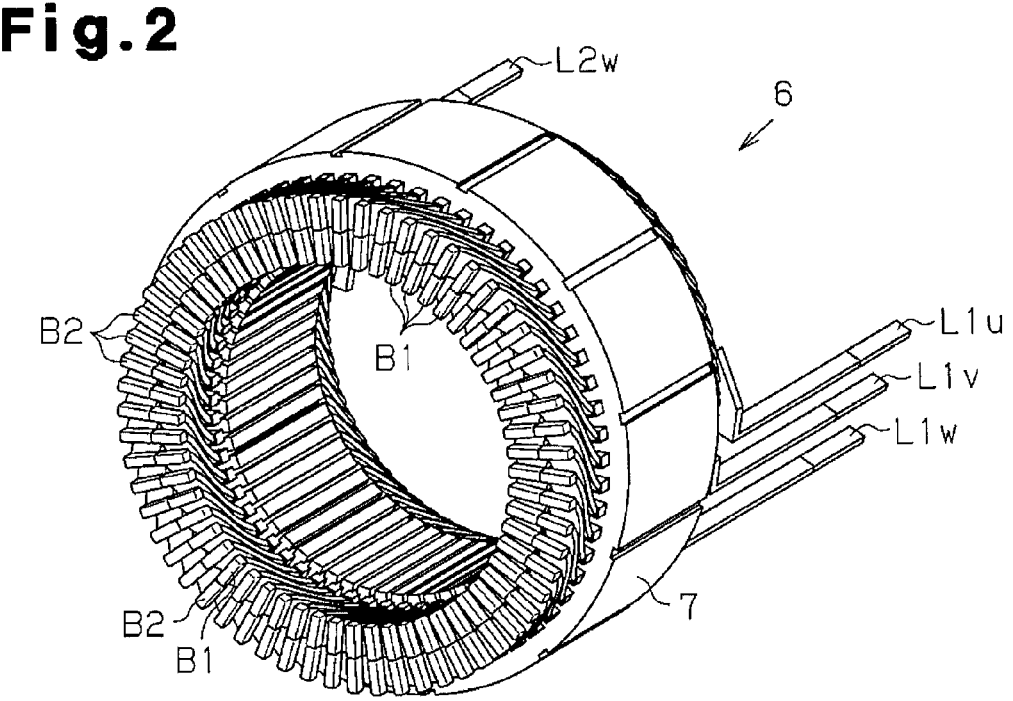
FIG. 2 is a perspective view of a stator in FIG. 1 as viewed from the side of a front cover.

As shown in FIG. 1, a motor case 2 of a brushless motor 1 (motor) includes a tubular housing 3 having a rear cover (bottom) 3a and a front cover 4, which blocks a front opening of the tubular housing 3. That is, the motor case 2 has the tubular portion, the front cover 4 provided to one axial end of the tubular portion, and the rear cover 3a provided to the other axial end of the tubular portion. The rear cover 3a is fitted with a housing box 5.

On an inner circumferential surface of the tubular housing 3, a stator 6 shown in FIGS. 2 to 5 is fixed. The stator 6 includes a stator core 7, which has a cylinder portion 8 and a plurality of teeth 9. The teeth 9 radially extend inward from the cylinder portion 8 and are provided circumferentially.

Figure 5:
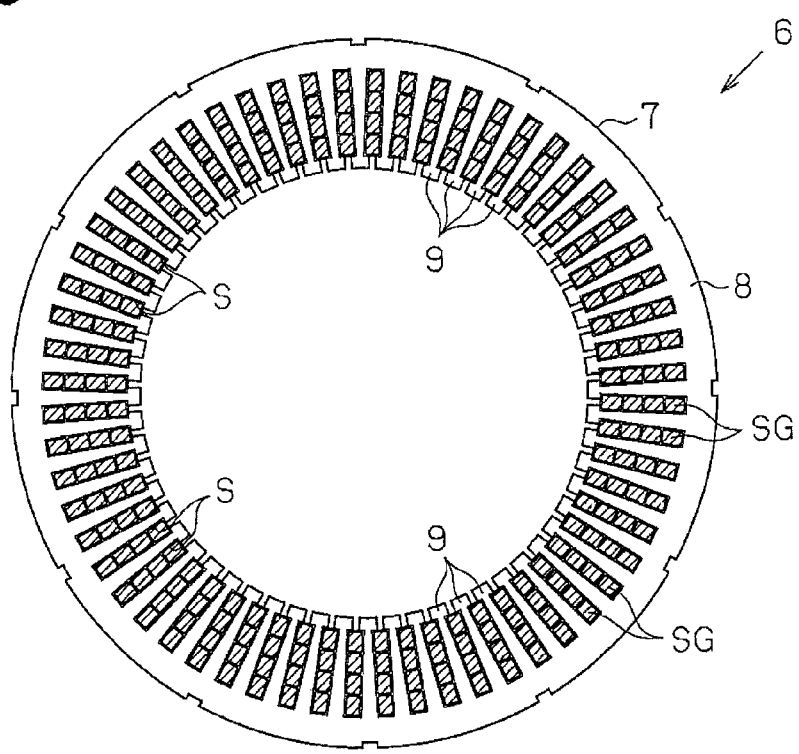
FIG. 5 is a cross-sectional view of the stator in FIG. 1 as viewed from the side of the front cover.

In the present embodiment, the sixty teeth 9 are formed as shown in FIG. 5. A slot S is formed between the teeth 9. The sixty slots S are disposed around the central axis of the cylinder portion 8 at an equal angular interval of six degrees. For ease of explanation, serial slot numbers 1 through 60 are assigned to the sixty slots S circumferentially in description when it is required that each slot S should be individually identified.

Figure 6:
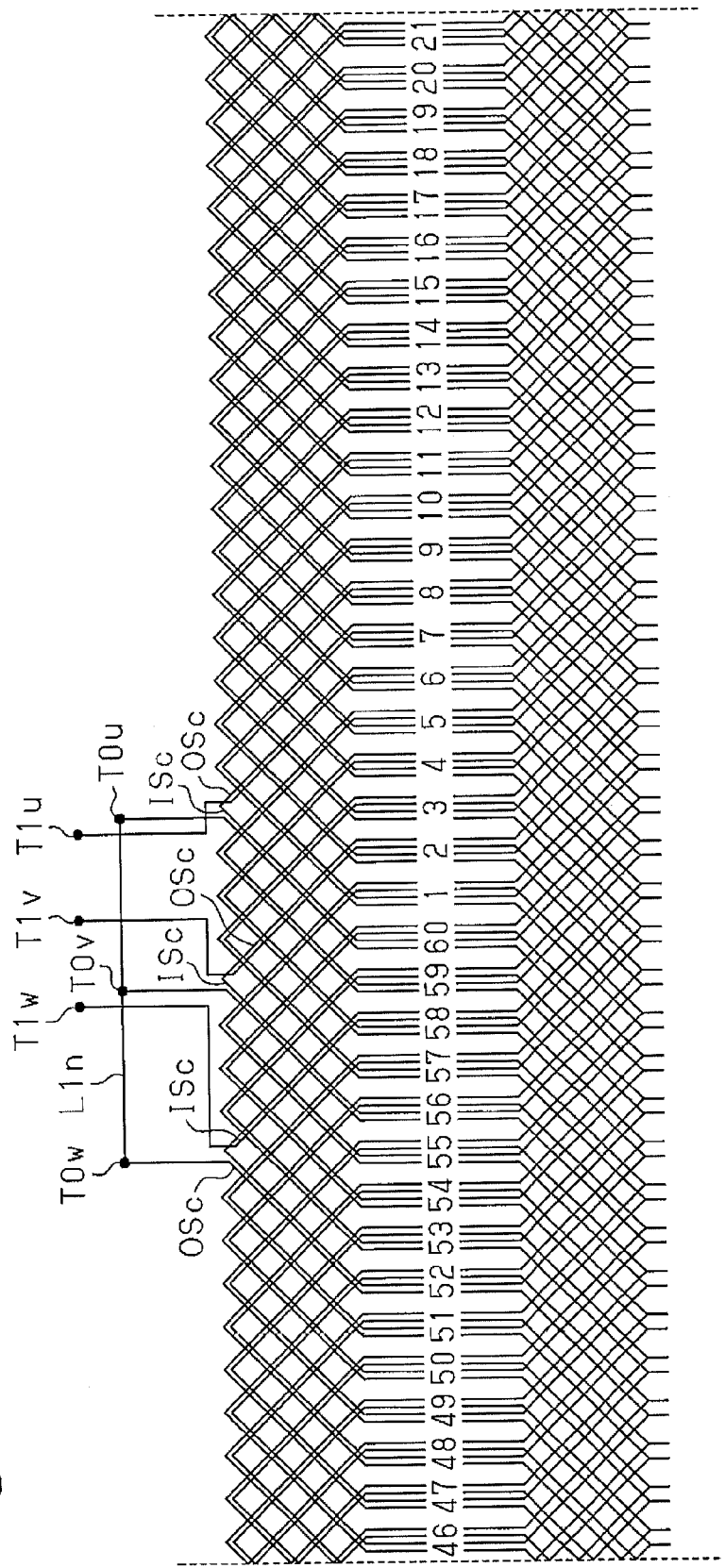
FIGS. 6 and 7 are partially developed views of a three-phase coil of the first embodiment.
Figure 7:
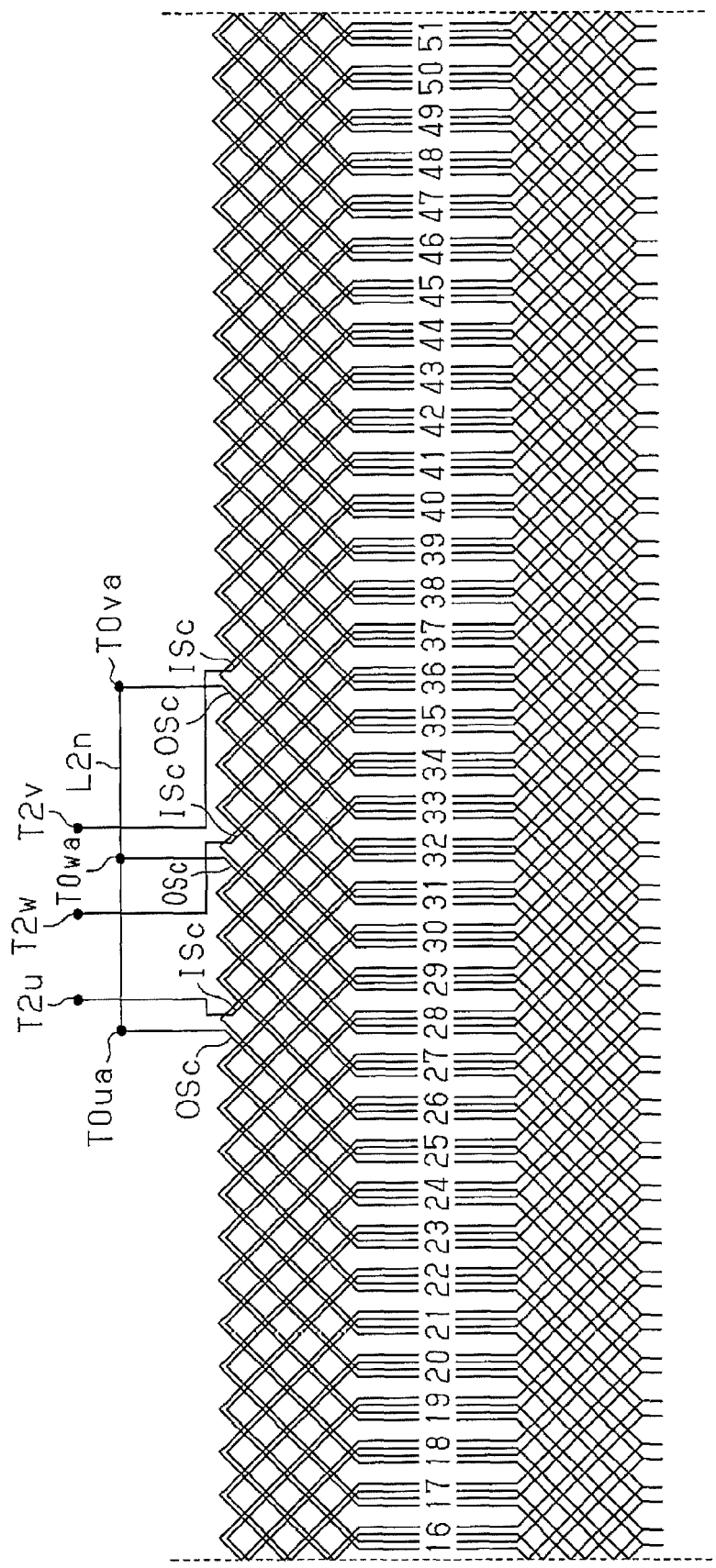

As shown in FIGS. 6 and 7, the slot S includes a three-phase coil having U, V, and W phases. In FIGS. 6 and 7, the slots S are assigned slot numbers 1 through 60.

Figure 8:
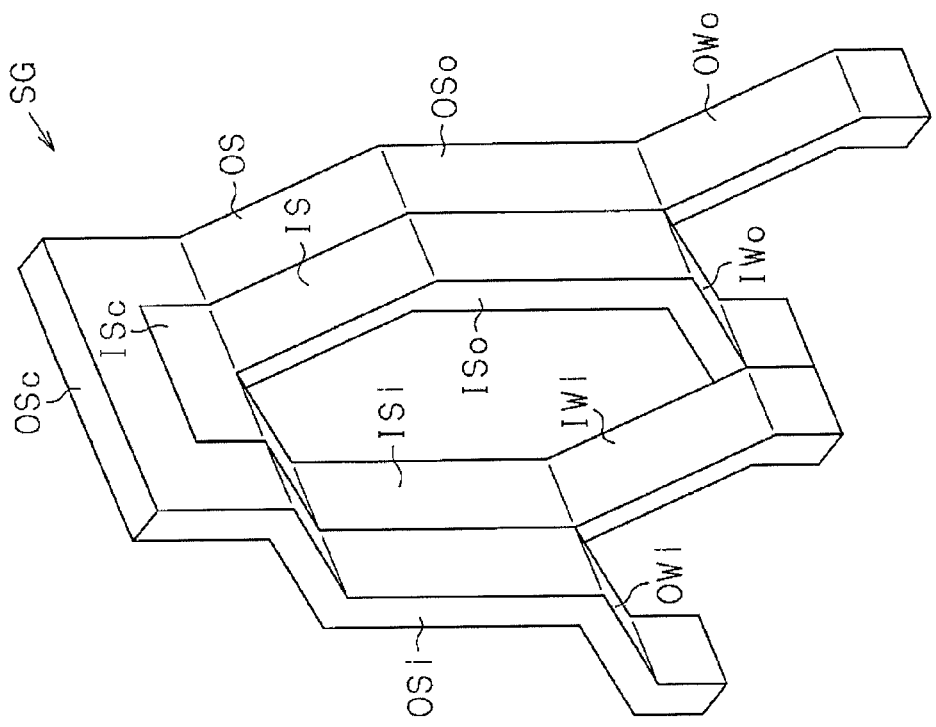
FIG. 8 is a perspective view of a segment before being inserted into a slot.

Into each slot S, a U-shaped segment SG having such a shape as shown in FIG. 8 is inserted from a first side (the side corresponding to the rear cover 3a) to a second side (the side corresponding to the front cover 4) in the axis direction. By interconnecting the segments SG under predetermined restrictions, a three-phase Y-connection SC coil is formed.

As shown in FIG. 8, the segment SG before being inserted into the slot S has an outer conductor OS for wave coil and an inner conductor IS for lap coil, both of which conductors are U-shaped. The surfaces of the respective outer conductor OS and inner conductor IS are coated with an insulating material to prevent them from electrically conducting to each other.

The outer conductor OS has a first conductor portion OSi, a fourth conductor portion OSo, and a coupling conductor portion OSc, which couples a proximal end portion of the first conductor portion OSi and that of the fourth conductor portion OSo. The first conductor portion OSi and the fourth conductor portion OSo are spread, in formation, in such a direction that they are separated from the coupling conductor portion OSc and from each other and then bent so that they extend parallel with each other.

The inner conductor IS is disposed as surrounded by the outer conductor OS. The inner conductor IS has a second conductor portion ISi, a third conductor portion ISo, and a coupling conductor portion ISc which couples the proximal end portion of the second conductor portion ISi and that of the third conductor portion ISo. The second conductor portion ISi is bent, in formation, along the coupling conductor portion ISc through the first conductor portion OSi of the outer conductor OS. The third conductor portion ISo is bent, in formation, along the coupling conductor portion ISc through the fourth conductor portion OSo of the outer conductor OS.

By disposing the inner conductor IS inside the outer conductor OS, the U-shaped segment SG before being inserted into the slot S is formed. Of the thusly formed segment SG, the first and second conductor portions OSi and ISi are inserted into the same slot S and the fourth and third conductor portions OSo and ISo are inserted into the adjacent slot S of the same phase that is different from the first and second conductor portions OSi and ISi.

For example, the first and second conductor portions OSi and ISi of the first segment SG are inserted into the slot S of slot No. 60, while its fourth and third conductor portions OSo and ISo are inserted into the slot S of slot No. 6. That is, the first and second conductor portions OSi and ISi and the fourth and third conductor portions OSo and ISo of the one segment SG are respectively inserted into the different slots S with a space corresponding to six slot pitches.

Into the slot S of slot No. 6, where the fourth and third conductor portions OSo and ISo of the first segment SG are inserted, the first and second conductor portions OSi and ISi of the adjacent second segment SG are inserted. The fourth and third conductor portions OSo and ISo of the further adjacent second segment SG are inserted into the slot S of slot No. 12.

Similarly and sequentially in order from the rear cover 3a to the front cover 4, the segments SG are inserted into the slots S. If the first and second conductor portions OSi and ISi of the tenth segment SG are inserted into the slot S of slot No. 60, in which the fourth and third conductor portions OSo and ISo of the first segment SG are inserted in such a manner, the ten segments SG go around the stator core 7. By interconnecting the adjacent segments SG, a one-phase coil is formed by the ten segments SG.

Therefore, the six-phase coil is formed by the sixty segments SG inserted into the sixty slots S, respectively. More specifically, the two three-phase coils each of which has the U-, V-, and W-phases (a three-phase coil of a first system and a three-phase coil of a second system) are formed. The first system three-phase coil and the second system three-phase coil are specifically broken down as the U1-phase, the V1-phase, and the W1-phase of the first system three-phase coil and the U2-phase, the V2-phase, and the W2-phase of the second system three-phase coil, respectively. On the inner circumferential surface of the slot S, an insulator 10 (see FIG. 12) is formed to electrically insulate the segment SG and the stator core 7 of the stator 6 from each other.

In the present embodiment, the slots S used by the respective phases of the first system three-phase coil and the second system three-phase coil are assigned as shown in Table 1.

TABLE 1

| | | Slot Number | | | | | | | | | |
|---|---|---|---|---|---|---|---|---|---|---|---|
| U-phase | First System U1 | 60 | 6 | 12 | 18 | 24 | 30 | 36 | 42 | 48 | 54 |
| | Second System U2 | 1 | 7 | 13 | 19 | 25 | 31 | 37 | 43 | 49 | 55 |
| V-phase | First System V1 | 2 | 8 | 14 | 20 | 26 | 32 | 38 | 44 | 50 | 56 |
| | Second System V2 | 3 | 9 | 15 | 21 | 27 | 33 | 39 | 45 | 51 | 57 |
| W-phase | First System W1 | 4 | 10 | 16 | 22 | 28 | 34 | 40 | 46 | 52 | 58 |
| | Second System W2 | 5 | 11 | 17 | 23 | 29 | 35 | 41 | 47 | 53 | 59 |

As is clear from Table 1, over the U1-phase of the first system three-phase coil, the coil is inserted (the corresponding segments SG are inserted) into the slots S of slot Nos. 60, 6, 12, 18, 24, 30, 36, 42, 48, and 54.

Over the V1-phase of the first system three-phase coil, the coil is inserted (the corresponding segments SG are inserted) into the slots S that are shifted by a two-slot pitch with respect to the U1-phase coil of the first system three-phase coil. Over the W1-phase of the first system three-phase coil, the coil is inserted (the corresponding segments SG are inserted) into the slots S that are shifted by a four-slot pitch with respect to the U1-phase coil of the first system three-phase coil.

Over the U2-phase of the second system three-phase coil, the coil is inserted (the corresponding segments SG are inserted) into the slots S that are shifted by a slot pitch with respect to the coil of U1-phase of the first system three-phase coil, that is, the slots S of slot Nos. 1, 7, 13, 19, 25, 31, 37, 43, 49, and 55.

Similarly, over the V2-phase of the second system three-phase coil, the coil is inserted (the corresponding segments SG are inserted) into the slots S that are shifted by a two-slot pitch with respect to the U2-phase coil of the second system three-phase coil. Over the W2-phase of the second system three-phase coil, the coil is inserted (the corresponding segments SG are inserted) into the slots S that are shifted by a four-slot pitch with respect to the U2-phase coil of the second system three-phase coil.

Figure 9:
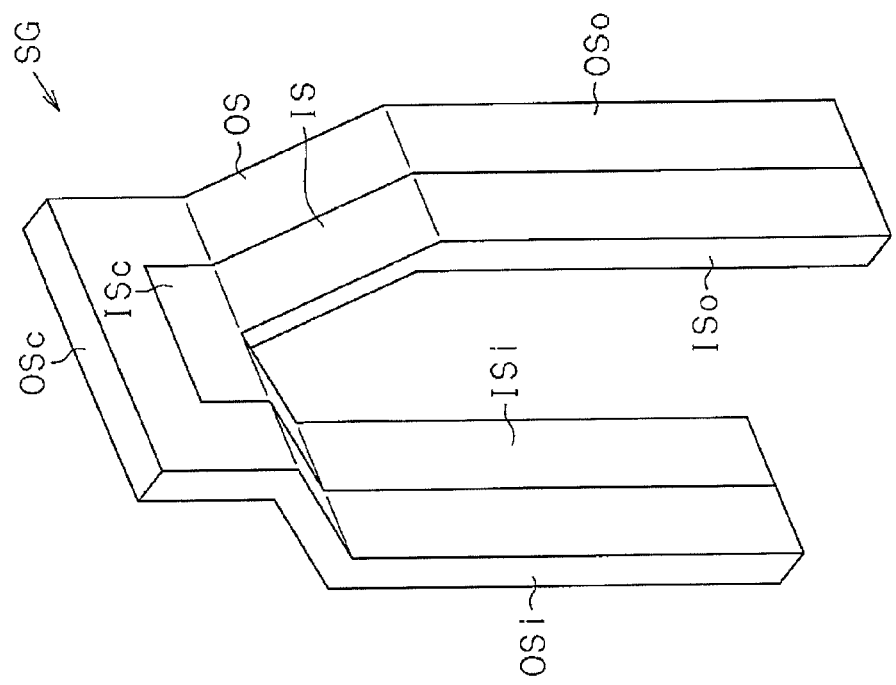
FIG. 9 is a perspective view of the segment in FIG. 8 after being inserted into a slot.

In such a manner, under the above conditions, the segments SG including the wave-winding outer conductors OS and the lap-winding inner conductors IS shown in FIG. 8 are inserted into all of the sixty slots S. Subsequently, of the segments SG inserted into the respective slots S, the outer conductors OS and the inner conductors IS are bent as shown in FIG. 9.

Of the wave-winding outer conductor OS, the first conductor portion OSi and the fourth conductor portion OSo, which project from the slot S are bent in such a direction that they separate from each other. Those bent portions of the first and fourth conductor portions OSi and OSo are referred to as first and fourth welding portions OWi and Owo.

Of the lap-winding inner conductor IS, the second conductor portion ISi and the third conductor portion ISo, which project from the slot S are bent in such a direction that they get near each other. Those bent portions of the second and third conductor portions ISi and ISo are referred to as second and third welding portions IWi and Iwo.

(First System Three-Phase Coils)

Next, a description will be given of the first system three-phase coil.

Figure 10:
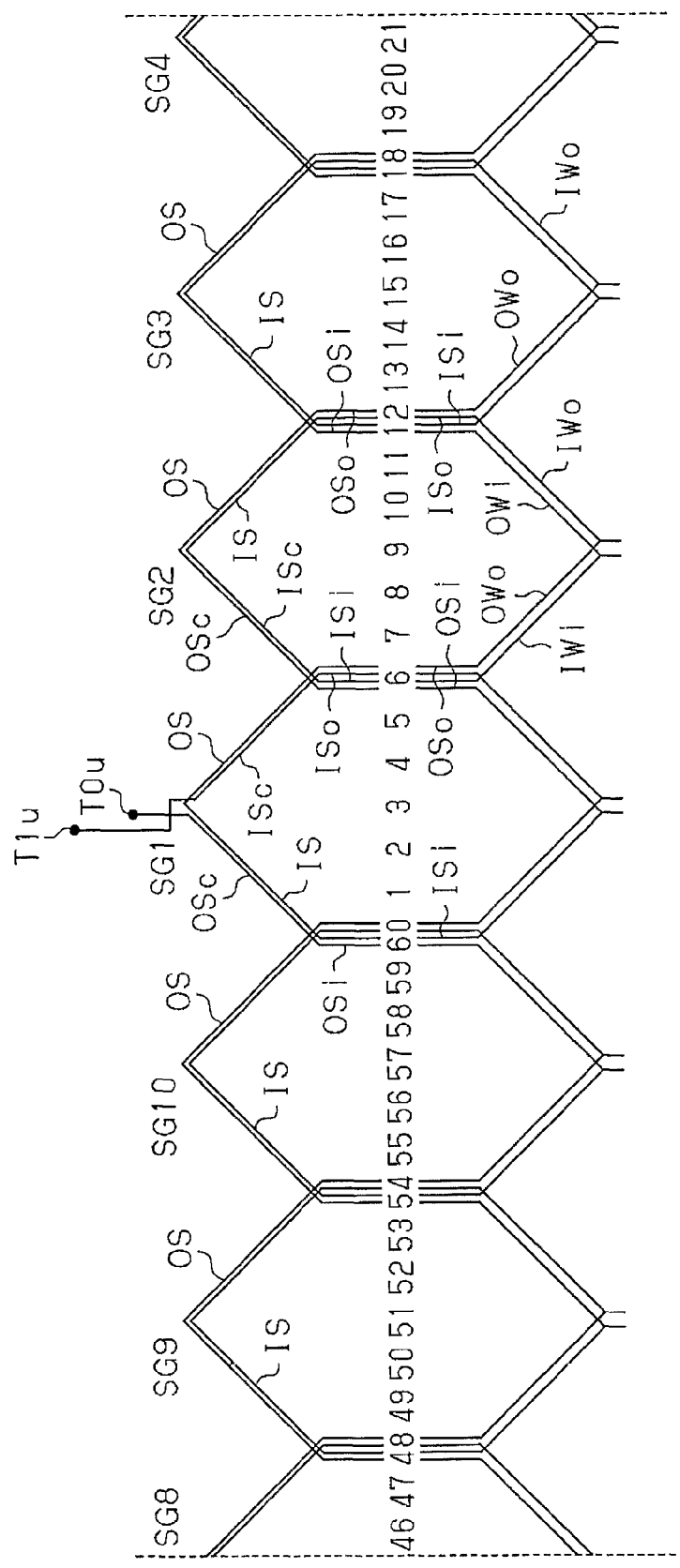

The following will describe a method for forming a U1-phase coil of the first system three-phase coil by using the ten segments of SG1 through SG10 with reference to FIGS. 10 and 11.

The slots S of slot Nos. shown in Table 1 are allocated to the U1-phase coil of the first system.

The first segment SG1 is inserted into the slots S of slot Nos. 60 and 6. The second segment SG2 is inserted into the slots S of slot Nos. 6 and 12. The third segment SG3 is inserted into the slots S of slot Nos. 12 and 18. The fourth segment SG4 is inserted into the slots S of slot Nos. 18 and 24. The fifth segment SG5 is inserted into the slots S of slot Nos. 24 and 30.

Further, the sixth segment SG6 is inserted into the slots S of slot Nos. 30 and 36. The seventh segment SG7 is inserted into the slots S of slot Nos. 36 and 42. The eighth segment SG8 is inserted into the slots S of slot Nos. 42 and 48. The ninth segment SG9 is inserted into the slots S of slot Nos. 48 and 54. The tenth segment SG10 is inserted into the slots S of slot Nos. 54 and 60.

Figure 3:
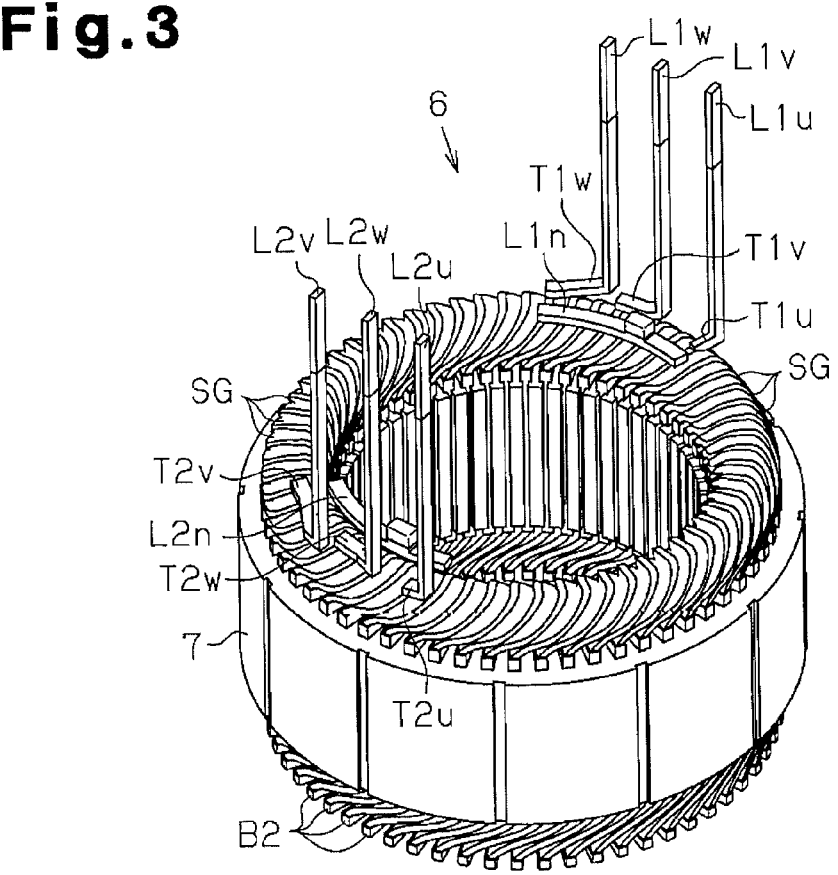
FIG. 3 is a perspective view of the stator in FIG. 1 as viewed from the side of a rear cover.
Figure 4:
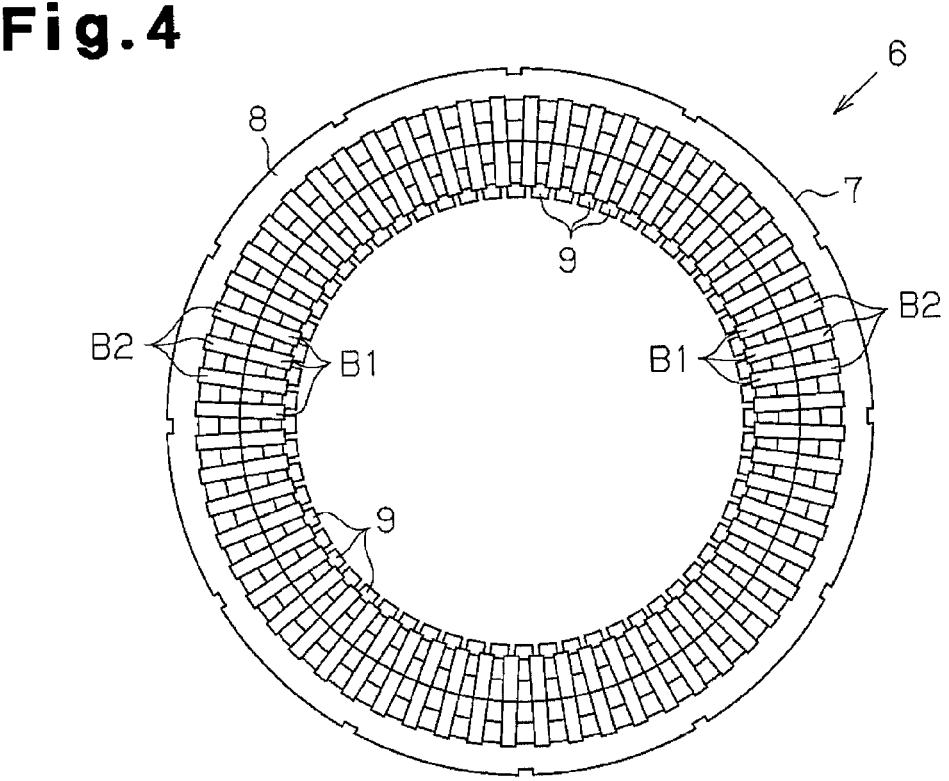
FIG. 4 is a front view of the stator in FIG. 1 as viewed from the side of the front cover.

In insertion of the segments SG1 to SG10 into the slots S, for easy insertion of the subsequent segments into the corresponding slots S, as shown in FIG. 3, the coupling conductor portion OSc of the outer conductor OS and the coupling conductor portion ISc of the inner conductor IS are twisted obliquely so that each of the segments SG is inserted as bent.

As shown in FIG. 10, the first segment SG1 for the U1-phase is inserted into the slots S of slot Nos. 60 and 6. More specifically, the second conductor portion ISi of the inner conductor IS and the first conductor portion OSi of the outer conductor OS are disposed in the slot S of slot No. 60, while the third conductor portion ISo of the inner conductor IS and the fourth conductor portion OSo of the outer conductor OS are disposed in the slot S of slot No. 6.

The second segment SG2 for the U1-phase is inserted into the slots S of slot Nos. 6 and 12. More specifically, the second conductor portion ISi of the inner conductor IS and the first conductor portion OSi of the outer conductor OS are disposed in the slot S of slot No. 6, while the third conductor portion ISo of the inner conductor IS and the fourth conductor portion OSo of the outer conductor OS are disposed in the slot S of slot No. 12.

In this case, in the slot S of slot No. 6, the third and fourth conductor portions ISo and OSo of the segment SG1 are disposed along with the first and second conductor portions OSo and ISo of the segment SG2.

Figure 12:
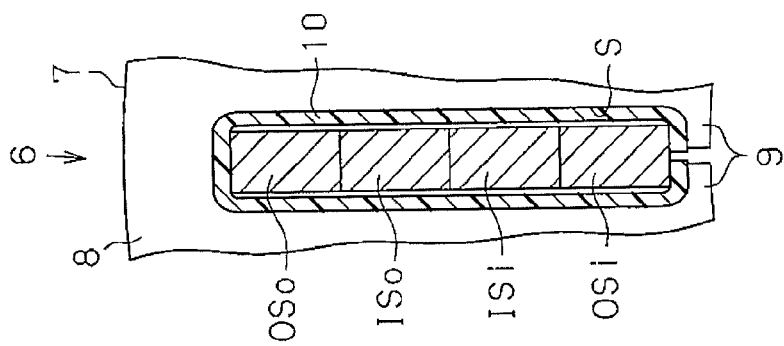
FIG. 12 is a cross-sectional view showing a state where each conductor portion of a segment is inserted into a slot.

That is, as shown in FIG. 12, in the slot S, radially from the inner side to the outer side, the first conductor portion OSi, the second conductor portion ISi, the third conductor portion ISo, and the fourth conductor portion OSo are disposed in this order in a four-layer stack structure (radially layered structure). That is, those conductor portions have their respective radial stack positions. The fourth welding portion OWo of the outer conductor OS (which is inserted into the slot S of slot No. 6) of the segment SG1 and the third welding portion IWo of the inner conductor IS (which is inserted into the slot S of slot No. 12) of the segment SG2 are welded to each other.

The third segment SG3 for the U1-phase is inserted into the slots S of slot Nos. 12 and 18. More specifically, the second conductor portion ISi of the inner conductor IS and the first conductor portion OSi of the outer conductor OS are disposed in the slot S of slot No. 12, while the third conductor portion ISo of the inner conductor IS and the fourth conductor portion OSo of the outer conductor OS are disposed in the slot S of slot No. 18.

In this case, in the slot S of slot No. 12, the third and fourth conductor portions ISo and OSo of the segment SG2 are disposed along with the first and second conductor portions OSi and ISi of the segment SG3. The fourth welding portion OWo of the outer conductor OS (which is inserted into the slot S of slot No. 12) of the segment SG2 and the third welding portion IWo of the inner conductor IS (which is inserted into the slot S of slot No. 18) of the segment SG3 are welded to each other.

Furthermore, the second welding portion IWi of the inner conductor IS (which is inserted into the slot S of slot No. 6) of the segment SG2 and the first welding portion OWi of the outer conductor OS (which is inserted into the slot S of slot No. 12) of the segment SG3 are welded to each other. Subsequently, the similar processes are repeated for fourth to tenth segments SG4 to SG10 to form a U1-phase coil such as shown in FIGS. 10 and 11.

The following will describe welding of the adjacent segments SG.

For ease of explanation, a description will be given of welding of the first segment SG1 which is inserted into the slots S of slot Nos. 60 and 6 and the adjacent second segment SG2 and the tenth segment SG10.

Figure 13:
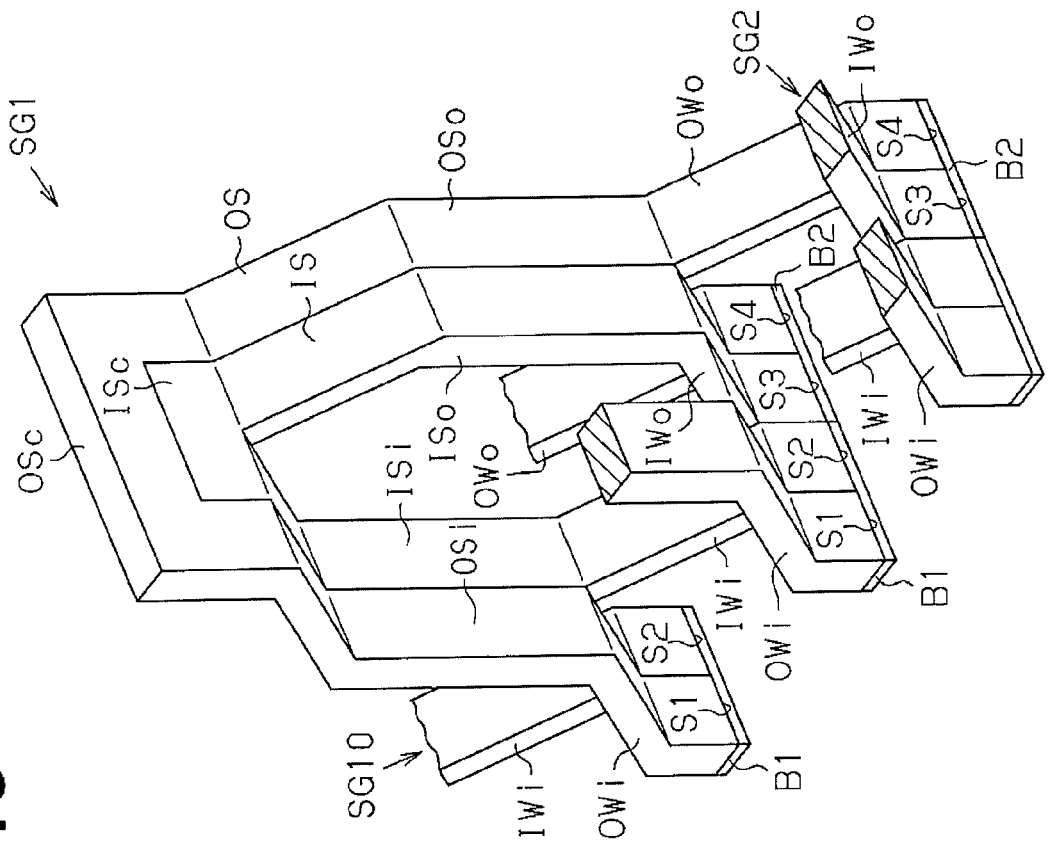
FIG. 13 is an explanatory view of interconnection of an adjacent pair of segments of the same phase.

As shown in FIG. 13, a distal surface S1 of the first welding portion OWi of the outer conductor OS of the segment SG1 and a distal surface S2 of the second welding portion IWi of the inner conductor IS of the segment SG10 are welded to a welding member B1. The outer conductor OS of the segment SG1 and the inner conductor IS of the segment SG10 are electrically connected to each other through the welding member B1. A distal surface S2 of the second welding portion IWi of the inner conductor IS of the segment SG1 and the distal surface S1 of the first welding portion OWi of the outer conductor OS of the segment SG2 are welded to the welding member B1. The inner conductor IS of the segment SG1 and the outer conductor OS of the segment SG2 are electrically connected to each other through the welding member B1.

Further, a distal surface S3 of the third welding portion IWo of the inner conductor IS of the segment SG1 and a distal surface S4 of the fourth welding portion OWo of the outer conductor OS of the segment SG10 are welded to a welding member B2. The inner conductor IS of the segment SG1 and the outer conductor OS of the segment SG10 are electrically connected to each other through the welding member B2.

Furthermore, the distal surface S4 of the fourth welding portion OWo of the outer conductor OS of the segment SG1 and the distal surface S3 of the third welding portion IWo of the inner conductor IS of the segment SG2 are welded to the welding member B2. The outer conductor OS of the segment SG1 and the inner conductor IS of the segment SG2 are electrically connected to each other through the welding member B2.

Almost the same method as that for the U1-phase coil will be performed on the coil over the other V1-phase and W1-phase of the first system three-phase coil for interconnection and welding. Further, the U1-phase, the V1-phase, and the W1-phase of the first system three-phase coil are mutually connected in an arrangement corresponding to the letter Y to form a three-phase Y-connection. The coil over the three phases is fitted with neutral point terminals T0$u$, T0$v$, and T0$w$, which are connected to a neutral point N1 (see FIG. 14) and power receiving terminals T1$u$, T1$v$, and T1$w$.

As described above, with respect to the coil over the three phases of the first system three-phase coil, each segment SG is inserted into the slots S in the axis direction from the side corresponding to the rear cover 3$a$ (rear side) to the side corresponding to the front cover 4 (front side). The welding ends of the segments SG are all aligned in height in the axial direction and welded. As a result, the same space is set between the front distal of each of the segments SG and the front cover 4.

(Setting of Neutral Point Terminal and Receiving Terminal)

As shown in FIG. 6, in the present embodiment, over the U1-phase coil, the coupling conductors OSc and ISc are separated from each other that are positioned on the side corresponding to the rear cover 3$a$ of the respective outer conductor OS and inner conductor IS of the first segment SG1.

Subsequently, one of a pair of split ends of the coupling conductor OSc of the outer conductor OS that continues to the fourth conductor portion OSo of this outer conductor OS is connected to one of a pair of split ends of the coupling conductor portion ISc of the inner conductor IS that continues to the second conductor portion ISi of this inner conductor IS.

Further, the split end continuous to the first conductor portion OSi of the outer conductor OS is set as the neutral point terminal T0u of the U1-phase. The split end continuous to the third conductor portion ISo of the inner conductor IS is set as the receiving terminal T1u of the U1-phase.

That is, the neutral point terminal T0u is a terminal that is drawn out from the first conductor portion OSi of the outer conductor OS disposed innermost radially in the slot S of slot No. 60. The receiving terminal T1u is a terminal drawn out from the third conductor portion ISo of the inner conductor IS, which is third innermost in the slot S of slot No. 6 radially.

Therefore, the receiving terminal T1u is disposed outside of the neutral point terminal T0u radially in the slot S.

Similarly, as shown in FIG. 6, over the V1-phase coil, the coupling conductors OSc and ISc are separated from each other which are of the respective outer conductor OS and inner conductor IS of the segment SG inserted into the slots S of slot Nos. 56 and 2.

One of the pair of split ends of the coupling conductor portion OSc of the outer conductor OS that continues to the fourth conductor portion OSo of this outer conductor OS is connected to one of the pair of split ends of the coupling conductor portion ISc of the inner conductor IS that continues to the second conductor portion ISi of this inner conductor IS.

The split end continuous to the first conductor portion OSi of the outer conductor OS is set as the neutral point terminal T0v of the V1-phase. The split end continuous to the third conductor portion ISo of the inner conductor IS is set as the receiving terminal T1v of the V1-phase.

That is, the neutral point terminal T0v is a terminal that is drawn out from the first conductor portion OSi of the outer conductor OS disposed innermost radially in the slot S of slot No. 56. The receiving terminal T1v is a terminal drawn out from the third conductor portion ISo of the inner conductor IS which is third innermost in the slot S of slot No. 2 radially.

Therefore, the receiving terminal T1v is disposed outside of the neutral point terminal T0v radially in the slot S.

Similarly, as shown in FIG. 6, over the W1-phase coil, the coupling conductor portions OSc and ISc are separated from each other which are of the respective outer conductor OS and inner conductor IS of the segment SG inserted into the slots S of slot Nos. 52 and 58.

One of the pair of split ends of the coupling conductor portion OSc of the outer conductor OS that continues to the fourth conductor portion OSo of this outer conductor OS is connected to one of the pair of split ends of the coupling conductor portion ISc of the inner conductor IS that continues to the second conductor portion ISi of this inner conductor IS.

The split end continuous to the first conductor portion OSi of the outer conductor OS is set as the neutral point terminal T0w of the W1-phase. The split end continuous to the third conductor portion ISo of the inner conductor IS is set as the receiving terminal T1w of the W1-phase.

That is, the neutral point terminal T0w is a terminal that is drawn out from the first conductor portion OSi of the outer conductor OS disposed innermost radially in the slot S of slot No. 52. The receiving terminal T1w is a terminal drawn out from the third conductor portion ISo of the inner conductor IS, which is third innermost in the slot S of slot No. 58 radially. Therefore, the receiving terminal T1w is disposed outside of the neutral point terminal T0w radially in the slot S.

Accordingly, the receiving terminals T1u, T1v, and T1w for each phase are radially disposed third innermost in the slots S respectively, while the neutral point terminals T0u, T0v, and T0w for each phase are disposed innermost radially in the slots S, respectively. Moreover, the receiving terminals T1u, T1v, and T1w for each phase are disposed close to each other. Similarly, the neutral point terminals T0u, T0v, and T0w for each phase are also disposed close to each other and radially inside of the receiving terminals T1u, T1v, and T1w for each phase, respectively.

Therefore, the neutral line (connection portion) L1n interconnecting the neutral point terminals T0u, T0v, and T0w for each phase is disposed radially inward of the receiving terminals T1u, T1v, and T1w for each phase. As a result, as shown in FIG. 3, the leads L1u, L1v, and L1w, which are drawn out from the receiving terminals T1u, T1v, and T1w for each phase, are disposed radially outward of the neutral line L1n.

Figure 14:
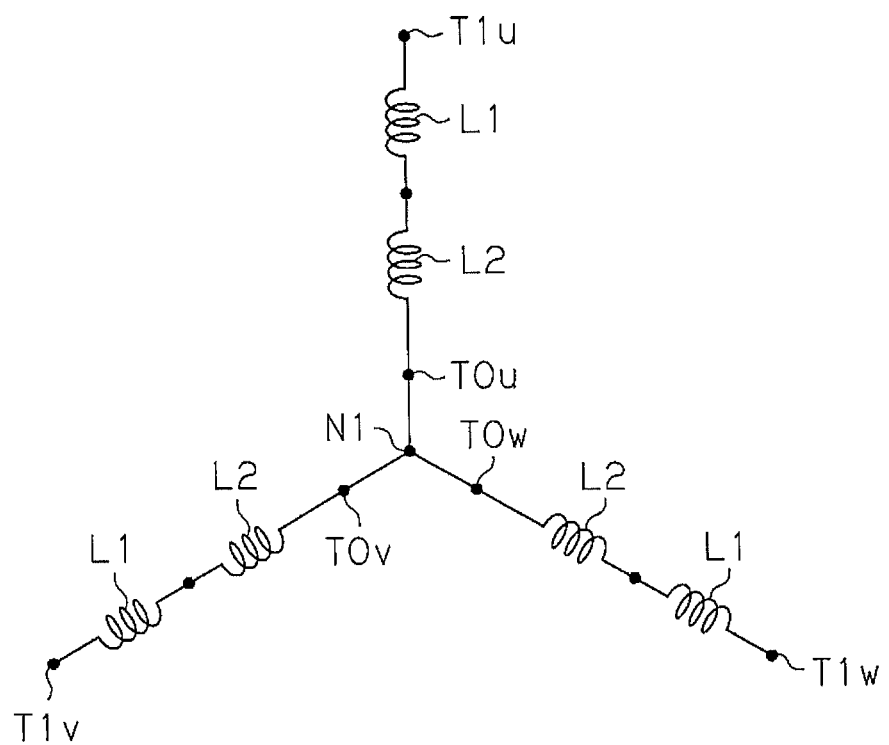
FIG. 14 is an electric circuit diagram of the three-phase coil of the first system in FIGS. 6 and 7.

By interconnecting the neutral point terminals T0u, T0v, and T0w for each phase with a neutral line L1n and connecting the receiving terminals T1u, T1v, and T1w for each phase to the respective output terminals of a control circuit to provide receiving ends, a three-phase Y-connection coil of the first system is formed to establish an electric circuit such as shown in FIG. 14. In the drawing, L1 denotes inductance of a portion of the coil from the receiving terminals T1u, T1v, and T1w for each phase to a joint between the split end of the coupling conductor portion OSc of the outer conductor OS and the split end of the coupling conductor portion ISc of the inner conductor IS. L2 denotes inductance of a portion of the coil from this joint to the respective neutral point terminals T0u, T0v, and T0w.

(Second System Three-Phase Coils)

Next, a description will be given of the second system three-phase coil.

Similar to the first system three-phase coils, the second system three-phase coils are of a three-phase Y-connection. The second system three-phase coils are wound through each of the slots S as shifted by a slot pitch with respect to the corresponding first system three-phase coils, respectively.

Figure 15:
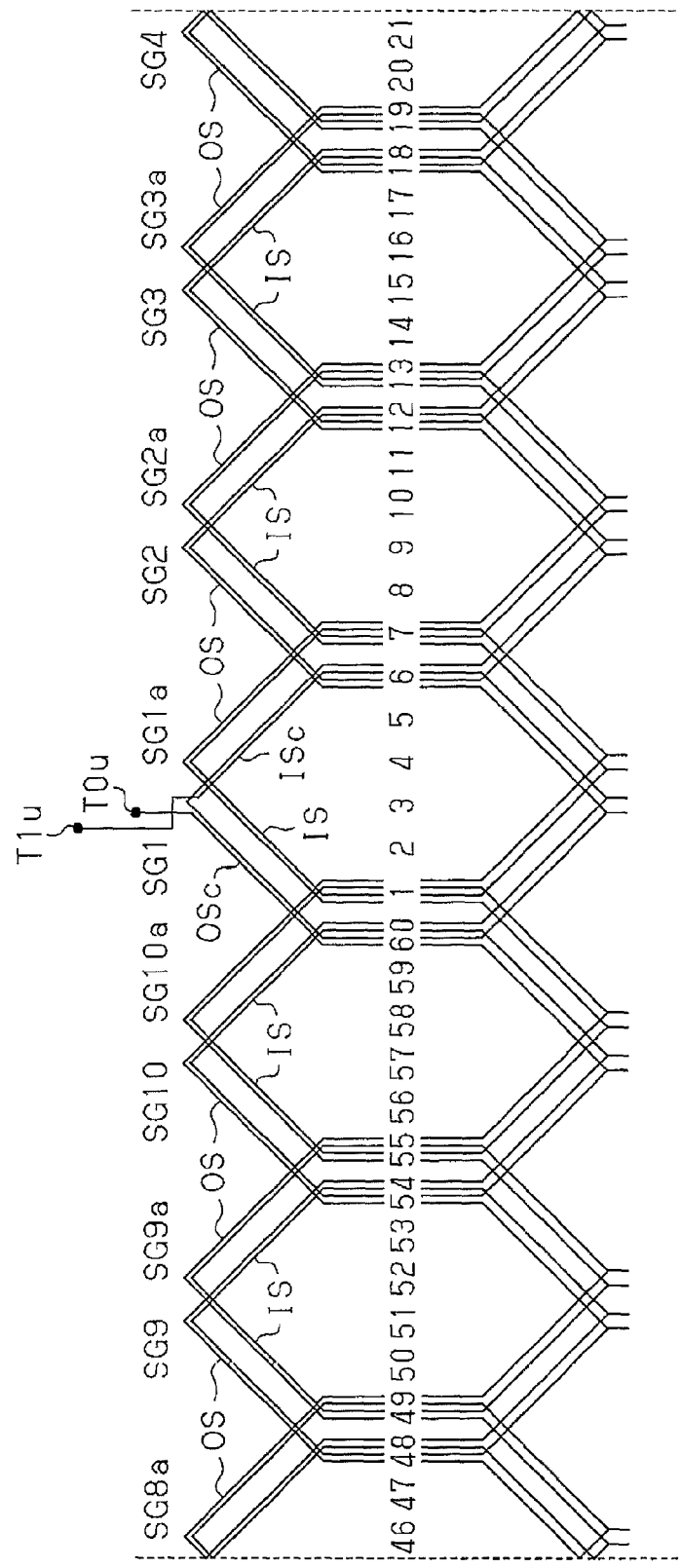
FIGS. 15 and 16 are partially developed views of a U2-phase coil in the three-phase coil of a second system in FIGS. 6 and 7 respectively.
Figure 16:
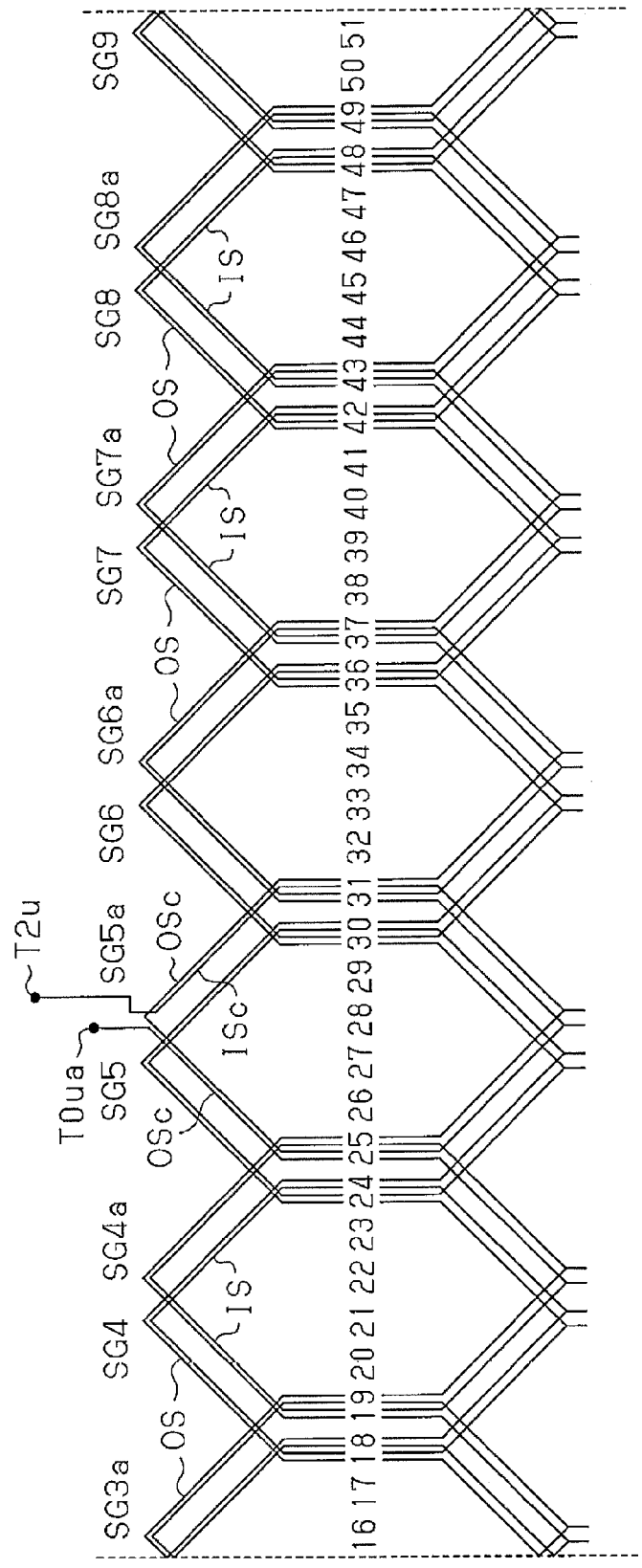

Therefore, as shown in FIGS. 15 and 16, the second system U2-phase coil is wound through each of the slots S as shifted by the one-slot pitch with respect to the first system U1-phase coil.

The slots S of slot Nos. shown in Table 1 are allocated to the U2-phase coil of the second system, thereby using ten segments SG1a to SG10a.

The first segment SG1a is inserted into the slots S of slot Nos. 1 and 7. The second segment SG2a is inserted into the slots S of slot Nos. 7 and 13. The third segment SG3a is inserted into the slots S of slot Nos. 13 and 19. The fourth segment SG4a is inserted into the slots S of slot Nos. 19 and 25. The fifth segment SG5a is inserted into the slots S of slot Nos. 25 and 31.

Further, the sixth segment SG6a is inserted into the slots S of slot Nos. 31 and 37. The seventh segment SG7a is inserted into the slots S of slot Nos. 37 and 43. The eighth segment SG8a is inserted into the slots S of slot Nos. 43 and 49. The ninth segment SG9a is inserted into the slots S of slot Nos. 49 and 55. The tenth segment SG10a is inserted into the slots S of slot Nos. 55 and 1.

Similar to the first system U1-phase coil, the segments SG1a through SG10a are connected to form the U2-phase coil of the second system. The other V2-phase and W2-phase coil of the second system three-phase coil are also connected by almost the same method as that for the U2-phase coil.

Similar to the first system three-phase coil, the U2-, phase, the V2-phase, and the W2-phase of the second system three-phase coil are mutually connected in letter Y to form a three-phase Y-connection. The coil over the three phases is fitted with neutral point terminals T0ua, T0va, and T0wa, which are connected to a neutral point N2 (see FIG. 17) and power receiving terminals T2u, T2v, and T2w.

As for the phases of the second system three-phase coil, a welding end of each of the segments SG is axially aligned with the welding members B1 and B2 of the first system three-phase coil segments SG. As shown in FIGS. 1 to 4, the welding members B1 and B2 of all of the segments SG are welded so that they are aligned with each other axially. As a result, the same space is set between the front distal of each of the segments SG and the front cover 4.

(Setting of Neutral Point Terminal and Receiving Terminal)

As shown in FIGS. 6 and 7, in the present embodiment, the neutral point terminal T0$ua$ and the receiving terminal T2$u$ of the U2-phase coil are circumferentially separated by 150 degrees from the neutral point terminal T0$u$ and the receiving terminal T1$u$ of the U1-phase coil, respectively. As for the U2-phase coil, the coupling conductor portions OSc and ISc of the respective outer conductor OS and inner conductor IS of the fifth segment SG5$a$ are separated from each other.

Subsequently, similar to the U1-phase coil, as shown in FIG. 16, one of the pair of split ends of the coupling conductor portion OSc of the outer conductor OS that continues to the fourth conductor portion OSo of this outer conductor OS is connected to one of the pair of split ends of the coupling conductor portion ISc of the inner conductor IS that continues to the second conductor portion ISi of this inner conductor IS.

The split end continuous to the first conductor portion OSi of the outer conductor OS is set as the neutral point terminal T0$ua$ of the U2-phase. The split end continuous to the third conductor portion ISo of the inner conductor IS is set as the receiving terminal T2$u$ of the U2-phase.

That is, the neutral point terminal T0$ua$ is a terminal that is drawn out from the first conductor portion OSi of the outer conductor OS disposed innermost radially in the slot S of slot No. 25. The receiving terminal T2$u$ is a terminal drawn out from the third conductor portion ISo of the inner conductor IS, which is third innermost in the slot S of slot No. 31 radially.

Therefore, the receiving terminal T2$u$ is disposed radially outside of the neutral point terminal T0$ua$ in the slot S. The receiving terminal T2$u$ and the neutral point terminal T0$ua$ of the U2-phase are separated by 150 degrees from the receiving terminal T1$u$ and the neutral point terminal T0$u$ of the U1-phase coil respectively in the circumferential direction of the stator core 7.

Next, the neutral point terminal T0$va$ and the receiving terminal T2$v$ of the V2-phase coil are separated by 222 degrees from the neutral point terminal T0$v$ and the receiving terminal T1$v$ of the U1-phase coil respectively in one circumferential direction. Therefore, as shown in FIGS. 6 and 7, as for the V2-phase coil, the coupling conductor portions OSc and ISc of the respective outer conductor OS and inner conductor IS of the segment SG inserted into the slots S of slot Nos. 33 and 39 are separated from each other.

Subsequently, similarly to the V1-phase coil, one of the pair of split ends of the coupling conductor OSc of the outer conductor OS that continues to the fourth conductor portion OSo of this outer conductor OS is connected to one of the pair of split ends of the coupling conductor portion ISc of the inner conductor IS that continues to the second conductor portion ISi of the inner conductor IS.

The split end continuous to the first conductor portion OSi of the outer conductor OS is set as the neutral point terminal T0$va$ of the V2-phase. The split end continuous to the third conductor portion ISo of the inner conductor IS is set as the receiving terminal T2$v$ of the V2-phase.

That is, the neutral point terminal T0$va$ is a terminal that is drawn out from the first conductor portion OSi of the outer conductor OS disposed innermost radially in the slot S of slot No. 33. The receiving terminal T2$v$ is a terminal drawn out from the third conductor portion ISo of the inner conductor IS, which is third innermost in the slot S of slot No. 39 radially. Therefore, the receiving terminal T2$v$ is disposed outside of the neutral point terminal T0$va$ radially in the slot S.

Next, the neutral point terminal T0$wa$ and the receiving terminal T2$w$ of the W2-phase coil are separated by 222 degrees from the neutral point terminal T0$w$ and the receiving terminal T1$w$ of the W1-phase coil respectively in the above-described one circumferential direction. Therefore, as shown in FIGS. 6 and 7, as for the W2-phase coil, the coupling conductor portions OSc and ISc of the respective outer conductor OS and inner conductor IS of the segment SG inserted into the slots S of slot Nos. 29 and 35 are separated from each other.

Subsequently, similarly to the W1-phase coil, one of the pair of split ends of the coupling conductor portion OSc of the outer conductor OS that continues to the fourth conductor portion OSo of this outer conductor OS is connected to one of the pair of split ends of the coupling conductor portion ISc of the inner conductor IS that continues to the second conductor portion ISi of this inner conductor IS.

The split end continuous to the first conductor portion OSi of the outer conductor OS is set as the neutral point terminal T0$wa$ of the W2-phase. The split end continuous to the third conductor portion ISo of the inner conductor IS is set as the receiving terminal T2$w$ of the W2-phase.

That is, the neutral point terminal T0$wa$ is a terminal that is drawn out from the first conductor portion OSi of the outer conductor OS disposed innermost radially in the slot S of slot No. 29. The receiving terminal T2$w$ is a terminal drawn out from the third conductor portion ISo of the inner conductor IS, which is third innermost in the slot S of slot No. 35 radially. Therefore, the receiving terminal T2$w$ is disposed outside of the neutral point terminal T0$wa$ radially in the slot S.

Accordingly, the receiving terminals T2$u$, T2$v$, and T2$w$ for each phase are radially disposed third innermost in the slots S respectively, while the neutral point terminals T0$ua$, T0$va$, and T0$wa$ for each phase are disposed innermost radially in the slots S, respectively. Moreover, the receiving terminals T2$u$, T2$v$, and T2$w$ for each phase are disposed close to each other. Similarly, the neutral point terminals T0$ua$, T0$va$, and T0$wa$ for each phase are also disposed close to each other and inside of the receiving terminals T2$u$, T2$v$, and T2$w$ for each phase, respectively.

Therefore, a neutral line (connection line) L2$n$ interconnecting the neutral point terminals T0$ua$, T0$va$, and T0$wa$ for each phase is disposed radially inside of the receiving terminals T2$u$, T2$v$, and T2$w$ for each phase. As a result, as shown in FIG. 3, leads L2$u$, L2$v$, and L2$w$, which are drawn out from the respective receiving terminals T2$u$, T2$v$, and T2$w$ for each phase, are disposed radially outside of the neutral line L2$n$.

Figure 17:
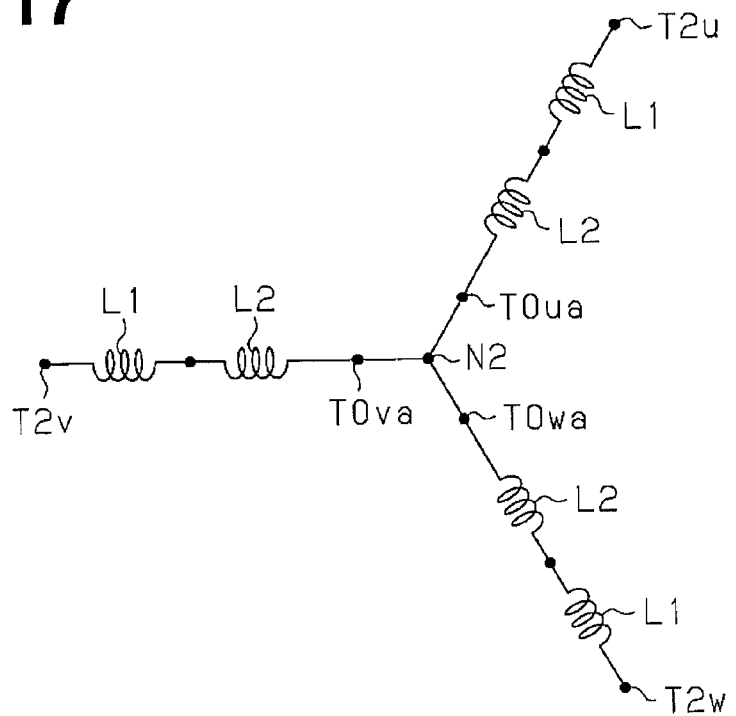
FIG. 17 is an electric circuit diagram of the three-phase coil of the second system in FIGS. 6 and 7.

By interconnecting the neutral point terminals T0$ua$, T0$va$, and T0$wa$ for each phase with the neutral line L2$n$ and drawing out the receiving terminals T2$u$, T2$v$, and T2$w$ for each phase, a three-phase Y-connection coil of the second system is formed to establish an electric circuit such as shown in FIG. 17. In the drawing, D1 denotes inductance of a portion of the coil from the receiving terminals T2$u$, T2$v$, and T2$w$ for each phase to a joint between the split end of the coupling conductor portion OSc of the outer conductor OS and the split end of the coupling conductor portion ISc of the inner conductor IS. D2 denotes inductance of a portion of the coil from this joint to the respective neutral point terminals T0$ua$, T0$va$, and T0$wa$.

Figure 18:
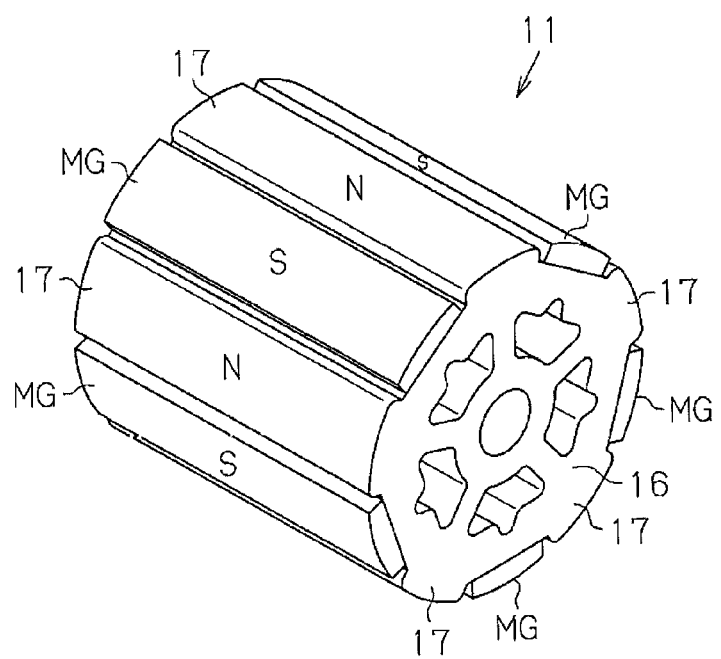
FIG. 18 is a perspective view of a consequent-pole type rotor in FIG. 1.

In the stator 6 in which the first system three-phase coil and the second system three-phase coil are wound in such a manner, a rotor 11 is disposed as shown in FIG. 1. The rotor 11 has a rotary shaft 12, which rotary shaft 12 is rotationally supported by bearings 14 and 15 provided to the rear cover 3a and the front cover 4 of the tubular housing 3. To the rotary shaft 12 of the rotor 11, a rotor core 16 is externally fitted, on an outer circumference of which rotor core 16 a plurality of magnets MG are mounted equally spaced angularly so that they face the stator 6, more specifically, radial inner end portions of the teeth 9. As shown in FIG. 18, the rotor 11 of the present embodiment is a consequent-pole type rotor core. To the rotor core 16, the five magnets MG are attached along with another five salient poles 17. Therefore, the rotor core 16 has ten field poles. The consequent-pole type rotor core may be replaced with a rotor core having the ten magnets MG.

Figure 19:
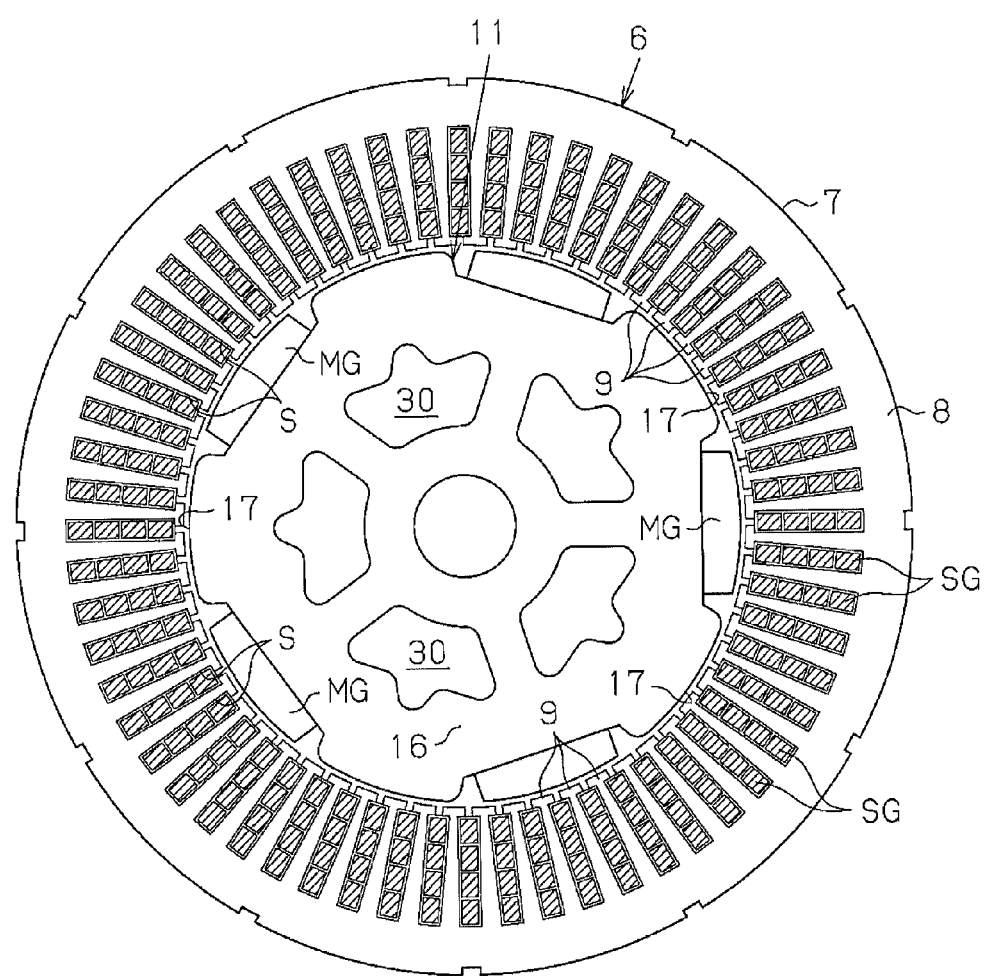
FIG. 19 is a front view of the stator and the rotor in FIG. 1 as viewed axially.

As shown in FIG. 19, the motor of the consequent-pole type motor includes the consequent rotor 11 in which (2×p) (p: number of pole pairs) number of magnetic poles are disposed circumferentially, the stator core 7 having the plurality of teeth 9 (slots S) which are provided so as to face the rotor 11 radially, and the stator 6 having multi-phase coils wound through the slots S. The number Z of the teeth 9 (slots S) is given by 2×p×m×n per magnetic pole. Here, m is the number of phases of the stator coil and n is a natural number.

In a case shown in FIG. 19, based on this expression, the number Z of the teeth 9 is:

$$Z = 2 \times 5 \text{ (number of the magnets MG)} \times 3 \text{ (number of phases)} \times 2 = 60$$

The rotor core 16 of the consequent rotor 11 is formed by stacking rotor core pieces each of which is made of a steel plate. The rotor core 16 contains a void 30 (small-magnetism and light-weight portion) at its radial position that has smaller specific gravity and magnetism than the rotor core piece.

Accordingly, in the consequent rotor 11 subject to magnetic variations in the rotor core 16, the eddy current suppressing effects due to the magnetic variation suppressing effects of the void 30 (small-magnetism and light-weight portion) inhibit the occurrence of an eddy current further because a plurality of the rotor core pieces are stacked.

At a position that is in the rear cover 3a of the tubular housing 3 and faces the neutral line L1n of the first system three-phase coil connected to the stator 6 in wiring, a first housing recess 18 is formed, in which first housing recess 18 has a space where the neutral line L1n stands between. Accordingly, it is possible to permit the neutral line L1n projecting toward the rear cover 3a to escape axially through the first housing recess 18 and reduce the axial size of the motor by the corresponding amount.

Through the first housing recess 18, a first through hole H1 is formed. The first through hole H1 formed through the first housing recess 18 is a slot and faces the receiving terminals T1u, T1v, and T1w for each phase of the first system three-phase coil formed adjacent to the neutral line L1n. As shown in FIG. 1, the leads L1u, L1v, and L1w, which are drawn out from the receiving terminals T1u, T1v, and T1w, respectively pass through the first through hole H1 and are guided into the housing box 5.

At a position that is in the rear cover 3a of the tubular housing 3 and faces the neutral line L2n of the second system three-phase coil connected to the stator 6 in wiring, a second housing recess 19 is formed, in which second housing recess 19 has a space where the neutral line L2n stands between. Accordingly, it is possible to permit the neutral line L2n projecting toward the rear cover 3a to escape axially through the second housing recess 19 and reduce the axial size of the motor by the corresponding amount.

Through the second housing recess 19, a second through hole H2 is formed. The second through hole H2 formed through the second housing recess 19 is a slot and faces the receiving terminals T2u, T2v, and T2w for each phase of the second system three-phase coil formed adjacent to the neutral line L2n. As shown in FIG. 1, the leads L2u, L2v, and L2w, which are drawn out from the receiving terminals T2u, T2v, and T2w, respectively pass through the second through hole H2 and are guided into the housing box 5.

The housing box 5 fixed to the outside of the rear cover 3a contains a drive device 20. A circuit board 21 of the drive device 20 is mounted with a variety of types of circuit elements such as a rotation sensor 22 for controlling the rotation of the rotor 11, an electronic control unit (ECU) 23, first switching transistors Q1u, Q1v, and Q1w, and second switching transistors Q2u, Q2v, and Q2w.

The rotation sensor 22 is mounted on the circuit board 21 in such a manner that it faces the rotary shaft 12 projecting out of the rear cover 3a in the axial direction. The rotation sensor 22 is composed of a Hall IC in the present embodiment, to detect the rotation angle of a detection magnet 22a, which is fixed to the axial end face of the rotary shaft 12 to integrally rotate with the rotary shaft 12.

The electronic control unit (ECU) 23 has a microcomputer. The ECU 23 detects current rotation angle and rotational speed of the brushless motor 1 based on a detection signal from the rotation sensor 22. The ECU 23 computes timings at which power is supplied to the respective phases of the first system three-phase coil and the second system three-phase coil.

The first switching transistors Q1u, Q1v, and Q1w are each composed of, for example, a power MOS transistor and controlled so that they are turned on/off based on a control signal from the ECU 23. The first switching transistors Q1u, Q1v, and Q1w are controlled so that they are turned on/off at the predetermined timing, to control power that is supplied to the respective phases of the first system three-phase coil. It causes the first system three-phase coil to generate a rotating magnetic field on the stator 6.

The first switching transistors Q1u, Q1v, and Q1w are mounted at a position on the circuit board 21 at which they face the receiving terminals T1u, T1v, and T1w for each phase formed on the first system three-phase coil as viewed in the axial direction. At positions on the radial outer circumferential surface of the circuit board 21, which are connected respectively to the first switching transistors Q1u, Q1v, and Q1w on the circuit board 21 and respectively face the receiving terminals T1u, T1v, and T1w as viewed in the axial direction, output terminals O1u, O1v, and O1w for supplying power to the respective phases are formed, respectively.

Therefore, the leads L1u, L1v, and L1w, which are drawn out from the receiving terminals T1u, T1v, and T1w for each phase, pass through the first through hole H1 formed through the rear cover 3a to interconnect the receiving terminals T1u, T1v, and T1w for each phase and the output terminals O1u, O1v, and O1w for each phase respectively over the shortest distance in the axial direction.

The second switching transistors Q2u, Q2v, and Q2w are each composed of, for example, a power MOS transistor and controlled so that they are turned on/off based on the control signal from the ECU 23. The second switching transistors Q2u, Q2v, and Q2w are controlled so that they are turned on/off at the predetermined timing, to control power which is supplied to the respective phases of the second system three-phase coil. It causes the second system three-phase coil to generate a rotating magnetic field on the stator 6.

The second switching transistors Q2u, Q2v, and Q2w are mounted at a position on the circuit board 21 at which they face the receiving terminals T2u, T2v, and T2w for each phase formed on the second system three-phase coil as viewed in the axial direction. At positions that are connected respectively to the first switching transistors Q1u, Q1v, and Q1w on the circuit board 21 and respectively face the receiving terminals T2u, T2v, and T2w as viewed in the axial direction, output terminals O2u, O2v, and O2w for supplying power to the respective phases are formed, respectively.

Therefore, the leads L2u, L2v, and L2w, which are drawn out from the receiving terminals T2u, T2v, and T2w for each phase, pass through the second through hole H2 formed through the rear cover 3a to interconnect the receiving terminals T2u, T2v, and T2w for each phase and the output terminals O2u, O2v, and O2w for each phase respectively over the shortest distance in the axial direction.

The brushless motor 1 of the present embodiment finds its use in an electric power steering device or the like. Specifically, the rotary shaft 12 of the rotor 11 is coupled to a decelerator (not shown) to be connected via this decelerator to the partner shaft such as a steering shaft (not shown), which is a driven portion, thereby driving this partner shaft.

Next, a description will be given of characteristic advantages of the first embodiment.

(1) The distal ends of the segments SG welded to the welding members B1 and B2 are positioned on the side corresponding to the front cover 4, whereas the receiving terminals T1u, T1v, and T1w and T2u, T2v, and T2w of the SC coil of the stator 6 are provided on the side corresponding to the rear cover 3a, or the side opposite to the front cover 4. Therefore, the receiving terminals T1u, T1v, and T1w as well as T2u, T2v, and T2w can be connected respectively to the leads L1u, L1v, and L1w as well as L2u, L2v, and L2w on the side corresponding to the rear cover 3a, avoiding a spot on the side corresponding to the front cover 4, where the welding portions are closely formed. This reduces the size of the brushless motor 1 composed of the SC coil with small cogging torque.

The receiving terminals T1u, T1v, and T1w as well as T2u, T2v, and T2w are formed not on the portion where the distal ends of the segments SG are welded to each other but on the coupling conductor portions ISc and OSc of the U-shaped segments SG which are disposed on the side corresponding to the rear cover 3a and dimensioned. Therefore, it is possible to reduce clearance between the rear cover 3a and the coupling conductor portions ISc and OSc of the U-shaped segments SG each of which forms the SC coil, thereby reducing the size of the brushless motor 1.

The leads L1u, L1v, and L1w as well as L2u, L2v, and L2w correspondingly connected to the receiving terminals T1u, T1v, and T1w as well as T2u, T2v, and T2w are drawn out axially from the coupling conductor portions ISc and OSc of the dimensioned segment SG as they are. That is, they are drawn out sequentially to the coupling conductor portions ISc and OSc. Therefore, the leads L1u, Liv, and L1w as well as L2u, L2v, and L2w can be easily connected respectively to the output terminals O1u, O1v, and O1w as well as O2u, O2v, and O2w provided on the circuit board 21 in the housing box 5.

The rear cover 3a has the first and second through holes H1 and H2 formed in it. The leads L1u, L1v, and Liw as well as L2u, L2v, and L2w axially drawn out from the receiving terminals T1u, T1v, and T1w as well as T2u, T2v, and T2w provided on the side corresponding to the rear cover 3a connect receiving terminals T1u, T1v, and T1w as well as T2u, T2v, and T2w through the first and second through holes H1 and H2 to the output terminals O1u, O1v, and O1w as well as O2u, O2v, and O2w of the control circuit adjacent to the rear cover 3a, respectively. It enables placing the components of the control circuit within its inner diameter, thereby reducing the overall size of the brushless motor 1 having the control circuit.

The segments SG are welded on the side corresponding to the front cover 4, that is, the opposite side to the control circuit, so that it is possible to inhibit residue at the time of welding from adhering to circuits or the like of the control circuit in the housing box 5.

(2) The receiving terminals T1u, T1v, and T1w as well as T2u, T2v, and T2w provided on the side corresponding to the rear cover 3a are disposed to the respective positions that are third innermost in the slots S radially. Therefore, the leads L1u, L1v, and L1w as well as L2u, L2v, and L2w axially drawn out from the receiving terminals T1u, T1v, and T1w as well as T2u, T2v, and T2w externally face the circuit board 21 mounted with the components of the control circuit in the housing box 5. Accordingly, it is possible to dispose the output terminals O1u, O1v, and O1w as well as O2u, O2v, and O2w to the outside of the circuit board 21 to mount the circuit components inside the circuit board 21, thereby reducing the overall size of the brushless motor 1 having the control circuit.

(3) The welding members B1 and B2 each of which interconnects the distal ends of the segments SG continuous in the circumferential direction of the stator 6 disposed on the side corresponding to the front cover 4 have the same axial length. Therefore, it is possible to reduce the clearance between the front cover 4 and each of the welding members B1 and B2, which interconnect the respective distal ends of the segments SG forming the SC coil, thereby reducing the size of the brushless motor 1 axially.

The segments SG have the same height of the welding portions, to eliminate the need of axial movement in welding, thereby performing welding in a short lapse of time.

(4) At a position that is inside the rear cover 3a of the tubular housing 3 and faces the neutral lines L1n and L2n, the first and second housing recesses 18 and 19 are formed respectively. The recesses 18 and 19 have a space to permit the neutral lines L1n and L2n to stand between. It enables the first and second housing recesses 18 and 19 to axially absorb the neutral lines L1n and L2n extending toward the rear cover 3a, thereby reducing the axial size of the motor by the corresponding amount.

(5) The first and second through holes H1 and H2 are formed at portions that are in the first and second housing recesses 18 and 19 and face the receiving terminals T1u, T1v, and T1w as well as T2u, T2v, and T2w of the first and second system three-phase coils formed adjacent to the neutral lines L1n and L2n, respectively. Therefore, the first and second through holes H1 and H2 only need to have minimum required sizes to permit the leads L1u, L1v, and L1w as well as L2u, L2v, and L2w to pass through, respectively. Accordingly, it is possible to inhibit foreign matter from traversing between the motor case 2 and the housing box 5, that is, relative movement between them.

(6) As for the adjacent segments SG for each phase of the first system three-phase Y-connection coil, the coupling conductor portion OSc of the wave-winding outer conductor OS is separated from the coupling conductor portion ISc of the lap-winding inner conductor IS, to electrically interconnect the split end continuous to the fourth conductor portion OSo of the outer conductor OS and the split end continuous to the second conductor portion ISi of the inner conductor IS.

In this case, the split ends continuous to the third conductor portion ISo of the inner conductor IS are set as the receiving terminals T1u, T1v, and T1w for each phase, while the split ends continuous to the first conductor portion OSi of the outer conductor OS are set as the neutral point terminals T0u, T0v, and T0w for each phase. It enables disposing the receiving terminals T1u, T1v, and T1w for each phase radially outside of the neutral point terminals T0u, T0v, and T0w.

Therefore, when the receiving terminals T1u, T1v, and T1w for each phase are axially drawn out by the leads L1u, L1v, and L1w, the leads L1u, L1v, and L1w never intersect with the neutral line L1n that interconnect the neutral point terminals T0u, T0v, and T0w for each phase. As a result, the axial length of the brushless motor 1 can be reduced correspondingly because of not intersecting with the neutral line L1n interconnecting the neutral point terminals T0u, T0v, and T0w, thereby saving on space for the brushless motor 1 and reducing resistance losses.

(7) As for the adjacent segments SG for each phase of the second system three-phase Y-connection coil, the coupling conductor portion OSc of the wave-winding outer conductor OS is separated from the coupling conductor portion ISc of the lap-winding inner conductor IS, to electrically interconnect the split end continuous to the fourth conductor portion OSo of the outer conductor OS and the split end continuous to the second conductor portion ISi of the inner conductor IS.

In this case, the split ends continuous to the third conductor portion ISo of the inner conductor IS are set as the receiving terminals T2u, T2v, and T2w for each phase, while the split ends continuous to the first conductor portion OSi of the outer conductor OS are set as the neutral point terminals T0ua, T0va, and T0wa for each phase. It enables disposing the receiving terminals T2u, T2v, and T2w for each phase radially outside of the neutral point terminals T0ua, T0va, and T0wa.

Therefore, when the receiving terminals T2u, T2v, and T2w for each phase are axially drawn out by the leads L2u, L2v, and L2w, the leads L2u, L2v, and L2w never intersect with the neutral line L2n that interconnect the neutral point terminals T0ua, T0va, and T0wa for each phase. As a result, the axial length of the brushless motor 1 can be reduced correspondingly because of not intersecting with the neutral line L2n interconnecting the neutral point terminals T0ua, T0va, and T0wa, thereby saving on space for the brushless motor 1 and reducing resistance losses.

The following will describe a second embodiment of the present invention with reference to the drawings. Identical reference numerals are given to identical components with the first embodiment, and detailed description on the identical components will not be repeated.

Figure 21:
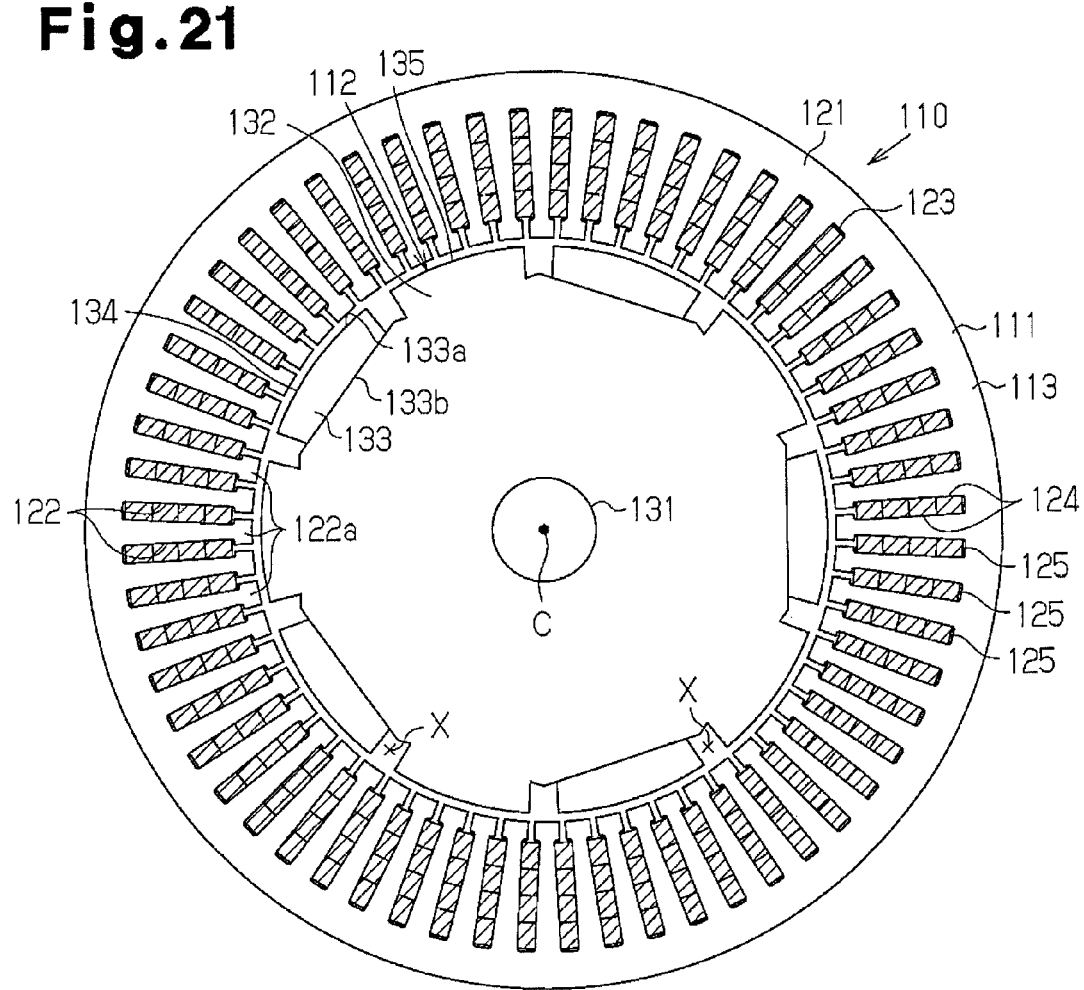
FIG. 21 is an outlined diagram of a motor according to a second embodiment.

As shown in FIG. 21, a motor 110 of the present embodiment includes a substantially annular stator 111 and a rotor 112 disposed radially inside the stator 111.

As shown in FIG. 21, the stator 111 includes a stator core 113. The stator core 113 has a cylinder portion 121 and a plurality of (sixty in the present embodiment) teeth 122 circumferentially provided in such a manner as to extend radially inward from the cylinder portion 121 radially inward. The stator core 113 includes a stack member in which metallic plate-shaped members having a high magnetic permeability are axially stacked. Between a pair of the adjacent teeth 122, a slot is formed. Through the slot, a segment coil 123 for generating a magnetic field for rotating the rotor 112 is inserted. The slot is radially rectangular in cross-sectional shape as viewed in the axial direction. The number (sixty in the present embodiment) of the slots is the same as that of the teeth 122. Between the tooth 122 and the segment coil 123, an insulator (not shown) is interposed.

The segment coil 123 is substantially rectangular in cross-sectional shape and of multi-phase (three-phase in the present embodiment) distributed coil. The segment coil 123 has a plurality of segment conductors 125 each of which is composed of a substantially U-shaped conductor plate formed by the bending process. Each segment conductor 125 includes slot insertion portions 124 disposed in the slot in such a manner as to pass through the stator core 113 axially (orthogonally with respect to the paper) and a slot projecting portion (not shown) projecting from the slot axially. Each pair of the slot insertion portions 124 in each of the segment conductors 125 correspond to a portion of U-shaped parallel straight lines and are respectively disposed in the two slots separated from each other over the plurality of (six, for example) teeth 122 circumferentially. Each pair of the slot insertion portions 124 of each of the segment conductors 125 correspond to U-shaped two end portions. The segment conductors 125 of each phase are electrically interconnected circumferentially at the slot projecting portion.

The rotor 112 includes a rotary shaft 131 and a substantially annular rotor core 132 made of a magnetic metal material fixed to an outer circumferential surface of the rotary shaft 131. On an outer circumferential portion of the rotor core 132, a plurality of (five in the present embodiment) magnets 133 are disposed at equal intervals circumferentially, each of which has its outer circumferential side the north-pole side. Those north-pole magnets 133 form a magnet magnetic pole portions 134. The magnets 133 are disposed so that their longitudinal directions intersect orthogonally with the radial direction as viewed in the axial direction of the rotor 112. The radially outer portion of the magnet 133 may be of the south pole.

Between the adjacent magnet magnetic pole portions 134, a core magnetic pole portion 135 integrally formed onto the rotor core 132 is disposed with a void X having a constant area between itself and each of them as viewed axially.

The magnets 133 (magnet magnetic pole portion 134) and the core magnetic pole portions 135 are alternately disposed at substantially equal angular intervals (in this case, the magnets 133 (magnet magnetic pole portions 134) and the core magnetic pole portions 135 are disposed on the mutually opposite sides with an angular interval of 180 degrees). Therefore, the rotor 112 has a consequent-pole type structure having ten poles in which each core magnetic pole portion 135 functions as the south pole with respect to the magnet 133 (magnet magnetic pole portion 134) whose radial outer is of the north pole. The number of the pole pairs of the rotor 112 is the same as the number of the magnets 133, five in the present embodiment. The number of the teeth 122 over which each segment conductor 125 stretches is determined by the number of the slots/the number of the magnetic poles.

In the stator 111 of the present embodiment, assuming the number of the magnets 133 (magnet magnetic poles 134) (number of the pole pairs) of the rotor 112 to be p (p: 2 or larger integer) and the number of phases of the segment coil 123 to be m, the total number L of the teeth 122 satisfies the following expression:

$$L = 2 \times p \times m \times n \ (n: \text{positive integer})$$

In the present embodiment, the number (p) of pole pairs of the rotor 112 is five, the number (m) of phases of the segment coil 123 is three, and n is two, so that based on this expression, the total number L of the teeth 122 is set as $L = 2 \times 5 \times 3 \times 2 = 60$.

Each magnet 133 is substantially shaped like a rectangular prism and has a curved outer face 133a and a flat inner face 133b. Each outer face 133a is shaped like an arc around an axis C and radially faces a radial inner end portion of the tooth 122, that is, a distal end 122a (inner site in the radial direction). The distal end 122a extends circumferentially within a predetermined opening angle around the axis C. Each of the inner faces 133b is fixed to a fixing face of the rotor core 132 provided between itself and the adjacent core magnetic pole portion 135, while between the magnet 133 and the adjacent core magnetic pole portion 135, a void X is provided circumferentially.

The core magnetic pole portion 135 is substantially shaped like a fan projecting radially outward. The core magnetic pole portion 135 has a curved radial outer face.

The motor 110 of the present embodiment includes the rotor 112 having a so-called consequent-pole type structure in which the core magnetic pole portion 135 of the rotor core 132 functions as a magnetic pole and the stator 111 having the segment coil 123 composed of the plurality of segment conductors 125. The segment coil 123 has a higher occupancy ratio than a coil obtained by coil a continuous cable around teeth by the conventional technology and, therefore, is capable of providing high power of the motor. Accordingly, by making the rotor 112 to be of the consequent-pole type, it is possible to provide high power by providing the stator 111 coil as a segment coil while saving materials and reducing costs by suppressing the number of the magnets 133.

Next, a description will be given in detail of the opening angle of the magnetic pole portions 134 and 135, which are characteristic portions of the motor 110 of the present embodiment.

Figure 22:
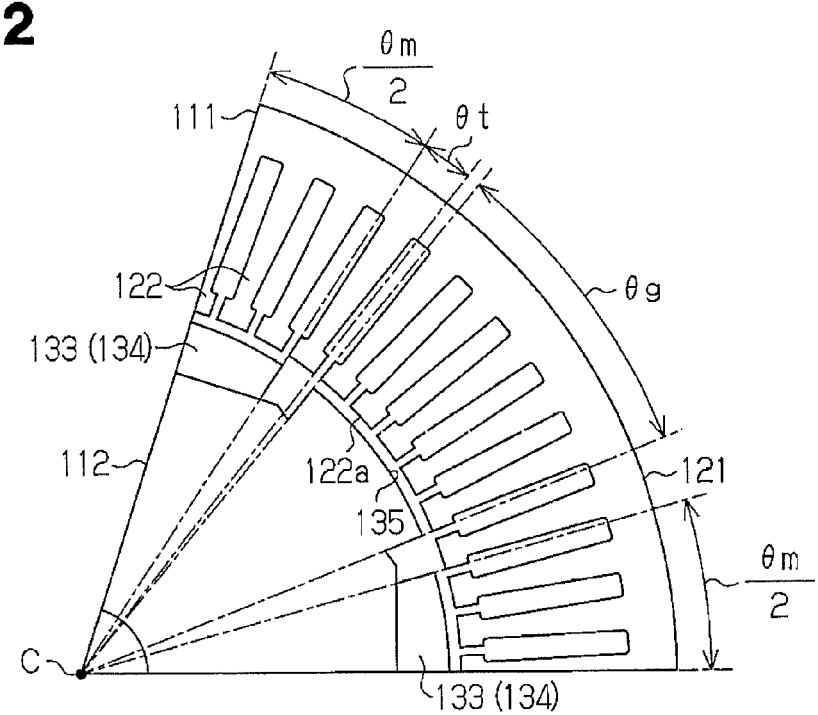
FIG. 22 is a plan view showing part of the motor in FIG. 21.
Figure 23:
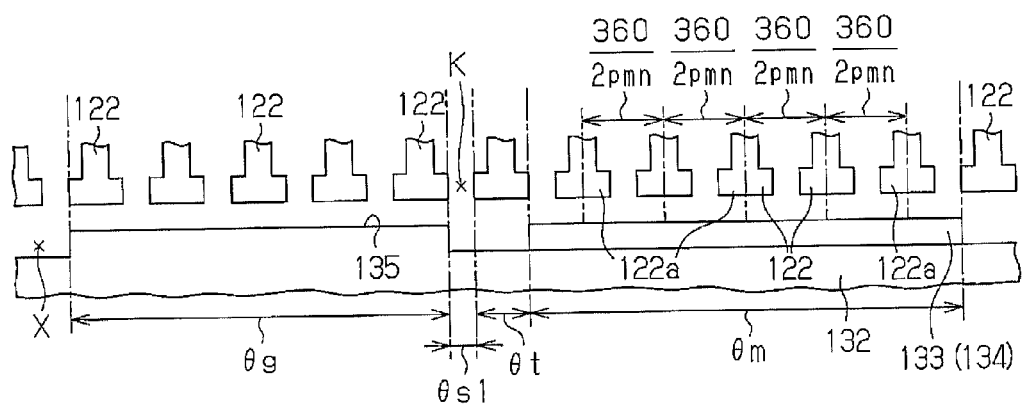
FIG. 23 is an explanatory schematic diagram of a relationship between a tooth and each magnetic pole in the motor in FIG. 21.

As shown in FIGS. 22 and 23, the opening angle θg of each core magnetic pole portion 135 around the axis C is set different from the opening angle θm of each magnet magnetic pole portion 134 around the axis C.

Specifically, assuming the number of the teeth facing the magnet radially to be a and the opening angle of the tooth 122 to be θt, they are set by Expressions (1) and (2) respectively as follows:

$$\theta m = 360/2\ pm \times (a+1) - (\theta t/2) \times 2 \qquad (1)$$

$$\theta g = \theta m - (360/2\ pm - \theta t) \times 2 \qquad (2)$$

In the present embodiment, each magnet 133 (magnet magnetic pole portion 134) always faces at least five teeth 122, so that the right side of Expression (1) becomes 360/2 pmn×(5+1)−(θt/2)×2. In this case, 360/2 pmn is equal to an angle obtained by adding the opening angle θt of the tooth 122 to an opening angle θs1 between adjacent two teeth 122 (void X) around the axis C circumferentially. Accordingly, as shown in FIG. 23, the opening angle θm of each magnet magnetic pole portion 134 is equal to an angle obtained by subtracting (θt/2)×2 from a sum of the opening angle θt of the six teeth 122 and the six opening angles θs1. The opening angle θg of the core magnetic pole portion 135 is equal to an angle obtained by subtracting (θs1×2) from the opening angle θm. As a result, the circumferential positions of the two ends of each magnet 133 (magnet magnetic pole portion 134) and those of the two ends of the core magnetic pole portion 135 shift relative to the circumferential positions of the mutually facing teeth 122. Further, the circumferential positions of the two ends of each magnet 133 (magnet magnetic pole portion 134) and those of the two ends of the core magnetic pole portion 135 shift relative to the circumferential position of the void K (see FIG. 23) between the mutually facing teeth 122.

Figure 24:
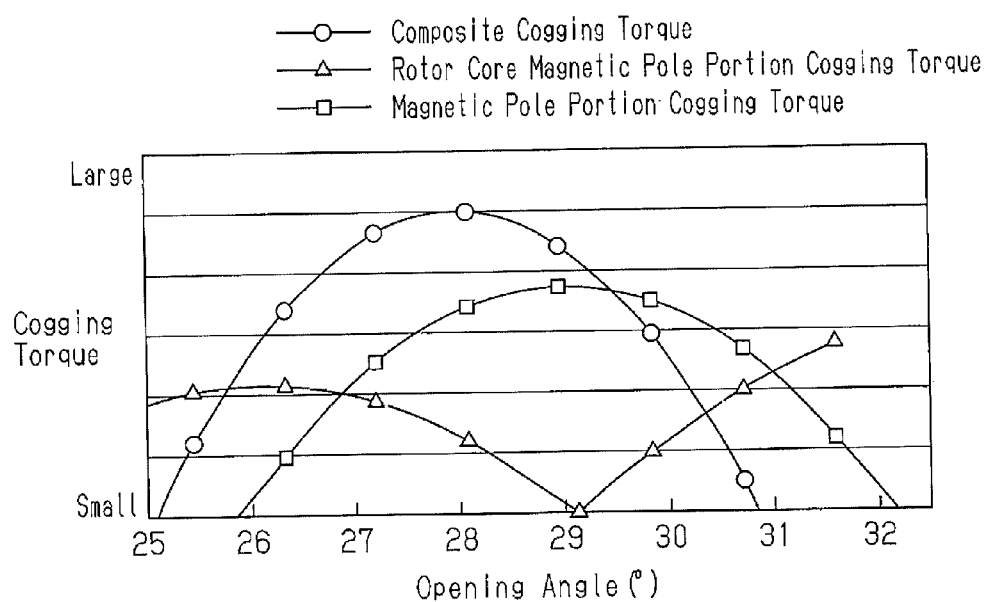
FIG. 24 is an explanatory characteristic graph of cogging torque in the motor in FIG. 21.

By setting the opening angles θm and θg of the respective magnetic pole portions 134 and 135 by using Expressions (1) and (2) so that they are different from each other, the cogging torque values that may possibly be generated by the respective magnetic pole portions 134 and 135 become different from each other as shown in FIG. 24. Therefore, it is possible to suppress a composite value of those cogging torque values. In the present embodiment, in such a manner, the composite cogging torque contributing to the vibrations of the rotor 112 at the time of rotation is suppressed, to improve the rotation performance of the rotor 112.

Besides the advantages (1) through (7) of the first embodiment, the second embodiment will provide the following advantages.

(8) In the rotor 112, the opening angle θm of each magnet 133 (magnet magnetic pole portion 134) and the opening angle θg of each core magnetic pole portion 135 are different from each other. Since the rotor 112 has the consequent-pole (half-magnet) type structure, it is possible to decrease the number of the magnets as compared to the rotor having a full-magnet type structure in which a magnet is disposed all over the circumference. The core magnetic pole portion 135 is integrally formed with the rotor core 132, the shape of which rotor core 132 can be changed relatively easily. Accordingly, in the rotor 112 of the second embodiment, by changing the shape including, for example, the opening angle θg of the core magnetic pole portion 135 so that the magnetic pole portions 134 and 135 produce different cogging torque values, the composite cogging torque of them can be suppressed.

(9) The opening angle θm of each magnet 133 (magnet magnetic pole portion 134) and the opening angle θg of the core magnetic pole portion 135 are set to θm=360/2 pm×(a+1)−(θt/2)×2 and θg=θm−(360/2 pm−θt)×2, respectively. This causes the magnetic pole portions 134 and 135 to possibly produce the different cogging torque values as shown in FIG. 3, thereby enabling suppressing the composite cogging torque of the motor 110 as a whole.

(10) The circumferential positions of the two ends of each magnet 133 (magnet magnetic pole portion 134) and those of the two ends of the core magnetic pole portion 135 shift relative to the circumferential position of the mutually facing teeth 122. That is, the opening angle θm of the magnet 133 and the opening angle θg of the core magnetic pole portion 135 are set so that the circumferential positional relationship of the circumferential two ends of the magnet 133 with respect to the teeth 122 is different from the circumferential positional relationship of the circumferential two ends of the core magnetic pole portion 135 with respect to the teeth 122. Furthermore, the circumferential positions of the two ends of each magnet 133 (magnetic pole portion 134) and the circumferential positions of the two ends of the core magnetic pole portion 135 shift relative to the circumferential position of the void K between the mutually facing teeth 122. That is, the opening angle θm of the magnet 133 and the opening angle θg of the core magnetic pole portion 135 are set so that the circumferential positional relationship of the circumferential two ends of the magnet 133 with respect to the void K between each circumferentially adjacent pair of the teeth 122 is different from the circumferential positional relationship of the circumferential two ends of the core magnetic pole portion 135 with respect to the void K between each circumferentially adjacent pair of the teeth 122. This inhibits synchronization between generation of the cogging torque by the magnet 133 and that by the core magnetic pole portion 135, thereby enabling suppressing the composite cogging torque.

The second embodiment may be modified as follows.

Figure 26:
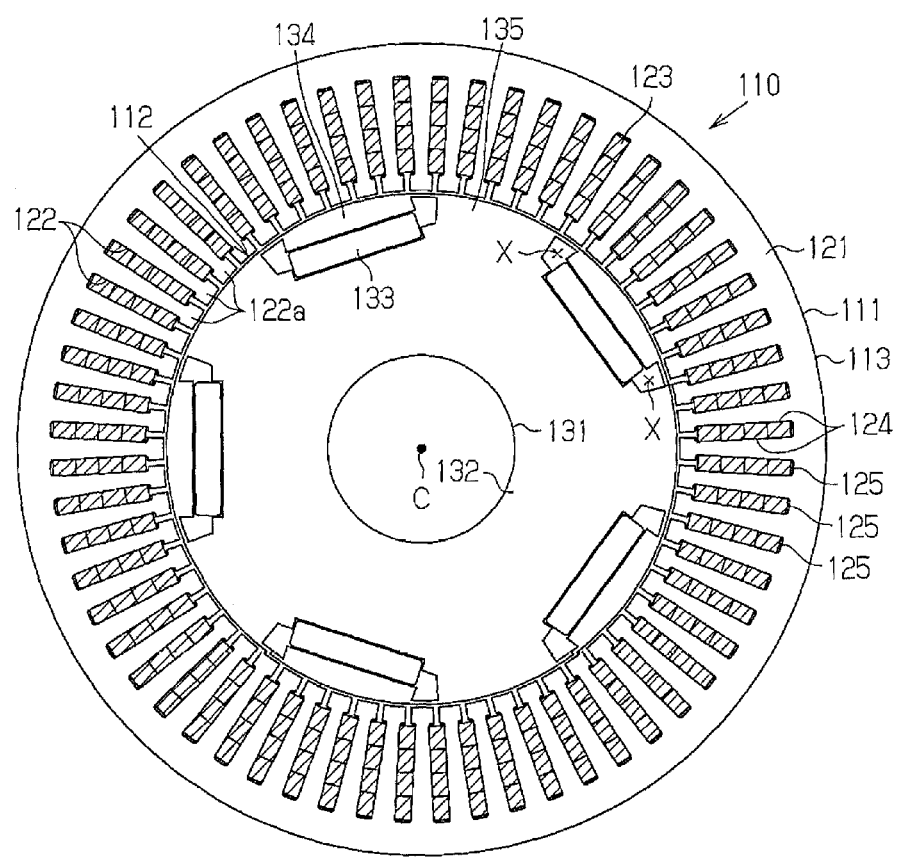
FIG. 26 is an outlined diagram of a motor according to a modification.
Figure 27:
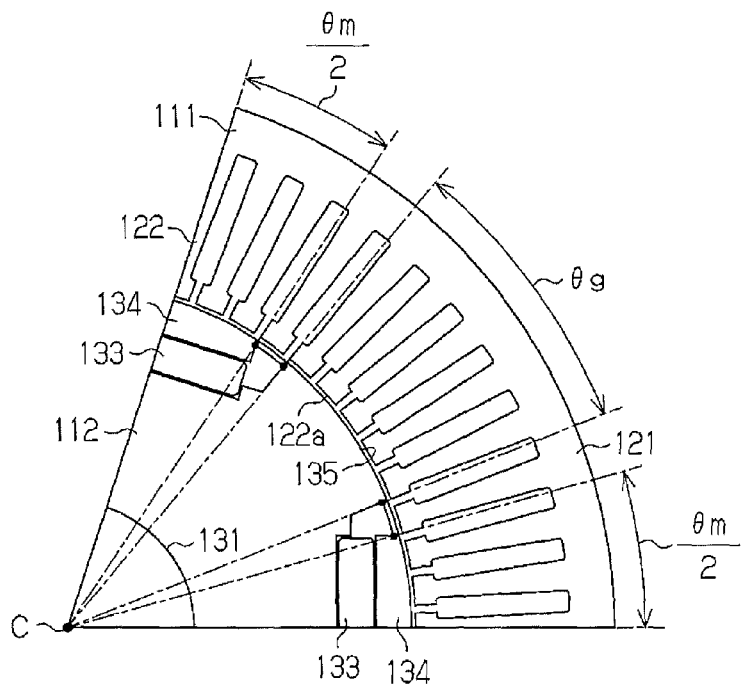
FIG. 27 is a plan view showing part of the motor according to a modification.

In the second embodiment, the motor 110 has the so-called SPM structure in which the magnet 133 will be fixed to the outer surface (outer circumferential surface) of the rotor core 132. The present invention is not limited to this arrangement; the motor 110 may be of a so-called IPM structure in which the magnet 133 is embedded into the rotor core 132 as shown in FIGS. 26 and 27, for example. Even in this case, it is desirable that the opening angle θg of the core magnetic pole portion 135 and the opening angle θm of the magnet magnetic pole portion 134 be different from each other.

In the second embodiment, the opening angle θg of the core magnetic pole portion 135 is set using Expression (2). The present invention is not limited to it; for example, the opening angle θg of the core magnetic pole portion 135 may be set with, for example, the following Expression (3):

$$\theta g = \theta m - (360/2\ pmn - \theta t) \times 2 \times b \qquad (3)$$

where $0 < b < 1$

The coefficient b in Expression (3) denotes a change in opening angle that accompanies a change in outer diameter of the core magnetic pole portion 135. The value of the coefficient b becomes smaller as the outer diameter of the core magnetic pole portion 135 becomes smaller, and is equal to 1 (b=1) if the core magnetic pole portion 135 has the same outer diameter as the magnet magnetic pole portions 134.

Figure 25:
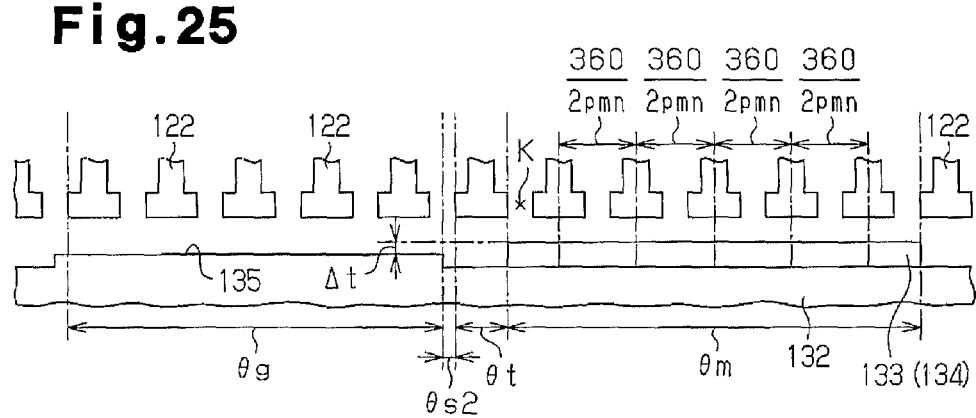
FIG. 25 is an explanatory schematic diagram of a relationship between the tooth and each magnetic pole portion according to a modification.

Accordingly, it is possible to accommodate the case of, for example, making the outer diameter (radial length) of the magnet magnetic pole portions 134 smaller than that of the core magnetic pole portions 135 by Δt as shown in FIG. 25. Correspondingly, the opening angle θg of the core magnetic pole portion 135 is set larger by the amount corresponding to the difference between the above-described opening angle θs1 and an opening angle θs2 shown in FIG. 25. By thus making the outer diameter of the core magnetic pole portion 135 larger, it is possible to inhibit radial excitation force contributing to vibrations and give proper balance between the permeance of the magnetic pole portions 134 and that of the magnetic pole portions 135 as compared to a case where the core magnetic pole portions 135 and the magnet magnetic pole portions 134 have the same outer diameter.

Although the second embodiment has set the opening angles θm and θg of the respective magnetic pole portions 134 and 135 in Expressions (1) and (2), the present invention is not limited to it; the opening angles θm and θg of the respective magnetic pole portions 134 and 135 may be set as follows.

Figure 28:
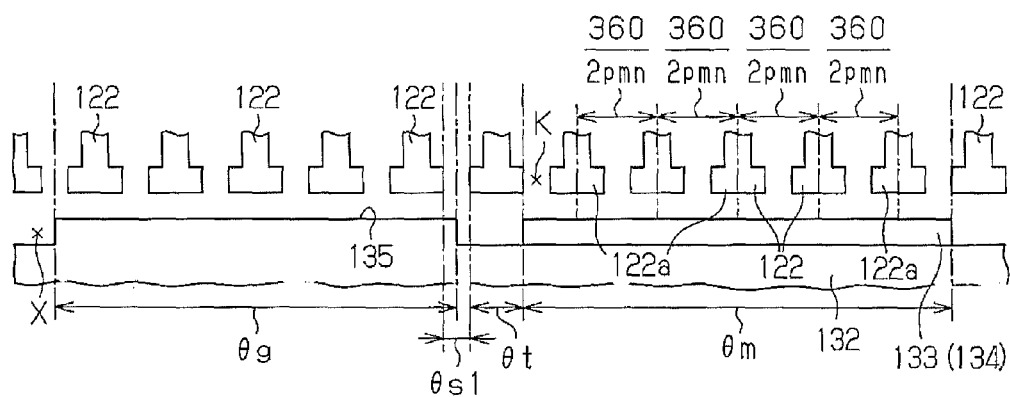
FIG. 28 is an explanatory schematic diagram of a relationship between a tooth and each magnetic pole portion according to a modification.

As shown in FIG. 28, the circumferential width (opening angle θg) of the core magnetic pole portion 135 may be increased in each of both of the circumferential directions (circumferentially outward) by about a half of the opening angle θs1. Accordingly, the opening angle θg of each core magnetic pole portion 135 can be made different from the opening angle θm of each magnet magnetic pole portion 134 so that the circumferential positions of the two ends of each core magnetic pole portion 135 and those of each magnet magnetic pole portion 134 may shift with respect to the circumferential position of the void K. It avoids generation of the cogging torque by each magnetic pole portion 134 and that by the magnetic pole portions 135 from being synchronized with each other, thereby enabling suppressing the cogging torque of each of the magnetic pole portions 134 and 135.

Figure 29:
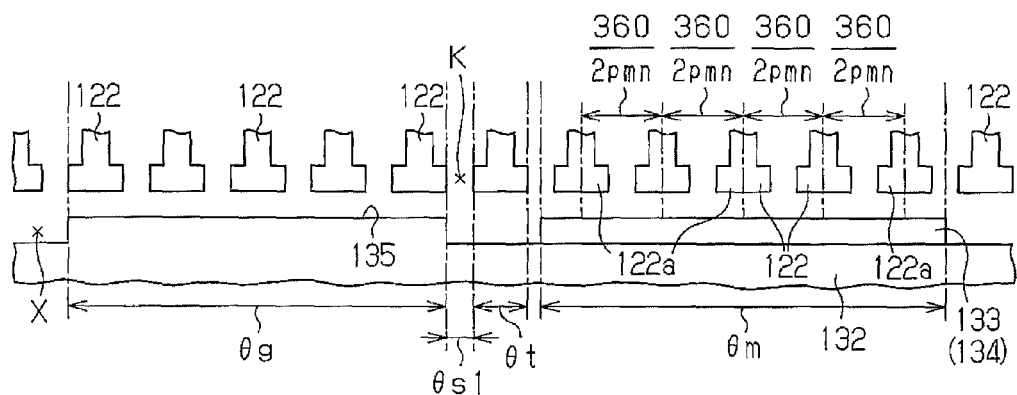
FIG. 29 is another explanatory schematic diagram of the relationship between a tooth and each magnetic pole portion according to a modification.

Further, as shown in FIG. 29, the circumferential width (opening angle θm) of each magnet magnetic pole portion 134 (magnet 133) may be decreased inward in each of both of the circumferential directions by about a half of the opening angle θs1. Accordingly, the opening angle θg of each core magnetic pole portion 135 can be made different from the opening angle θm of each magnet magnetic pole portion 134 so that the circumferential positions of the two ends of each core magnetic pole portion 135 and those of each magnet magnetic pole portion 134 may shift with respect to the circumferential position of the void K. It avoids generation of the cogging torque by the magnetic pole portions 134 and that by the magnetic pole portions 135 from being synchronized with each other, thereby enabling suppressing the cogging torque of each of the magnetic pole portions 134 and 135.

Figure 30:
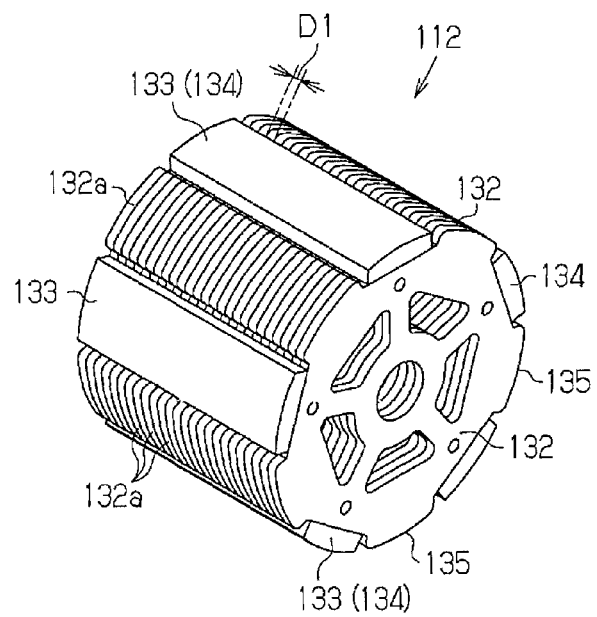
FIG. 30 is a perspective view of a rotor according to a modification.
Figure 31:
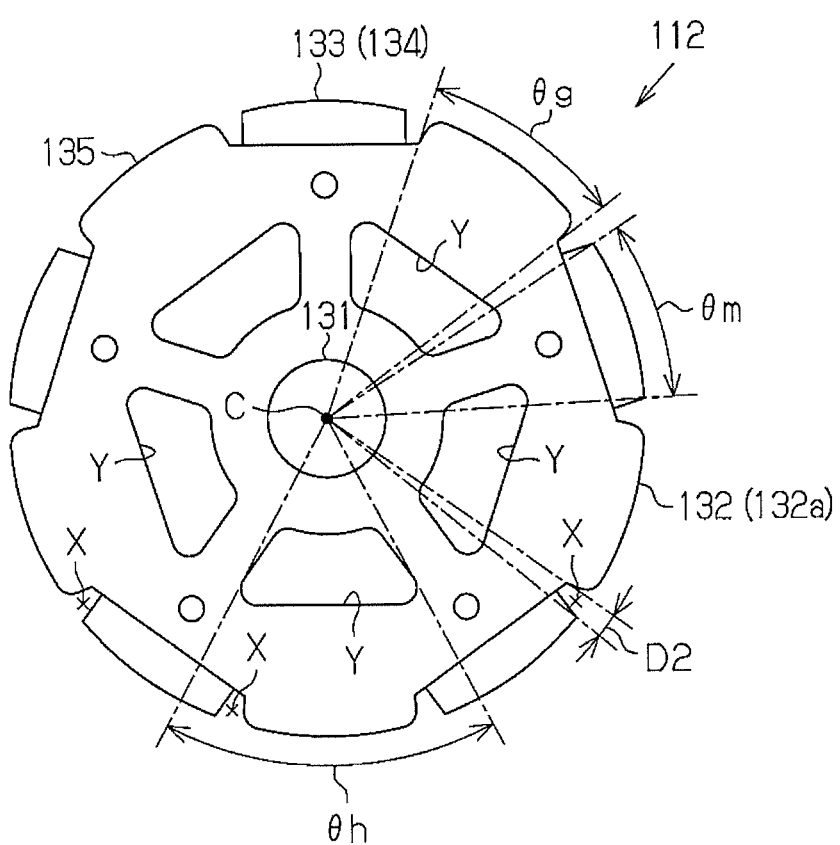
FIG. 31 is a plan view of the rotor according to a modification.

In the second embodiment, although not referred to in particular, for example, as shown in FIGS. 30 and 31, the rotor core 132 of the rotor 112 may be formed by stacking rotor core pieces 132a (rotor core material) made of a steel plate with a thickness of D1 on top of one another. In contrast to the rotor 112 having the consequent-pole type structure subject to occurrence of magnetic variations in the rotor 112, the rotor core 132 of the stack type can suppress eddy current losses accompanying magnetic variations.

Further, as shown in FIGS. 30 and 31, a void Y (small-magnetism and light-weight portion) may be formed in the rotor core 132. By forming the void Y in the rotor core 132 in such a manner, the rotor 112 can be reduced in weight, thereby improving the mobility of the rotor 112 at the time of rotation.

Further, by forming the void Y behind (radially inward of) the magnetic pole portions 134 and 135, it is possible to make difficult the flow of the magnetic flux of the magnetic pole portions 134 and 135 toward the rotary shaft 131, that is, in a direction away from these magnetic pole portions 134 and 135. Accordingly, it is possible to suppress magnetic variations to further reduce the cogging torque. Besides, the eddy current can be suppressed from occurring on the rotor core 132, thereby providing a high-efficiency (high-power) motor. Moreover, the high-power performance enables reducing the size per unit power output of the motor 110.

Further, as shown in FIGS. 30 and 31, the opening angle θh (circumferential width) of the void Y as the small-magnetism and light-weight portion with respect to the axis C may be set larger than the opening angle θg of the core magnetic pole portion 135. Also, the circumferential opening angle θh of each void Y may be set larger than the opening angle θm of each magnet magnetic pole portion 134 (magnet 133). By setting the circumferential opening angle θh of the void Y larger than the opening angle θg of the core magnetic pole portion 135, it is possible to reduce the circumferential width of the rotor core 132 between the circumferentially disposed voids Y as much as possible. It makes difficult the flow of the magnetic flux from the magnets 133 (magnet magnetic pole portions 134) toward the rotary shaft 131 as a fixation member to fix the rotor core 132, thereby enabling suitably concentrating the magnetic flux to the core magnetic pole portion 135. As a result, the magnetic balance between the magnet 133 and the core magnetic pole portion 135, which are alternately formed in the circumferential direction of the rotor 112, is improved, thereby reducing the togging torque, the noise, and the vibrations and increasing the power. Moreover, the increased power enables reducing the size per unit power output of the motor.

Further, in the rotor 112 of the stack type that a plurality of the rotor core pieces 132a such as shown in FIG. 30 are stacked, a circumferential width D2 of the void X between the magnetic pole portions 134 and 135 may be made larger than the thickness D1 of the rotor core pieces 132a of the rotor core 132. It enables suppressing disturbance in magnetism in the axial direction, thereby improving the flow of magnetism.

Although the rotor 112 is of the inner-rotor type that it would be disposed inside the stator 111 radially in the motor 110 of the second embodiment, the rotor 112 may be of a so-called outer-rotor type in which it would be disposed radially outside of the stator.

Although the present invention is applied to the second embodiment assuming that n=2, the number n may be changed arbitrarily.

The following will describe a third embodiment of the present invention with reference to the drawings. Identical reference numerals are given to identical components with the first embodiment, and detailed description on the identical components will not be repeated.

Figure 32:
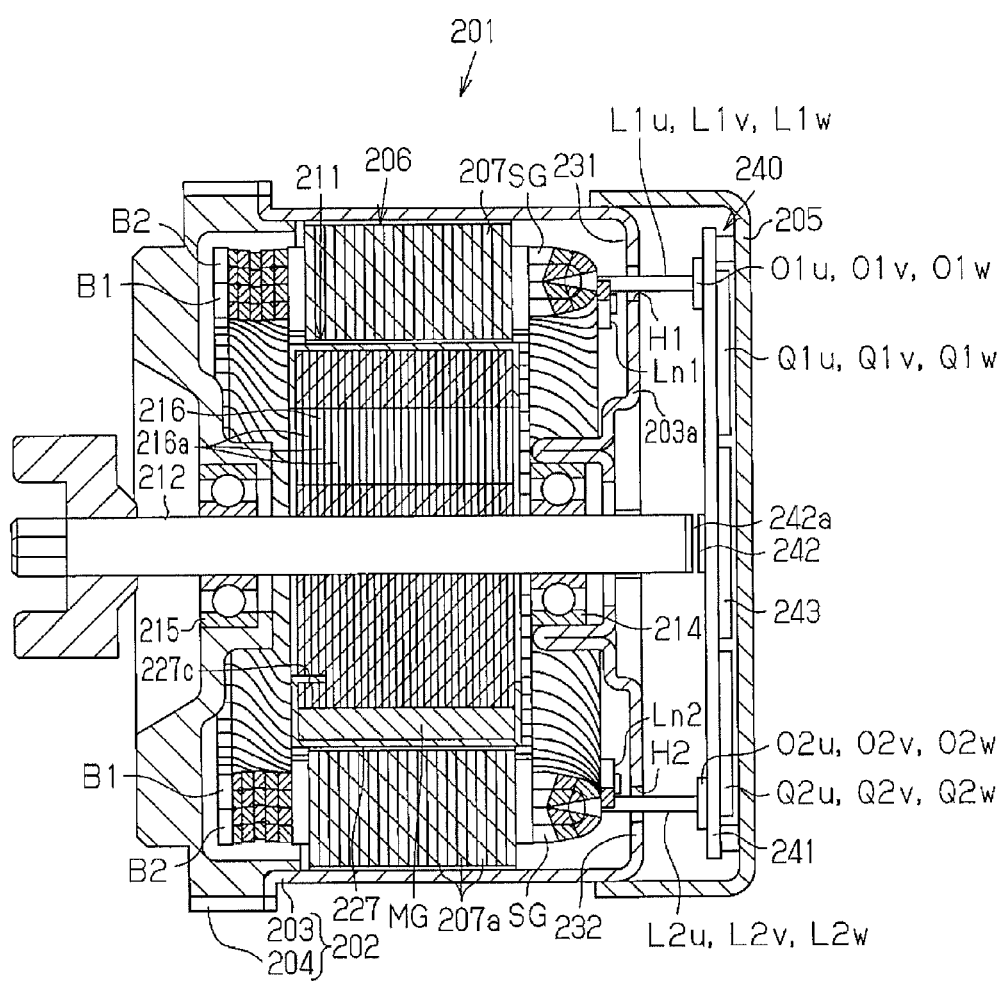
FIG. 32 is a cross-sectional view of a brushless motor according to a third embodiment.

As shown in FIG. 32, a rotor 211 is fixed to a rotary shaft 212 through insertion. The rotary shaft 212 is made of non-magnetic metal in the present embodiment.

A rotor core 216 of the rotor 211 is formed by stacking a plurality of rotor core pieces 216a each of which is made of a steel plate as shown in FIGS. 32 to 36.

Figure 36:
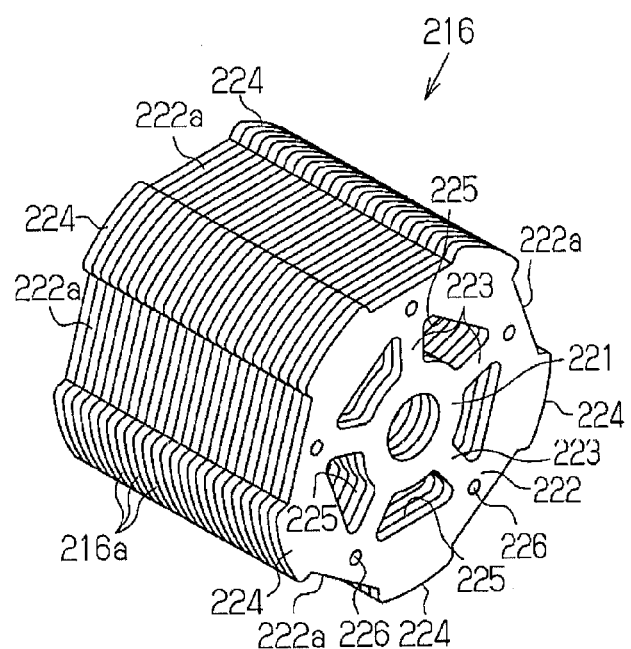
FIG. 36 is an explanatory perspective view of a rotor core in FIG. 35.
Figure 37:
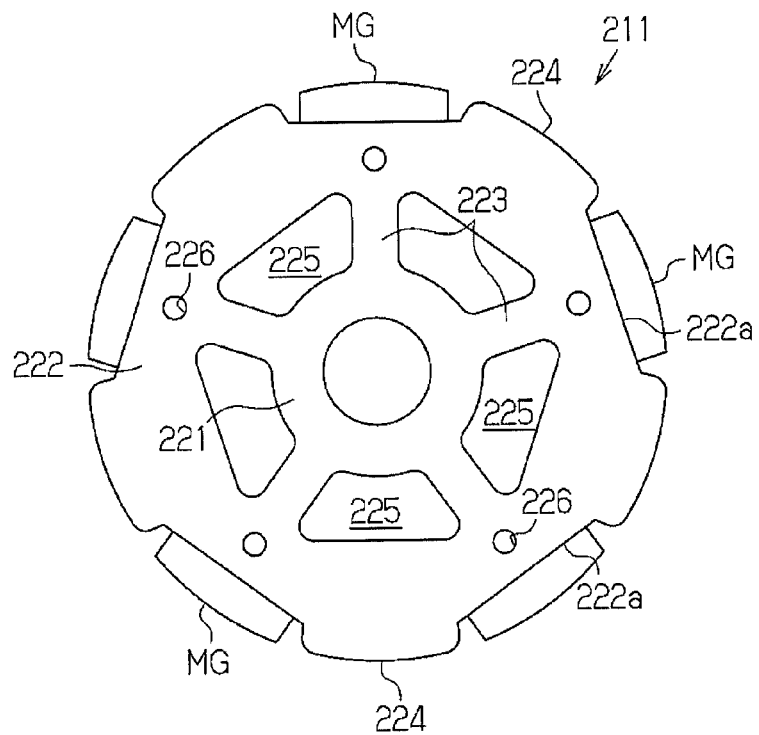
FIG. 37 is a front view of the rotor core in FIG. 35 as viewed axially.

As shown in FIG. 36, the rotor core 216 has a shaft-fixed tube portion 221, which is formed like a cylinder and fixed to the rotary shaft 212, a magnet-fixed tube portion 222, which is formed like a cylinder and includes the outer circumferential surface of the shaft-fixed tube portion 221 with a constant distance between them, and bridging portions 223, which couple and hold the shaft-fixed tube portion 221 and the magnet-fixed tube portion 222 with a constant distance between them.

In the outer circumferential surface of the magnet-fixed tube portion 222, circumferentially, five fan-shaped recesses 222a are formed axially at equal angular intervals. By forming the fan-shaped recesses 222a, five salient poles 224 are formed between the recesses 222a.

Figure 35:
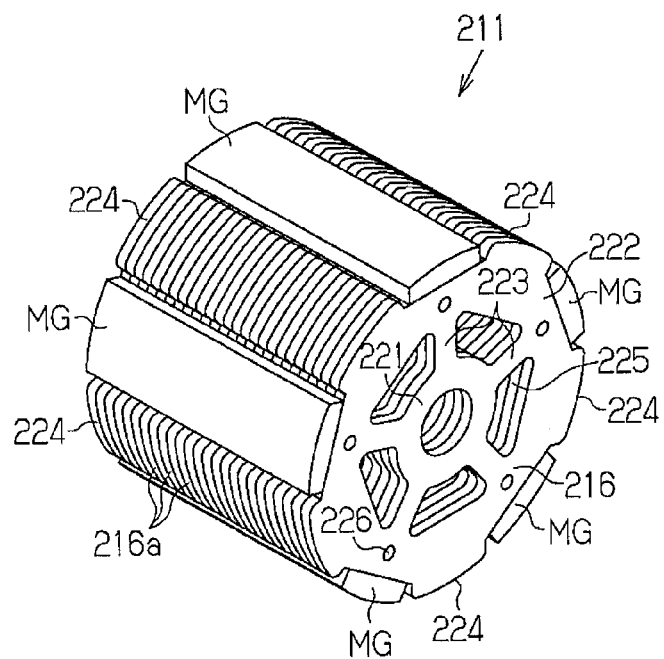
FIG. 35 is an explanatory perspective view of a rotor in FIG. 34.

As shown in FIG. 35, a magnet MG is fixed to each of the recesses 222a formed at the equal intervals circumferentially. Each of the five magnets MG is disposed on the rotor core 216 so that its outer (stator side) surface may provide the south pole (first magnetic pole) radially and its inner may provide the north pole (second magnetic pole) radially. As a result, the outer surface (stator surface) of each circumferentially adjacent pair of the salient poles 224 of the magnets MG provides the north pole, which is different from the outer surface of the magnets MG.

Figure 34:
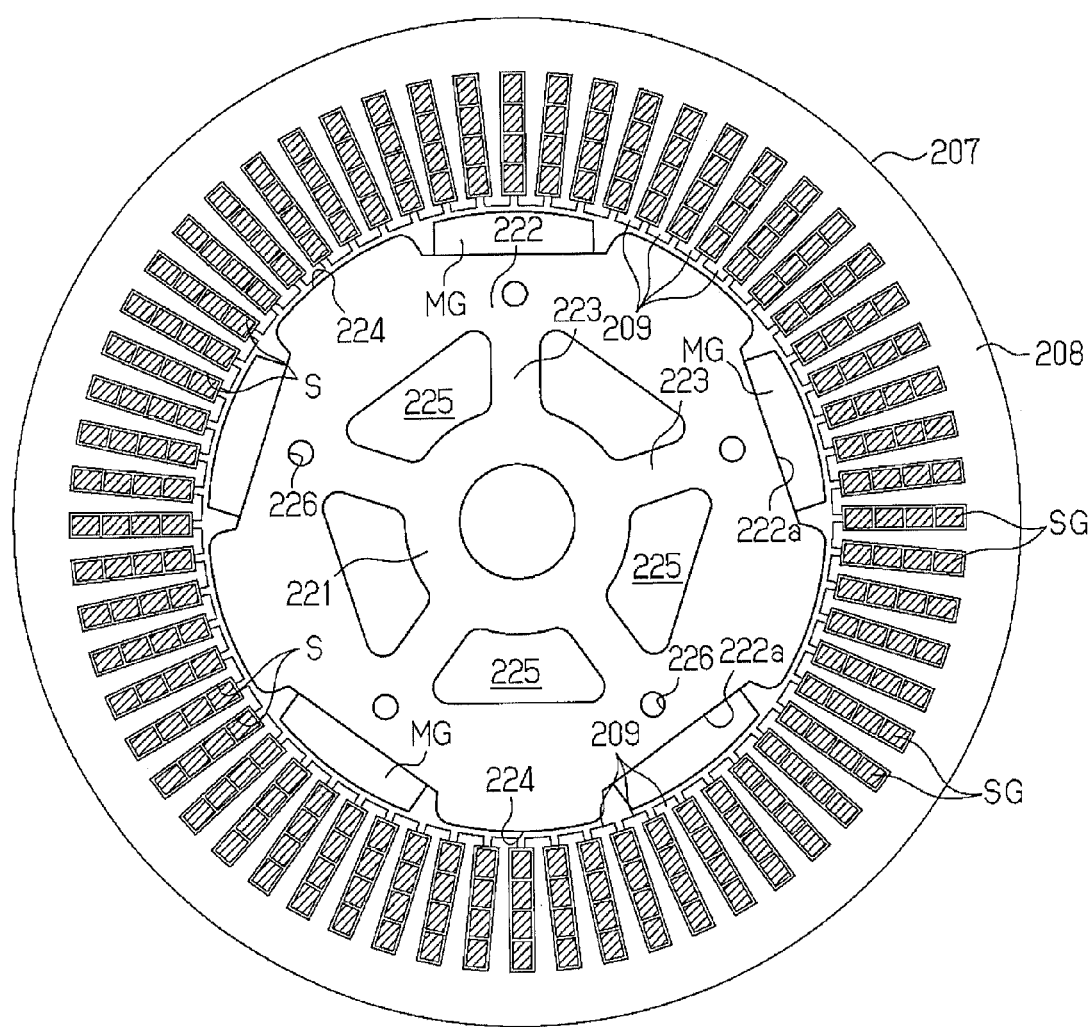
FIG. 34 is a front view of the stator and the rotor in FIG. 32 as viewed axially.

In the stator 206 for the rotor 211 of the present embodiment as shown in FIG. 34, assuming the number of the magnets MG (the number of pole pairs) of the rotor 211 to be p (p: two or larger integer) and the number of phases of an SC coil to be m, a total number Z of teeth 209 satisfies the following expression:

$Z=2 \times p \times m \times n$ (n: positive integer)

In the present embodiment, the number (p) of pole pairs of the rotor 211 is five, the number (m) of phases of the SC coil is three, and n is two, so that based on this expression, the total number Z of the teeth 209 is set as $Z=2 \times 5 \times 3 \times 2=60$.

The five bridging portions 223 are provided to couple and hold the shaft-fixed tube portion 221 and the magnet-fixed tube portion 222 and each extends radially from the outer surface of the shaft-fixed tube portion 221 to be coupled to the inner surface of the magnet-fixed tube portion 222. The five bridging portions 223 are disposed circumferentially at equal intervals and formed to extend in the axial direction.

Each bridging portion 223 and the inner surface of the magnet-fixed tube portion 222 are coupled to each other at a position facing the recess 222a where a magnet MG is fixed through fitting. Moreover, the radially extending central axis of each bridging portion 223 orthogonally intersects at the central position of the circumferential width of the corresponding magnet MG.

Therefore, a space formed between the outer surface of the shaft-fixed tube portion 221 and the inner surface of the magnet-fixed tube portion 222 is subdivided into five spaces by the five bridging portions 223 disposed at equal intervals circumferentially, thereby forming five voids 225 (small-magnetism and light-weight portions), which go through in the axial direction.

The voids 225 each have smaller specific gravity and magnetism than the rotor core material made of laminated steel plate, so that the rotor core 216 can be reduced in weight because of formation of the voids 225 (small-magnetism and light-weight portions), thereby reducing the weight of the motor as a whole.

Figure 33:
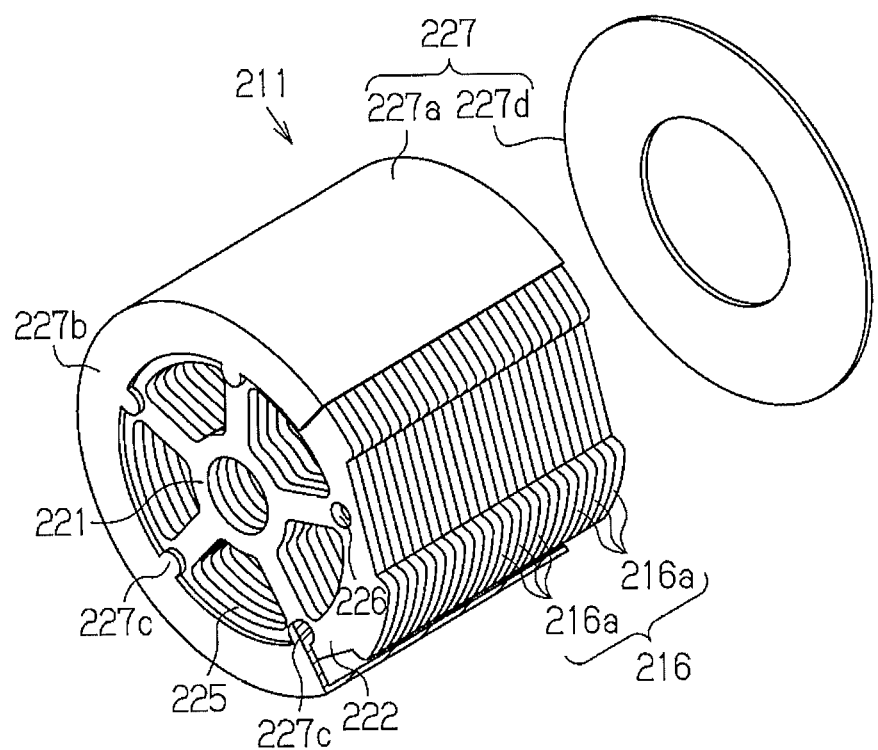
FIG. 33 is an explanatory perspective view of a rotor in FIG. 32.

At positions that are on the two axial side surfaces of the magnet-fixed tube portion 222 and close to each of the bridging portions 223, cover fixation holes 226 concavely formed in the axial direction are formed, respectively. The cover fixation holes 226 are each used when fixing a rotor cover 227, which covers the outer circumference of the rotor core 216 as shown in FIG. 33.

The rotor cover 227 has a cylinder-shaped cover portion 227a. The cover portion 227a is fitted with an annular reinforcing rib 227b formed as bent in the direction of the rotary shaft 212 in order to cover the side surface of the magnet-fixed tube portion 222 from its opening end on the side corresponding to the front cover 204. At a position which is on the inner circumferential portion of the annular reinforcing rib 227b and faces each cover fixation hole 226, an engagement projection 227c (see FIG. 32) is formed as shown in FIG. 33. The engagement projection 227c is formed as bent to be fitted into the cover fixation hole 226 which the engagement projection 227c faces, thereby supporting and fixing the cover portion 227a of the rotor cover 227 onto the rotor core 216.

Further, an opening end in the cover portion 227a on the side corresponding to the rear cover 203a is swaged and fixed an annular side plate 227d, which covers the side surface of the magnet-fixed tube portion 222 on the rear cover 203a side and an outer circumferential end of this side plate 227d.

Next, a description will be given of operation of the third embodiment.

The rotor core 216 of a brushless motor 201 is fitted with the magnet-fixed tube portion 222, which includes the shaft-fixed tube portion 221 fixed to the rotary shaft 212 and the outer circumferential surface of this shaft-fixed tube portion 221 at a constant interval, thereby connecting the shaft-fixed tube portion 221 and the magnet-fixed tube portion 222 to each other at the bridging portions 223. Between the outer surface of the shaft-fixed tube portion 221 and the inner surface of the magnet-fixed tube portion 222, the voids 225 defined by the bridging portions 223 is formed. The voids 225 contribute to a reduction in specific gravity of the rotor core 216.

The voids 225 between the shaft-fixed tube portion 221 and the magnet-fixed tube portion 222 have little magnetism, so that the magnetic flux of the magnets MG disposed in the recesses 222a in the magnet-fixed tube portion 222 is focused on the adjacent salient poles 224. The magnetic balance is improved between the salient poles 224 and the magnets MG, which are alternately formed in the circumferential direction of the rotor core 216.

The central axis of each radially extending bridging portion 223 intersects orthogonally with the circumferential central position of the corresponding salient pole 224. Accordingly, the magnetic flux of the magnets MG is suppressed from flowing via the bridging portions 223 to the shaft-fixed tube portion 221 and is focused to the salient poles 224. The magnetic balance between the magnetic poles alternately formed in the circumferential direction of the rotor 211 is improved further, thereby reducing the cogging torque, the noise, and the vibrations and improving the output of the motor.

The third embodiment will give the following advantages.

(11) The voids 225 formed in the rotor core 216 can contribute to a reduction in weight of the rotor core 216, thereby reducing the weight of the motor as a whole.

Moreover, the voids 225 formed between the shaft-fixed tube portion 221 and the magnet-fixed tube portion 222 have small magnetism. Therefore, the magnetic flux of the magnets MG disposed to the recesses 222a in the magnet-fixed tube portion 222 can be focused on the adjacent salient poles 224, thereby improving the magnetic balance between the salient poles 224 and the magnets MG, which are alternately formed in the circumferential direction of the rotor core 216.

As a result, the magnetic balance between the magnetic poles alternately formed in the circumferential direction of the rotor core 216 can be improved, thereby reducing the cogging torque, the noise, and the vibrations and improving the output of the motor. Moreover, the high output enables reducing the size per unit power output of the brushless motor 201.

(12) The bridging portions 223 are circumferentially formed at equal intervals as sandwiching the voids 225 between the shaft-fixed tube portion 221 and the magnet-fixed tube portion 222. Therefore, the magnetic flux of the magnets MG of the magnet-fixed tube portion 222 is suppressed from flowing via the bridging portions 223 to the shaft-fixed tube portion 221 and is focused on the salient poles 224 on the magnet-fixed tube portion 222.

As a result, the magnetic balance between the magnetic poles alternately formed in the circumferential direction of the rotor 211 is improved further, thereby reducing the cogging torque, the noise, and the vibrations and improving the output of the motor.

(13) The central axis of each radially extending bridging portion 223 intersects orthogonally with the circumferential central position of the salient pole 224. Accordingly, the magnetic flux of the magnets MG is suppressed from flowing via the bridging portions 223 to the shaft-fixed tube portion 221 and is focused on the salient poles 224. As a result, the magnetic balance between the magnetic poles alternately formed in the circumferential direction of the rotor 211 is improved further, thereby reducing the cogging torque, the noise, and the vibrations and improving the output of the motor.

(14) The rotor core 216 is covered with the rotor cover 227. Therefore, even if the magnets MG fixed to the recesses 222a in the rotor core 216 come off, the magnets MG do not go out of the rotor cover 227 and, therefore, does not damage the surrounding components.

Moreover, the rotor cover 227 is supported and fixed in the cover fixation hole 226 formed in the rotor core 216 (magnet-fixed tube portion 222). Therefore, it is not necessary to provide a special component or the like. for fixing the rotor cover and secure a space for mounting the special component in the motor.

(15) The rotor core 216 is formed by stacking a plurality of the rotor core pieces 216a, each of which is made of a steel plate. Therefore, the magnetic resistance in the axial direction of the rotor core 216 increases, so that the magnetic flux of the magnets MG is suppressed from flowing in the axial direction of the rotor core 216 and concentrated to the salient poles 224.

Further, in the consequent-pole type rotor 211, generally, magnetism is liable to vary in the rotor core 216. By the eddy current suppressing effects due to the magnetic variation suppressing effects of the voids 225 as the small-magnetism and light-weight portion as well as the fact that the rotor core 216 is formed of a plurality of the stacked rotor core pieces 216a, the eddy current can be further inhibited from occurring. As a result, the motor output can be increased, to reduce the size per unit power output of the brushless motor 201.

Similarly, the stator core 207 is formed by stacking a plurality of the stator core pieces 207a made of a steel plate. Therefore, the magnetic flux occurring on the stator core 207 is suppressed from flowing in the axial direction and focused on the distal ends of the teeth 209.

(16) The rotary shaft 212 is formed of a nonmagnetic material. Therefore, the magnetic flux of the magnets MG is suppressed from flowing into the rotary shaft 212 and concentrated at the salient poles 224. As a result, the magnetic balance between the magnetic poles alternately formed in the circumferential direction of the rotor 211 is improved further, thereby reducing the cogging torque, the noise, and the vibrations and increasing the power of the motor.

(17) The sixty slots S are formed in the stator core 207 of the stator 206 to mount the sixty teeth 209. The first system three-phase coil and the second system three-phase coil are wound around the sixty teeth 209. The three phases of coils of the second system are shifted by a pitch of one slot with respect to the three phases of coils of the first system, respectively.

The difference in phase between a three-phase AC to supply power to the first system three-phase coil and that to supply power to the second system three-phase coil is set to an electric angle of 30 degrees.

Torque ripple waves of the sixth order components of the electric angle occurring respectively on the three phase coil of the first system and that of the second system of the brushless motor 201 are offset because the slots S for the first system three-phase coil and the second system three-phase coil are shifted by 30 degrees (electric angle), which is a half of the phase difference between them. As a result it is possible to eliminate the torque ripples of the electric angle sixth order component occurring on the brushless motor 201.

The third embodiment may be modified as follows.

Figure 38:
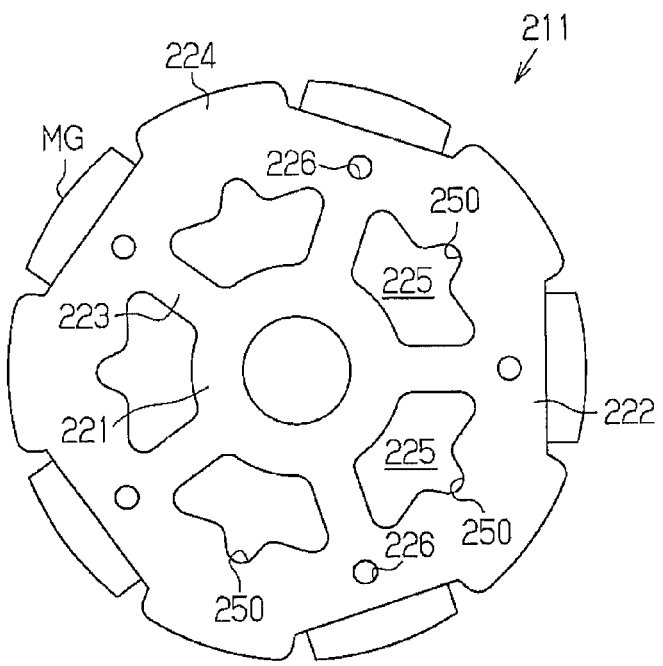
FIG. 38 is a front view of a rotor core according to a modification as viewed axially.

In the third embodiment, grooves 250 may be formed in the inner surfaces of the magnet-fixed tube portion 222, which forms the voids 225, in such a manner that the central position of each groove 250 is the deepest toward the stator as shown in FIG. 38. In this case, the inner bottom surface of each groove 250 may well be formed into the shape of an arc as viewed axially, and the surfaces of both sides of the arc-shaped inner bottom surface may well be bordered into the shape of an arc so that they continue to the inner surface of the magnet-fixed tube portion 222.

Accordingly, the magnetic flux of the magnets MG is focused further to the adjacent salient poles 224, thereby further improving the magnetic balance between the magnetic poles that are alternately formed in the circumferential direction of the rotor 211.

In the third embodiment, the length of each bridging portion 223 in the axial direction is the same as that of each of the shaft-fixed tube portion 221 and the magnet-fixed tube portion 222.

Figure 39:
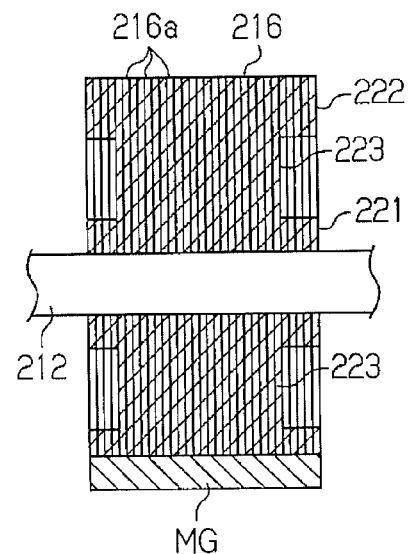
FIG. 39 is a cross-sectional view of the rotor core according to a modification.

Alternatively, the length of each bridging portion 223 in the axial direction may be smaller than that of each of the shaft-fixed tube portion 221 and the magnet-fixed tube portion 222 as shown in FIG. 39.

Accordingly, the magnetic resistance of the bridging portions 223 is increased, so that the magnetic flux of the magnets MG is further suppressed from flowing toward the rotary shaft 212 and focused to the salient poles 224. As a result, the magnetic balance is improved which is of the magnetic poles alternately formed in the circumferential direction of the rotor 211.

Figure 40:
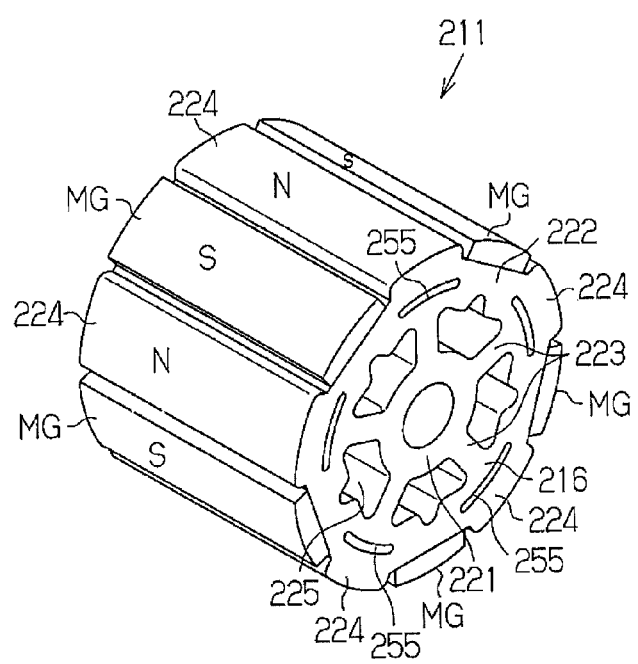
FIG. 40 is a perspective view of the rotor core according to a modification.
Figure 41:
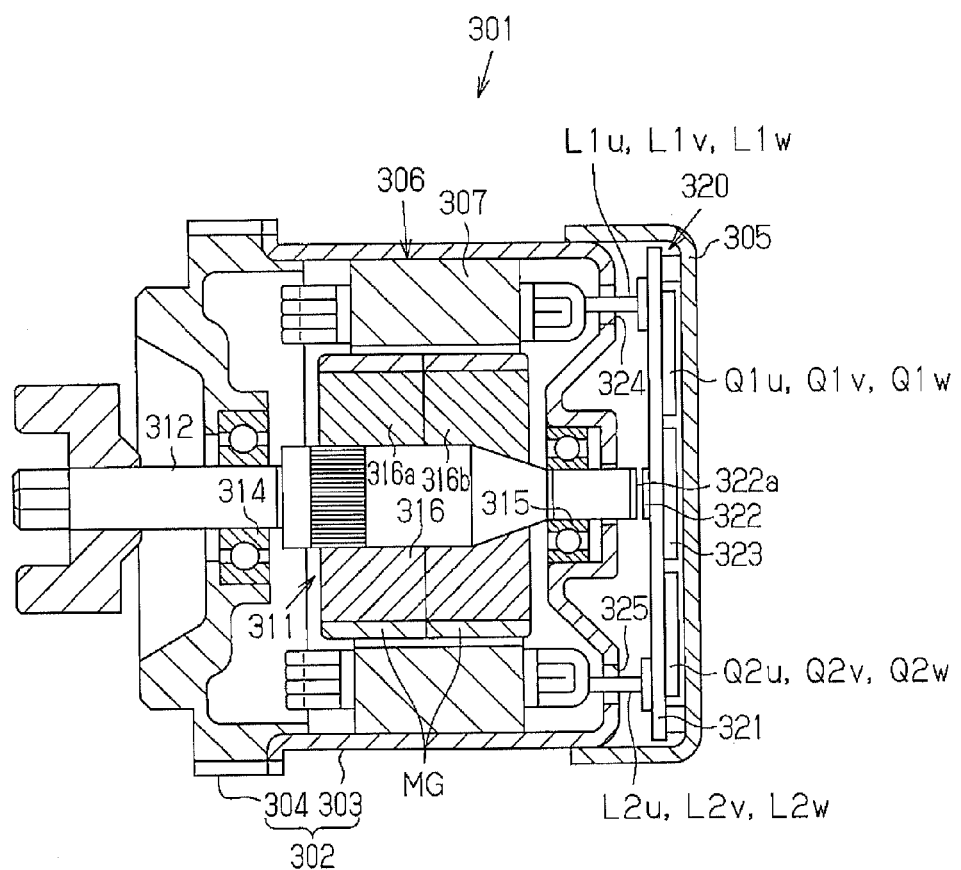
FIG. 41 is a cross-sectional view of a brushless motor according to a fourth embodiment.

In the third embodiment, each bridging portion 223 and the inner circumferential surface of the magnet-fixed tube portion 222 are coupled to each other at the position that faces the recess 222a where a magnet MG is fixed. Alternatively, each bridging portion 223 and the inner circumferential surface of the magnet-fixed tube portion 222 may be coupled to each other at a position that faces the salient poles 224 as shown in FIG. 40.

In this case, second voids 255 (small-magnetism and light-weight portion) may be axially formed through the side surface of the magnet-fixed tube portion 222 on an extension of each bridging portion 223. Due to the second voids 255, the magnetic flux of the magnets MG are liable to be focused to the salient poles 224, thereby enabling further improving the magnetic balance between the magnetic poles alternately formed in the circumferential direction of the rotor 211 and reducing the weight of the motor more.

In this modification, the second voids 255 (small-magnetism and light-weight portion) may be axially formed through the side surface of the magnet-fixed tube portion 222 on an extension of each bridging portion 223. In this case, the second void 255 (small-magnetism and light-weight portion) may be utilized as the cover fixation hole 226 to fix the rotor cover 227.

In the third embodiment, the small-magnetism and light-weight portion is formed by the voids 225. Alternatively, instead of coupling the shaft-fixed tube portion 221 and the magnet-fixed tube portion 222 with the bridging portions 223, the space between the shaft-fixed tube portion 221 and the magnet-fixed tube portion 222 may be filled with, for example, a synthetic resin having a small specific gravity and magnetism to couple and fix the shaft-fixed tube portion 221 and the magnet-fixed tube portion 222 with this synthetic resin.

A space between the shaft-fixed tube portion 221 and the rotary shaft 212 may be directly filled with a synthetic resin having a smaller specific gravity and magnetism than those of the shaft-fixed tube portion 221 serving as the small-magnetism and light-weight portion to couple and fix the shaft-fixed tube portion 221 and the rotary shaft 212 via this synthetic resin.

Although the stator core 207 has used the segments SG to provide the SC coil in the third embodiment, an ordinary cable, for example, a copper cable may be wound to provide a multi-phase coil.

The following will describe fourth through seventh embodiments of the present invention with reference to the drawings. Identical reference numerals are given to identical components with the first embodiment, and detailed description of identical components will not be repeated.

Figure 42:
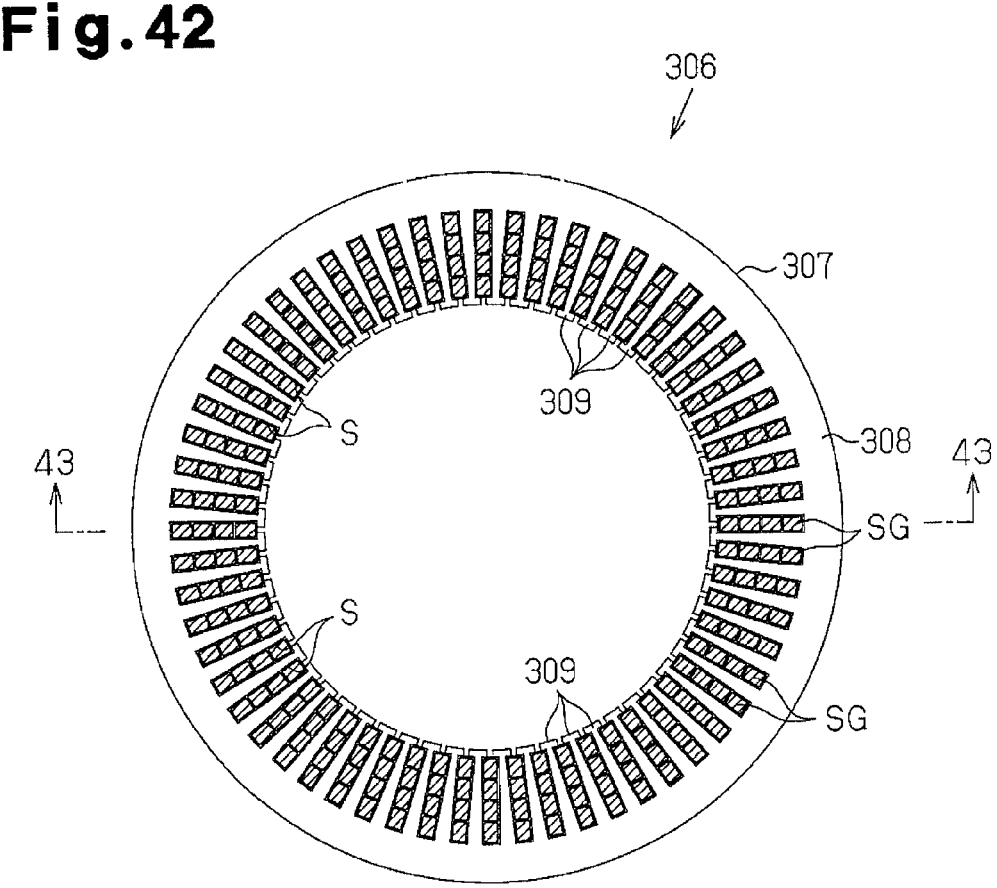
FIG. 42 is a front view of a stator core in the fourth embodiment.
Figure 43:
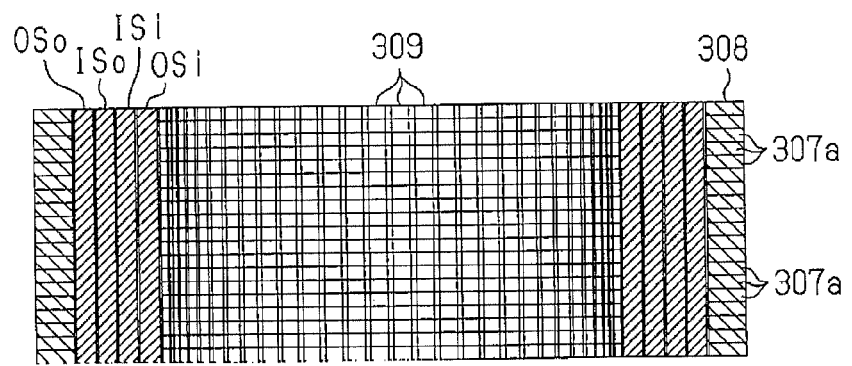
FIG. 43 is a cross-sectional view taken along line 43-43 of FIG. 42.

In the inner circumferential surface of a tubular housing (yoke) 303, a stator 306 serving as an armature is fixed. The stator 306 includes a stator core 307 fixed to the inner side surface of the tubular housing 303 as shown in FIG. 42. As shown in FIG. 42, the stator core 307 has a cylinder portion 308 and a plurality of teeth 309, which extend from this cylinder portion 308 radially inward and are provided circumferentially. The stator core 307 is formed by stacking a plurality of stator core pieces 307a as shown in FIG. 43.

A first system three-phase coil and a second system three-phase coil are provided with power from the respective independent three-phase AC power supplies. In the fourth embodiment, there is a phase difference of 30 degrees in electric angle between a three-phase AC applied (supplied) to the first system three-phase coil and a three-phase AC supplied to the second system three-phase coil.

The above-described neutral point terminals $T0u$, $T0v$, and $T0w$ as well as $T0ua$, $T0va$, and $T0wa$ and receiving terminals $T1u$, $T1v$, and $T1w$ as well as $T2u$, $T2v$, and $T2w$ may be formed by processing the segments SG as described above or a dedicated segment (different from the segment SG) may be inserted only into the associated portions.

Figure 44:
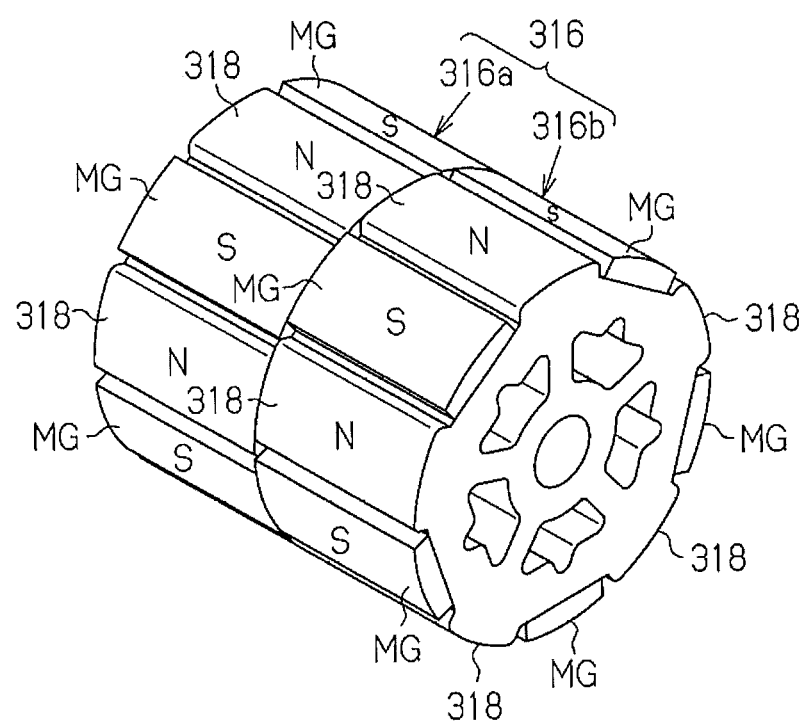
FIG. 44 is a perspective view of a consequent-pole type rotor core in the fourth embodiment.

Further, a consequent-pole type rotor core 316 is externally fitted to a rotary shaft 312 of a rotor 311 as shown in FIG. 44. The rotor core 316 is axially subdivided into two equal cores. The resultant subdivided rotor cores 316a and 316b are shifted in one direction by a predetermined shift angle of $\theta 1$ around the central axis of the rotary shaft 312.

On the outer circumferential surface of each of the subdivided rotor cores 316a and 316b, five magnets MG and five projecting magnetic pole portions 318 formed on the rotor core 316 are alternately mounted in the circumferential direction at equal angular intervals in such a manner as to face the stator 306, more specifically, the radially inward end portions of the teeth 309.

The five magnets MG have their north poles disposed radially inward and their south poles disposed radially outward with respect to the rotor core 316. That is, the five magnetic pole portions 318 provide the north pole. Therefore, as shown in FIG. 44, the north poles and the south poles are alternately disposed circumferentially, and the number of the pole pairs of the rotor 311 is set to five (the number (P) of the magnetic poles is ten).

The rotor 311 has the five pole pairs and the sixty teeth 309. Therefore, a pitch between adjacent teeth 309 is six degrees in mechanical angle and, if calculated as an electric angle, 30 degrees.

As shown in FIG. 44, the subdivided rotor cores 316a and 316b are shifted in one direction by the predetermined shift angle of $\theta 1$ around the central axis of the rotary shaft 312. Accordingly, the rotor core 316 as a whole has a magnetic skew of 60 degrees in electric angle with respect to the magnetic poles (teeth 309) of the stator 306. This magnetic skew of 60 degrees in electric angle contributes to a decrease in torque ripple waves of the twelfth order components of the electric angle.

The shift angle $\theta 1$ (in mechanical angle) between adjacent subdivided rotor cores 316a and 316b will be obtained with the following expression as follows:

$$\theta 1 \times \text{number of subdivisions} = 360 \text{ (degrees)}/12 \text{ (order number)} \times \text{number of pole pairs})$$

Since the number of the pole pairs is five, the following is obtained:

$$\theta 1 \times \text{number of subdivisions} = 360/60 = 6 \text{ (degrees)}$$

Therefore, the following is obtained:

$$\theta 1 = 6 \text{ degrees/number of subdivisions}$$

Since the rotor core 316 shown in FIG. 44 has the two subdivided rotor cores 316a and 316b, the shift angle (in mechanical angle) $\theta 1$ is three degrees.

Accordingly, a magnetic skew of 60 degrees in electric angle is maintained between the magnetic poles of the rotor core 316 and those (teeth 309) of the stator 306.

The present embodiment is preset to satisfy the following expressions or the like.

That is, in the stator 306, the two coils each of which having two different m (m is three in the present embodiment) phases are shifted from each other by a pitch corresponding to a phase difference angle, in electric angle, of $(360 \times P)/(s \times 2)$ between adjacent slots S, where P is the number of the magnetic poles and s is the number of the slots S. In each of the phases, the two coils are supplied with signals having a phase shift of this phase difference angle. Specifically, in the present embodiment, the phase difference angle is set to (360×10)/(60×2)=30 degrees.

In the present embodiment, the magnetic skew between the stator 306 and the rotor 311 is set to an electric angle of 60 degrees so that this magnetic skew may be twice the phase difference angle (30 degrees) in electric angle between the slots S.

Next, description will be given of operation of the above-described brushless motor 301 as follows.

An ECU 323 conducts control such that the first system three-phase coil and the second system three-phase coil are provided with power from the respective independent three-phase AC power supplies. There is a phase difference of 30 degrees in electric angle between a three-phase AC supplied to the first system three-phase coil and a three-phase AC supplied to the second system three-phase coil.

In this case, torque ripple waves of the electric angle sixth order components and torque ripple waves of the electric angle twelfth order components occur respectively on the three phase coil of the first system and that of the second system.

Both sides of the torque ripple waves of the electric angle sixth order components each have an angle of 60 degrees (=360 degrees (electric angle)/6 (order number)) of the one-cycle wave.

In this case, the respective slots S for the three-phase coil of the first and second systems are shifted from each other by a half of the one cycle, that is, 30 degrees, so that the torque ripple waves occurring on the adjacent first system three-phase coil and second system three-phase coil are vertically symmetrical with each other. Therefore, the ripple waves of the electric angle sixth order components on both sides offset each other. As a result, the torque ripple of the electric angle sixth order component which occurs on the brushless motor 301 disappears.

The rotor core 316 having the consequent-pole type structure is subdivided into the two equal subdivided rotor cores 316a and 316b in the axial direction. The subdivided rotor cores 316a and 316b are shifted in one direction by a predetermined mechanical angle of three degrees around the central axis of the rotary shaft 312 such that an electric angle of 60 degrees of magnetic skew is maintained between the magnetic poles of the rotor core 316 and the magnetic poles (teeth 309) of the stator 306.

It is thus possible to eliminate the torque ripple waves of the electric angle twelfth order components occurring on the brushless motor 301.

The fourth embodiment provides the following advantages.

(18) The sixty slots S are formed in the stator core 307 of the stator 306 to provide the sixty teeth 309. The first system three-phase coil and the second system three-phase coil are wound around the sixty teeth 309. In this case, the second system three-phase coil is wound through the slots S as one slot-pitch shifted with respect to the first system three-phase coil.

There is a phase difference of 30 degrees in electric angle between a three-phase AC supplied to the first system three-phase coil and a three-phase AC supplied to the second system three-phase coil.

The torque ripple waves of the electric angle sixth order components occurring on the respective three-phase coils of the first and second systems of the brushless motor 301 offset each other because the slots S of the respective first system three-phase coil and the second system three-phase coil are shifted from each other by a half of the one cycle, that is, 30 degrees (in electric angle). As a result, it is possible to eliminate components obtained by multiplying the electric angle sixth order component, which is the basic electric angle component (=m (number of phases in coil AC driving)×2=3×2=6) of torque ripples occurring on the brushless motor 301, by an odd number (sixth order component, eighteenth order component, thirtieth order component, or the like.).

(19) The rotor core 316 is axially subdivided into the two equal subdivided rotor cores 316a and 316b. The subdivided rotor cores 316a and 316b are disposed as shifted in one direction by the mechanical angle of three degrees around the central axis of the rotary shaft 312 such that an electric angle of 60 degrees of magnetic skew is maintained between the magnetic poles of the rotor core 316 and the magnetic poles (teeth 309) of the stator 306.

Therefore, it is possible to eliminate components obtained by multiplying the electric angle sixth order component, which is the basic electric angle component (=m (number of phases in coil AC driving)×2=3×2=6) of torque ripples occurring on the brushless motor 301, by an even number (multiplied-by-12, such as twelfth order component, twenty-fourth order component, and thirty-sixth order component).

(20) The torque ripple waves of the electric angle sixth order component and the torque ripple waves of the electric angle twelfth order component disappear, so that it is possible to reduce noise and vibration from the motor. In the case of using the brushless motor 301 as an EPS motor, it is driven under the condition of low noise and small vibration, so that comfortable steering is possible.

Figure 45:
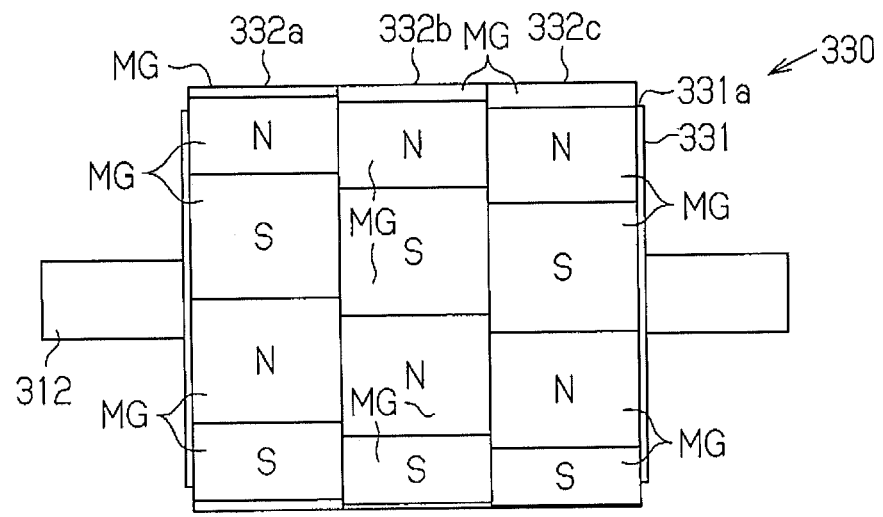
FIG. 45 is a front view of a rotor according to a fifth embodiment.

The following will describe a fifth embodiment of the present invention with reference to FIG. 45.

In contrast to the fourth embodiment, in which the rotor is the consequent-pole type, the fifth embodiment provides a ring magnet type rotor. For ease of explanation, characteristic components will be described in detail, and description on the common components will not be repeated.

As shown in FIG. 45, in a rotor 330, an outer circumferential surface 331a of a rotor core 331 is axially partitioned into three equal ring magnets 332a, 332b, and 332c. The partitioned ring magnets 332a, 332b, and 332c are each fitted with 10 magnets MG circumferentially. The ten magnets MG have their respective north poles and south poles disposed in the radial direction of the rotor core 331 in such a manner that each circumferentially adjacent pair of the magnets MG provide different magnetic poles.

As shown in FIG. 45, as for the ring magnets 332a, 332b, and 332c having such a configuration, the adjacent ring magnets 332a, 332b, and 332c are shifted in one direction by a predetermined shift angle of 62 around the central axis of a rotary shaft 312 so that an electric angle of 60 degrees of magnetic skew is maintained between the magnetic pole of the rotor core 331 and the magnetic pole (tooth 309) of a stator 306.

In this case, the north poles and the south poles are alternately disposed in the circumferential direction, a rotor 311 has five pole pairs, and the stator 306 has the sixty teeth 309, so that a pitch between adjacent teeth 309 is a mechanical angle of six degrees, and 30 degrees in electric angle.

The shift angle θ2 for the ring magnets 332a, 332b, and 332c is set so that the electric angle of 60 degrees of magnetic skew is maintained between the magnetic pole of the rotor core 331 and the magnetic pole (tooth 309) of a stator 306.

The shift angle θ2 (mechanical angle) for the adjacent ring magnets 332a, 332b, and 332c is obtained with the following expression:

θ2×number of ring magnets=360 (degrees)/(12 (order number)×number of pole pairs)=360/60=6 degrees Since the number of the pole pairs is five, the following will be obtained:

θ2×number of ring magnets=360/60=6 degrees

Therefore, the following will be obtained:

θ2=6 degrees/number of ring magnets

Since the number of the ring magnets of the rotor core 331 shown in FIG. 45 is three, the angle (mechanical angle) θ2 is two degrees. Accordingly, the electric angle of 60 degrees of magnetic skew is maintained between the magnetic pole of the rotor 330 and the magnetic pole (tooth 309) of a stator 306.

In this case also, it is possible to reduce torque ripple waves of both of the electric angle sixth order component and the electric angle twelfth order component. Almost the same advantages as those of (18) through (20) described with the fourth embodiment can be obtained.

Figure 46:
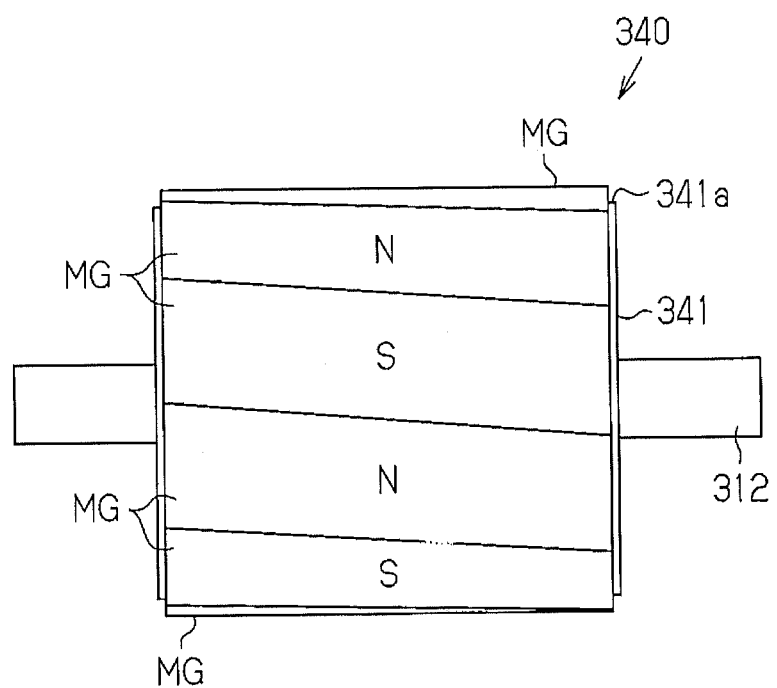
FIG. 46 is a front view of a rotor according to a sixth embodiment.

The following will describe a sixth embodiment of the present invention with reference to FIG. 46.

A rotor of the present embodiment is characteristic components different from the rotors of the fourth and fifth embodiments. For ease of explanation, the characteristic components will be described in detail, and description on the common components will not be repeated.

As shown in FIG. 46, to a rotary shaft 312 of a rotor 340, a rotor core 341 is externally fitted. On an outer circumferential surface 341a of the rotor core 341, a plurality of magnets MG are circumferentially mounted at equal angular intervals in such a manner that they may face the radial inward end portions of the stator 306, specifically, a tooth 309. The rotor core 341 of the present embodiment is mounted with the ten magnets MG. The ten magnets MG have their respective north poles and south poles disposed in the radial direction of the rotor core 341 in such a manner that each circumferentially adjacent pair of the magnets MG provide different magnetic poles. The north poles and the south poles are alternately disposed circumferentially, and the number of pole pairs of the rotor 340 is set to five.

As shown in FIG. 46, the magnets MG mounted on the outer circumferential surface 341a of the rotor core 341 are each skewed by a predetermined angle of θ3 with respect to the axial direction of the rotary shaft 312.

In this case, the north poles and the south poles are alternately disposed in circumferential direction, the rotor 340 has five pole pairs, and the stator 306 has the sixty teeth 309, so that a pitch between adjacent teeth 309 is a mechanical angle of six degrees, 30 degrees in electric angle.

The skew angle θ3 for each of the magnets MG is set so that the electric angle of 60 degrees of magnetic skew is maintained between the magnetic pole of the rotor core 341 and the magnetic pole (tooth 309) of a stator 306.

The skew angle θ3 (mechanical angle) for the magnets MG is obtained with the following expression:

θ3=360 (degrees)/(12 (order number)×number of pole pairs)=360/60=6 degrees

Since the number of the pole pairs of the rotor 340 shown in FIG. 46 is five, the angle (mechanical angle) θ3 is six degrees. Accordingly, the electric angle of 60 degrees of magnetic skew is maintained between the magnetic pole of the rotor 340 and the magnetic pole (tooth 309) of a stator 306.

In this case also, it is possible to reduce torque ripple waves of both of the electric angle sixth order component and the electric angle twelfth order component. Almost the same advantages as those of (18) through (20) described with the fourth embodiment can be obtained.

Next, a description will be given of a seventh embodiment of the present invention with reference to FIGS. 47A to 50.

In the present embodiment, a stator is characteristic components different from the forth to sixth embodiments. For ease of explanation, the characteristic components of the stator and the accompanying rotor will be described in detail, and description on the common components will not be repeated.

Figure 47A:
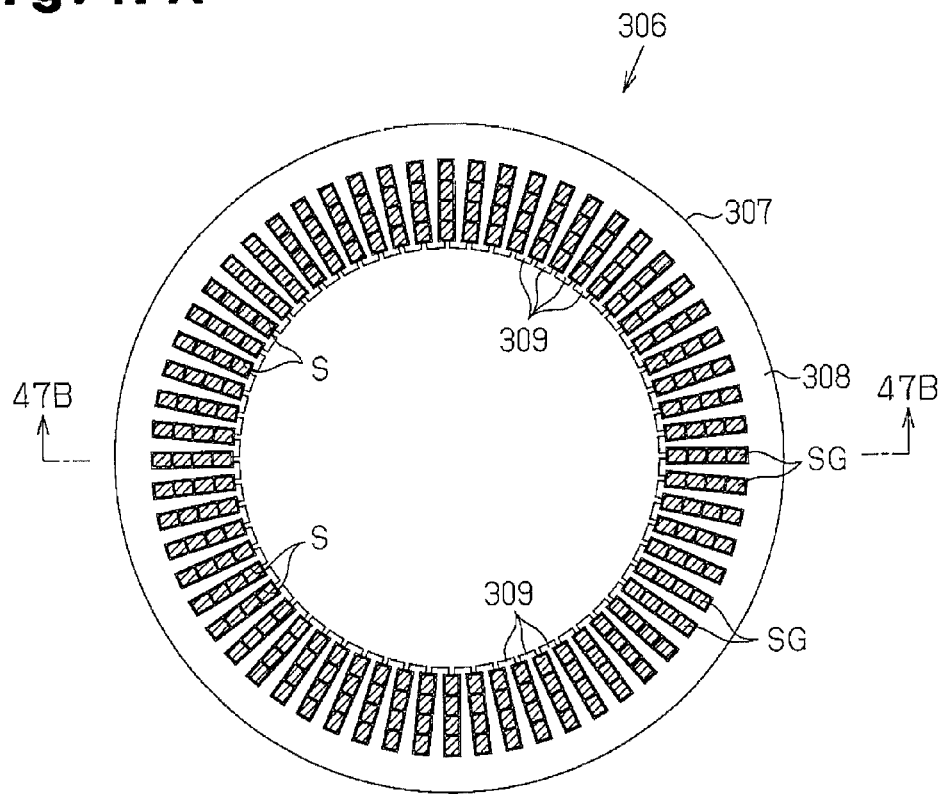
FIG. 47A is a front view of a stator core according to a seventh embodiment.
Figure 47B:
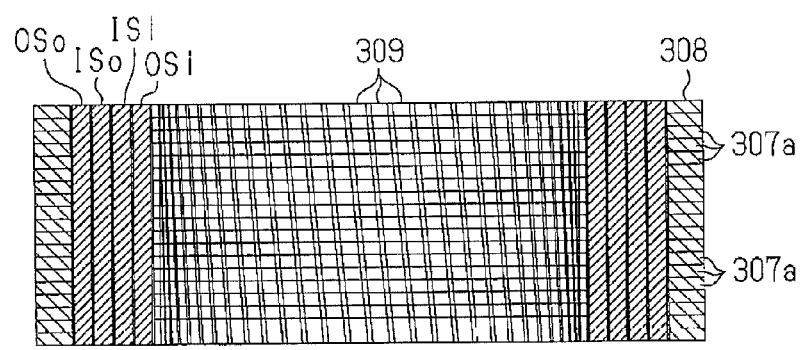
FIG. 47B is a cross-sectional view taken along line 47B-47B of FIG. 47A.

As shown in FIGS. 47A and 47B, as for the stator 306 shown in FIGS. 42 and 43, the teeth 309 formed on the stator core 307 are skewed by a predetermined angle of θ4 with respect to the axial direction of the rotary shaft 312.

Figure 48:
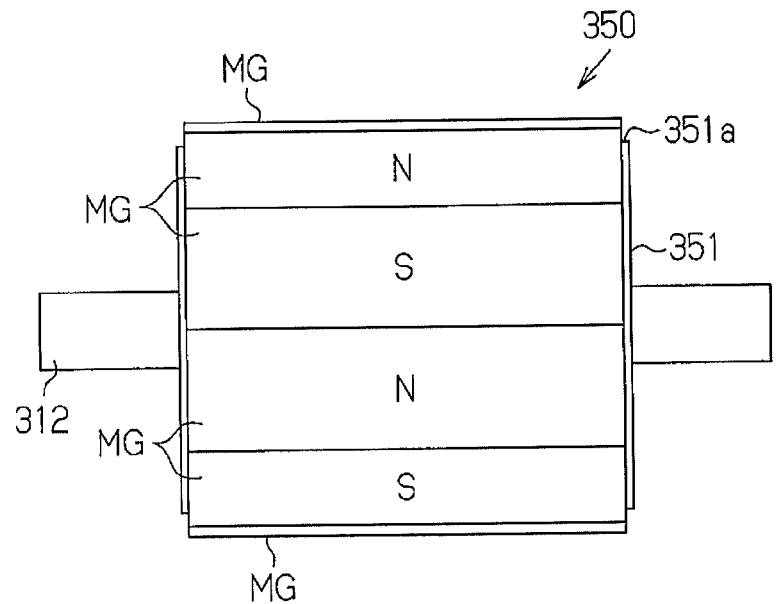
FIG. 48 is a front view showing a rotor in the seventh embodiment.
Figure 49:
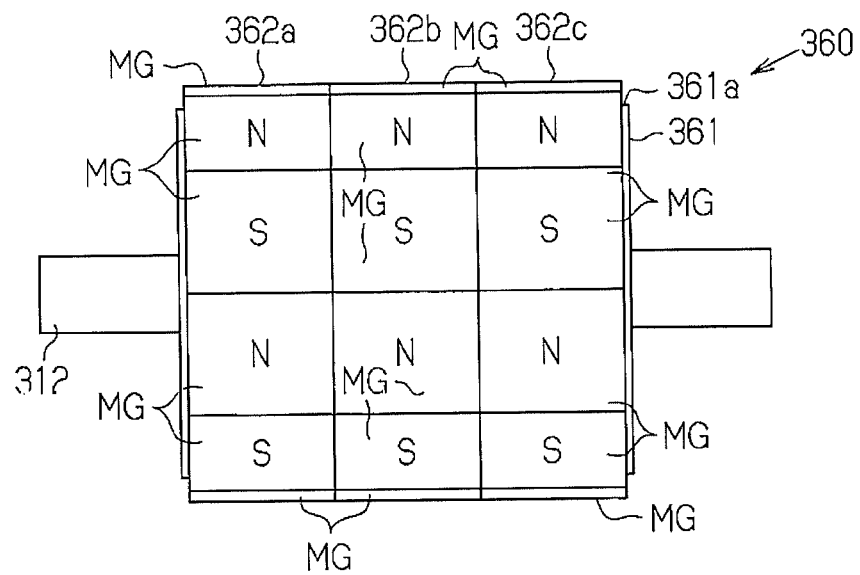
FIG. 49 is a front view showing another rotor in the seventh embodiment.
Figure 50:
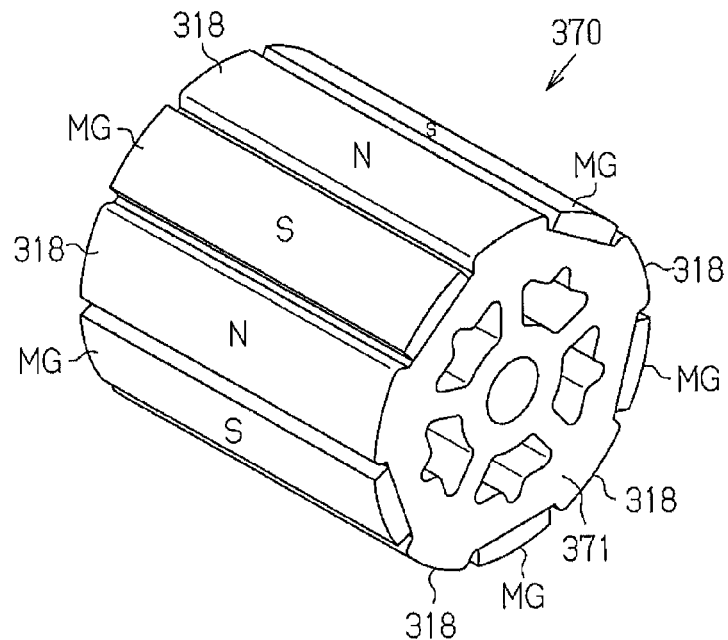
FIG. 50 is a perspective view showing another rotor core in the seventh embodiment.

As the corresponding rotor, rotors 350, 360, and 370 shown in FIGS. 48, 49, and 50 are used. In the rotor 350 in FIG. 48, ten magnets MG are circumferentially mounted at equal angular intervals without skews on an outer circumferential surface 351a of a rotor core 351 fitted to the rotary shaft 312. The ten magnets MG have their respective north poles and south poles disposed in the radial direction of the rotor core 351 in such a manner that each circumferentially adjacent pair of the magnets MG give the different magnetic poles.

In the rotor 360 in FIG. 49, which is a ring-magnet type rotor, an outer circumferential surface 361a of a rotor core 361 is axially partitioned into three equal ring magnets 362a, 362b, and 362c. The ring magnets 362a, 362b, and 362c are configured so that the central axis of the rotary shaft 312 for them is not shifted with respect to the rotation center. The partitioned ring magnets 362a, 362b, and 362c are each fitted with the 10 magnets MG circumferentially. The ten magnets MG have their respective north poles and south poles disposed in the radial direction of the rotor core 361 in such a manner that each circumferentially adjacent pair of the magnets MG provide different magnetic poles.

The rotor 370 in FIG. 50 is of a consequent-pole type that its rotor core 371 is not axially subdivided into partitions.

On the outer circumferential surface of the rotor core 371, the five magnets MG and another five magnetic pole portions 318 are alternately mounted in the circumferential direction at equal angular intervals in such a manner as to face the stator 306, more specifically, the radially inward end portions of the teeth 309.

The five magnets MG have their north poles disposed radially inward and their south poles disposed radially outward with respect to the rotor core 371. The five magnetic pole portions 318 each provide the north pole. Therefore, as shown in FIG. 50, the north poles and the south poles are alternately disposed circumferentially, and the number of the pole pairs of the rotor 311 is set to five.

Accordingly, the rotors 350, 360, and 370 shown in FIGS. 48, 49, and 50 respectively each have the five pole pairs, so that the electric angle is 30 degrees, which corresponds to a mechanical angle of six degrees. As a result, the pitch between adjacent teeth 309 of the stator core 307 is six degrees measured as a mechanical angle and, if calculated as an electric angle, 30 degrees.

The skew angle θ4 for the teeth 309 formed on the stator core 307 is set so that the electric angle of 60 degrees of magnetic skew is maintained between the magnetic poles of the rotors 350, 360, and 370 and the magnetic pole (tooth 309) of the stator 306.

The skew angle θ4 for the teeth 309 is obtained with the following expression:

θ4=360 (degrees)/(12 (order number)×number of pole pairs)

Since the number of the pole pairs of each of the rotors 350, 360, and 370 shown in FIGS. 48 to 50 is five, θ4 is six degrees.

In this case also, it is possible to reduce torque ripple waves of both of the electric angle sixth order component and the electric angle twelfth order component. Almost the same advantages as those of (18) through (20) described with the fourth embodiment can be obtained.

The above fourth through seventh embodiments may be modified as follows.

In the fourth embodiment, the rotor core 316 is axially subdivided into the two equal subdivided rotor cores 316a and 316b. The subdivided rotor cores 316a and 316b are shifted in one direction by a predetermined angle of six degrees around the central axis of the rotary shaft 312 so that an electric angle of 60 degrees of magnetic skew is maintained between the magnetic pole of the rotor core 316 and the magnetic pole (tooth 309) of the stator 306.

Figure 51:
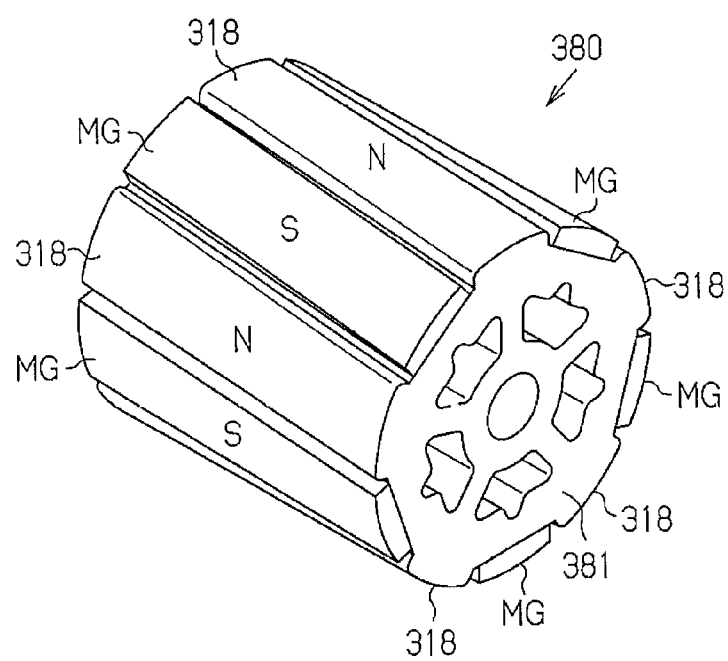
FIG. 51 is a perspective view of a consequent type rotor core in another rotor.
Figure 52:
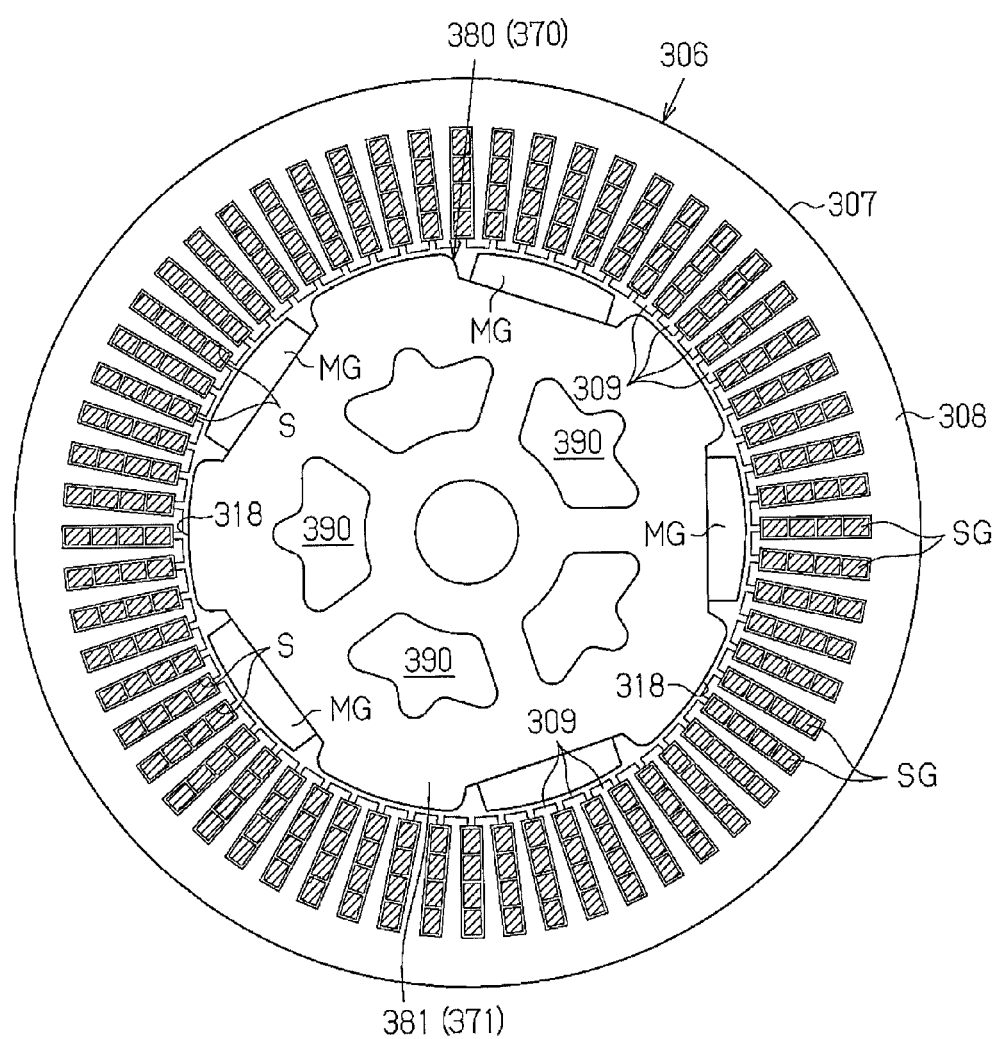
FIG. 52 is a front view of the stator and the rotor as viewed axially.

Alternatively, instead of subdividing the rotor core 316, for example, as the consequent-pole type rotor 370 shown in FIG. 50, the rotor 380 shown in FIG. 51 may be used to skew the magnets MG disposed on the rotor core 381 and the projecting magnetic pole portions 318 formed on the rotor core 381 by a predetermined angle of θ3 with respect to the axial direction of the rotary shaft 312 as in the case of the rotor 340 shown in FIG. 46. In this case also, it possible to reduce torque ripple waves for both of the electric angle sixth order component and the electric angle twelfth order component.

Although the rotor core 316 is subdivided into the two partitions in the fourth embodiment, the number of partitions may be three or more.

Although the three ring magnets are used in the fifth embodiment, the present invention is not limited to it; the number of the ring magnets may be two, or four or more.

Although the stator core pieces 307a of the stator core 307 are all shifted around the rotary shaft 312 sequentially in the seventh embodiment, only the portions of the teeth 309 of the respective stator core pieces 307a may be sequentially shifted around the rotary shaft 312. Further, some of the stator core pieces 307a may be grouped into one set so that only the portions of the teeth 309 of the respective stator core pieces 307a are sequentially shifted in units of the set around the rotary shaft 312.

Similar to the cases of the above fourth through seventh embodiments, the values may be changed such that the following expression or the like is satisfied. That is, the values may be changed appropriately to wind the two different coils for m number of phases around the stator at a slot pitch of a phase difference angle (electric angle) between adjacent slots S of (360×P)/(s×2) (where P is the number of the magnetic poles and s is the number of the slots S) and apply a current with the phase difference angle and provide a magnetic skew between the stator and the rotor which is twice the phase difference angle (electric angle) between the slots S.

For example, in a case where the coil is of three phases (m=3), the number of the slots S is forty-eight (s=48), and the number of the magnetic poles is eight (P=8), the phase difference angle may as well be set to 30 degrees (magnetic skew of 60 degrees in electric angle).

In another case where the coil is of four phases (m=4), the number of the slots S is eighty (s=80), and the number of the magnetic poles is ten (P=10), the phase difference angle may as well be set to 22.5 degrees (magnetic skew of 45 degrees in electric angle).

Next, a description will be given of an eighth embodiment of the present invention with reference to the drawings. Identical reference numerals are given to identical components with the first and third embodiments, and detailed description on the identical components will not be repeated.

Figure 53:
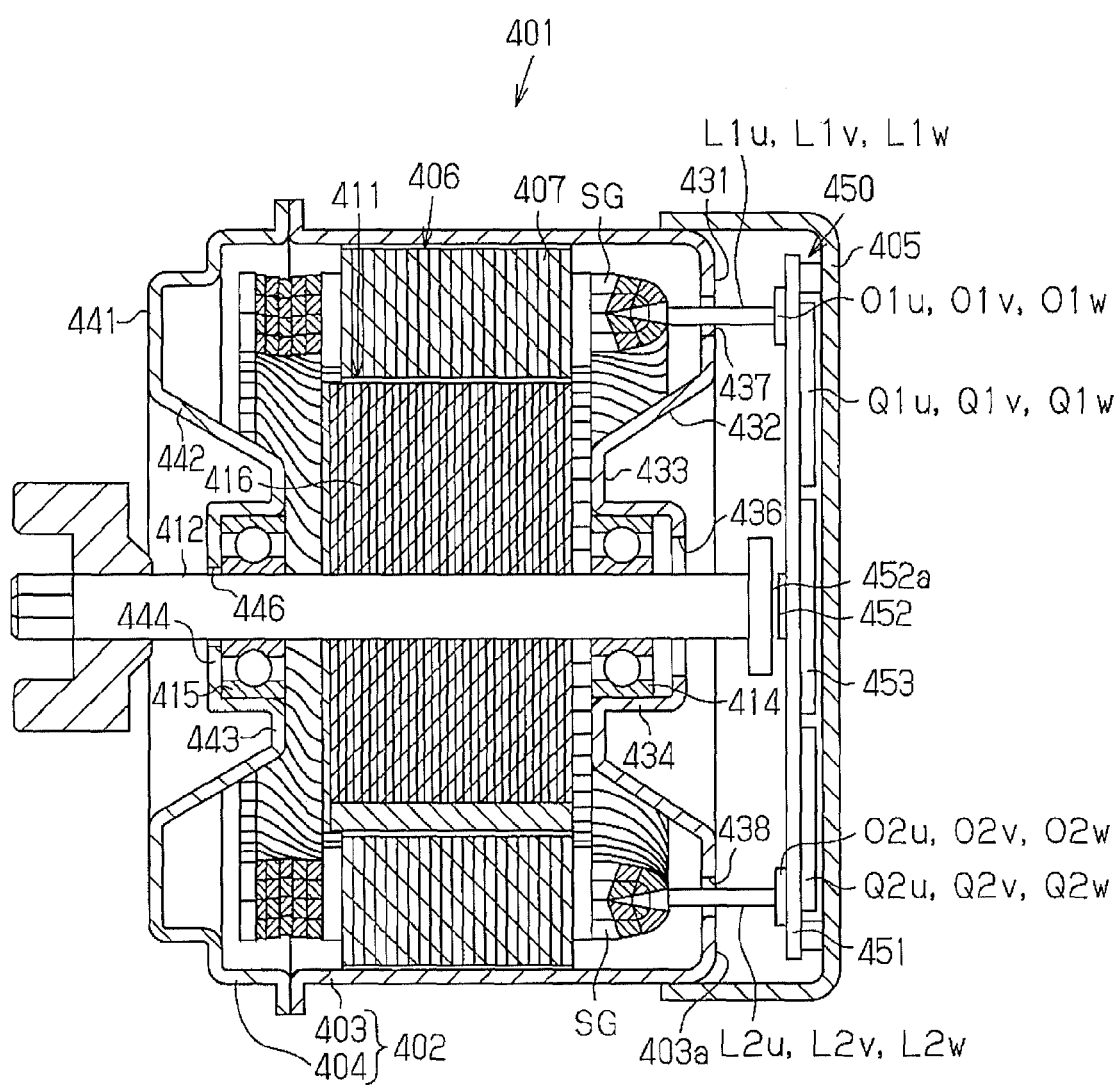
FIG. 53 is a cross-sectional view of a brushless motor according to an eighth embodiment.

A bearing 414 on the rear side for rotationally supporting a rotary shaft 412 is supported on a rear cover 403a of a tubular housing 403. From the outer-circumferential edge of the rear cover 403a of the tubular housing 403, a flat portion 431, a vibration absorption portion 432, a vibration receiving portion 433, and a bearing housing portion 434 are formed as shown in FIG. 53.

The flat portion 431 is an annular flat plate portion, which is bent in formation by a constant width radially inward from the outer-circumferential edge of the rear cover 403a. The inner-circumferential end of the flat portion 431 extends to a radial position that is slightly inward of the radial inner-circumferential end of the stator 406.

The vibration absorption portion 432 is tubular portion shaped as a truncated cone, which extends toward a rotor 411 up to a predetermined position, as shrinking in diameter from the inner inner-circumferential edge of the annular flat portion 431. The distal and circumference edge of the vibration absorption portion 432 extends to a position where it is near the side surface of the rotor 411 on the rear side in the axial direction.

The vibration receiving portion 433 is an annular flat plate portion, which is bent in formation by a constant width radially inward from the distal inner-circumferential edge of the vibration absorption portion 432. The vibration receiving portion 433 extends radially until it meets an outer-circumferential position of the rear bearing 414 fixed to the rotary shaft 412.

The bearing housing portion 434 is a cylinder portion, which is expanded in formation from the inward inner-circumferential edge of the vibration receiving portion 433 toward the rear in the axial direction. The rear outer cylindrical surface of the bearing housing portion 434 is formed so that it does not project rearward beyond the rear outer side surface of the flat portion 431. That is, the bearing housing portion 434 does not project rearward beyond the midsection of a bowl-shaped recess formed in the vibration absorption portion 432 and the vibration receiving portion 433 on the side of the rotor 411. In the bottom surface of the bearing housing portion 434, a through hole 436 is formed, through which the rear end of the rotary shaft 412 projects from the rear cover 403a.

A bearing 415 on the front side for rotationally supporting a rotary shaft 412 is supported on a front cover 404. From the outer-circumferential edge of the front cover 404, a flat portion 441, a vibration absorption portion 442, a vibration receiving portion 443, and a bearing housing portion 444 are formed.

The flat portion 441 is an annular flat plate portion, which is bent in formation by a constant width radially inward from the outer-circumferential edge of the front cover 404. The inner-circumferential end of the flat portion 441 extends to a radial position that is slightly inward of the radial inner-circumferential end of the stator 406.

The vibration absorption portion 442 is a tubular portion shaped as a truncated cone, which extends toward the rotor 411 up to a predetermined position as shrinking in diameter from the inner inner-circumferential edge of the annular flat portion 441. The distal and circumference edge of the vibration absorption portion 442 extends to a position where it is near the side surface of the rotor 411 on the front side in the axial direction.

The vibration receiving portion 443 is an annular flat plate portion, which is bent in formation by a constant width radially inward from the distal and inner-circumferential edge of the vibration absorption portion 442. The vibration receiving portion 443 extends radially until it meets an outer-circumferential position of the front bearing 415 fixed to the rotary shaft 412.

The bearing housing portion 444 is a cylinder portion, which is expanded in formation from the inward inner-circumferential edge of the vibration receiving portion 443 toward the front in the axial direction. The front outer cylindrical surface of the bearing housing portion 444 is formed so that it does not project forward beyond the front outer surface of the flat portion 441. That is, the bearing housing portion 444 does not project rearward beyond the midsection of a bowl-shaped recess formed in the vibration absorption portion 442 and the vibration receiving portion 443 on the side corresponding to the rotor 411. In the bottom surface of the bearing housing portion 444, a through hole 446 is formed, through which the distal end of the rotary shaft 412 projects from the front cover 404.

A housing box 405 fixed to the outside of the tubular housing 403 on the rear side contains a drive device 450. A circuit board 451 of the drive device 450 is mounted with a variety of types of circuit elements such as a rotation sensor 452 for controlling the rotation of the rotor 411, an electronic control unit (ECU) 453, first switching transistors Q1$u$, Q1$v$, and Q1$w$, and second switching transistors Q2$u$, Q2$v$, and Q2$w$.

The rotation sensor 452 is mounted on the circuit board 451 in such a manner that it faces the rotary shaft 412 projecting out of a through hole 436 in the bearing housing portion 434 of the rear cover 403$a$ in the axial direction. The rotation sensor 452 is composed of a magnetic sensor such as an MR sensor in the present embodiment, to detect the rotation angle of a detection magnet 452$a$, which is fixed to the axial end face of the rotary shaft 412 to integrally rotate with the rotary shaft 412.

Leads L1$u$, L1$v$, and L1$w$, which are drawn out from receiving terminals T1$u$, T1$v$, and T1$w$ for each phase, pass through a first insertion hole 437 formed in the flat portion 431 of the rear cover 403$a$ to interconnect receiving terminals T1$u$, T1$v$, and T1$w$ for each phase and output terminals O1$u$, O1$v$, and O1$w$ for each phase respectively over the shortest distance in the axial direction.

Leads L2$u$, L2$v$, and L2$w$, which are drawn out from receiving terminals T2$u$, T2$v$, and T2$w$ for each phase, pass through a second insertion hole 438 formed in the flat portion 431 of the rear cover 403$a$ to interconnect receiving terminals T2$u$, T2$v$, and T2$w$ for each phase and output terminals O2$u$, O2$v$, and O2$w$ for each phase respectively over the shortest distance in the axial direction.

Next, a description will be given of operation of the eighth embodiment as follows.

During rotation, radial vibrations of the consequent-pole type rotor 411 due to magnetic unbalance are transmitted via the rotary shaft 412 to the rear bearing 414 and the front bearing 415. In the present embodiment, the number of magnetic pole pairs is an odd number, or five, so that large vibrations occur. The radial vibrations propagate over to those bearings 414 and 415 are transmitted via the flat portion 431 to the bearing housing portions 434 and 444 located on the rotor 411 side and via the vibration receiving portions 433 and 443 to the vibration absorption portions 432 and 442, respectively.

In this case, the vibration absorption portions 432 and 442 flex and absorb vibrations by using the proximal end portions on the side corresponding to the flat portions 431 and 441 as the fulcrums and distal ends on the side corresponding to the vibration receiving portions 433 and 443 as the points of load. Accordingly, the radial vibrations of the rotary shaft 412 are not transmitted to the flat portions 431 and 441 or to the radial outer circumferential surface of the tubular housing 403. As a result, the brushless motor 401 rotates stably and, therefore, is best suited for use in an electric power steering device, which is required to be stable in rotation.

Further, since the bearing housing portions 434 and 444 supporting the bearings 414 and 415 are formed on the side corresponding to the rotor 411 more than the flat portions 431 and 441 respectively, the bearing 414 projects rearward and the bearing 415 does not project forward as in the related art, thereby enabling reducing the axial length correspondingly.

The rotor 411 of the brushless motor 401 is of the consequent-pole type, so that the number of the magnets MG attached to the rotor 411 is halved. The stator 406 is of the coil and, therefore, improves the occupancy ratio of the coil in the slot S. In addition, the number Z of the teeth 409 is set to Z=2×p×m×n=60 and a large number of the slots S are given for each magnetic pole of the rotor 411, thereby reducing the cogging torque.

The eighth embodiment will give the following advantages.

(21) The bearing housing portions 434 and 444 supporting the bearings 414 and 415 mounted on the rear cover 403$a$ and the front cover 404 are formed on the side corresponding to the rotor 411 without projecting beyond the flat portions 431 and 441, respectively.

Therefore, the bearings 414 and 415 do not project rearward and forward respectively, thereby enabling reducing the axial length.

Further, it is possible to absorb radial vibrations of the rotary shaft 412 by flexing the bearing housing portions 434 and 444 by using the inner circumferential end portions on the sides corresponding to the flat portions 431 and 441 as the supporting points, respectively.

(22) The vibration absorption portions 432 and 442 are mounted on the rear cover 403$a$ and the front cover 404, respectively. Those vibration absorption portions 432 and 442 more effectively absorb radial vibrations occurring on the rotary shaft 412. As a result, the brushless motor 401 can rotate stably and, therefore, is best suited for use in an electric power steering device, which is required to be stable in rotation.

In addition, the vibration absorption portions 432 and 442 are shaped as truncated cones and radially separated from the bearing housing portions 434 and 444 via the vibration receiving portions 433 and 443, respectively. Therefore, the vibration absorption portions 432 and 442 are made more flexible and, therefore, can absorb radial vibrations more efficiently.

(23) The voids 425 are formed in the rotor 411. That is, the voids 425 have smaller specific gravity and magnetism than the rotor core material made of a laminated steel plate, so that it is possible to reduce the weight of the rotor core 416 and, hence, the weight of the brushless motor 401 as a whole.

(24) The bearing housing portions 434 and 444 are provided to a position where they axially overlap with a portion of each segment SG in the SC coil which projects beyond the stator 406 in the axial direction.

Therefore, the bearing housing portions 434 and 444 do not project in the axial direction further beyond the portion projecting beyond the stator 406 in the axial direction, so that it is possible to reduce the overall length of the brushless motor 401 in the axial direction.

(25) The distal ends of the openings on the sides corresponding to the rotor 411 of the bearing housing portions 434 and 444 are each positioned radially between a magnet MG and the rotary shaft 412. Therefore, it is possible to inhibit the magnetic flux from leaking into the rotary shaft 412.

(26) On the rear distal end surface of the rotary shaft 412, the detection magnet 452a is fixed that detects the rotations of the rotary shaft 412. Therefore, by detecting the rotation angle of the detection magnet 452a integrally rotating with the rotary shaft 412, it is possible to detect the current rotation angle and rotational speed of the rotary shaft 412. As a result, it is possible to set timing at which power is supplied to each phase of the coil.

The above eighth embodiment may be modified as follows.

Figure 54:
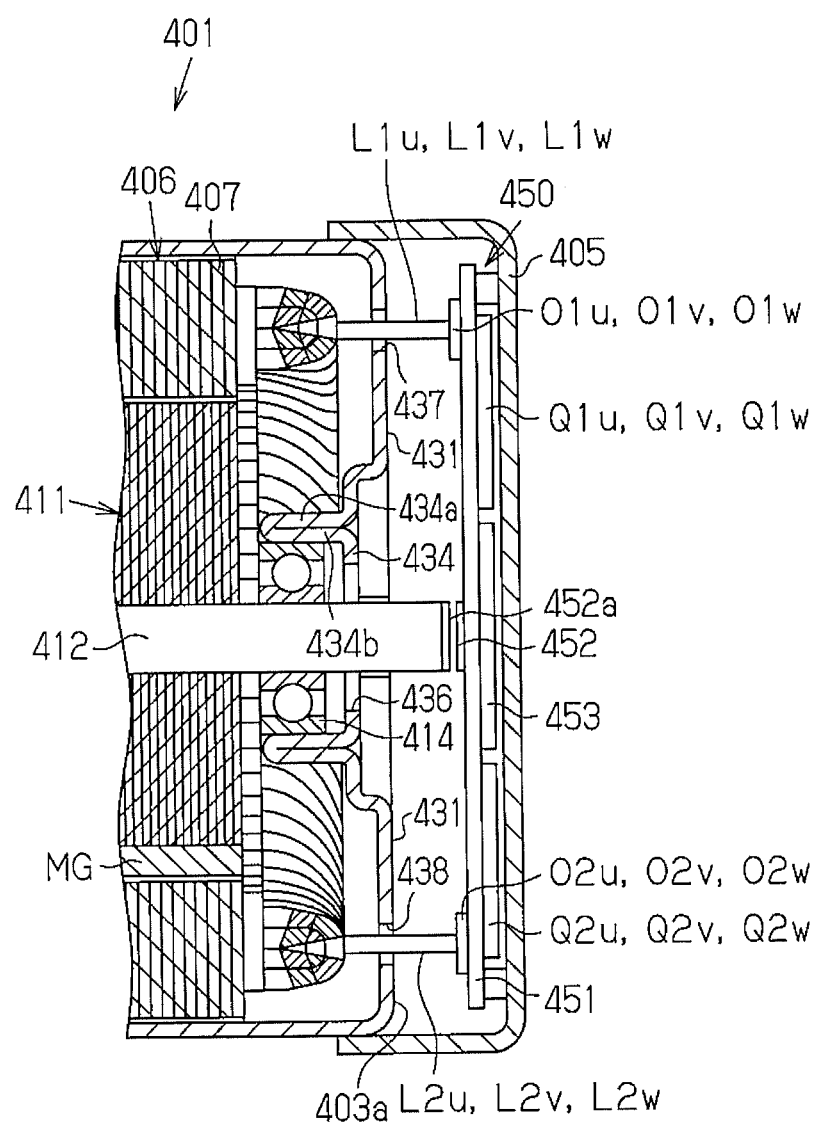
FIG. 54 is a partially cutaway view of the brushless motor according to a modification.

In the eighth embodiment, the vibration absorption portions 432 and 442 are shaped as truncated cones and radially separated from the bearing housing portions 434 and 444, respectively. Alternatively, for example, as shown in FIG. 54, the vibration absorption portion 432 and the vibration receiving portion 433 may be omitted. In more detail, in FIG. 54, the annular flat portion 431 is bent in formation from the inner inner-circumferential edge of the rear cover 403a so that an outer circumferential wall 434a of the bearing housing portion 434 may extend in formation to a position where it is near the side surface on the rear side in the axial direction of the rotor 411. Then, it is bent rearward in formation at the inner circumferential edge of the outer circumferential wall 434a so that an inner circumferential wall 434b of the bearing housing portion 434 may be formed toward the rear side in the axial direction.

To the bearing housing portion 434 having a double structure including the outer circumferential wall 434a and the inner circumferential wall 434b, the bearing 414 is housed and fixed through a rotor opening.

Even in this case, the double-structure bearing housing portion 434 can flex by using a coupling portion of the outer circumferential wall 434a and the flat portion 431 as the supporting point, to absorb vibrations from the rotary shaft 412.

Although the bearing housing portion 434 shown in FIG. 54 is of the double structure including the outer circumferential wall 434a and the inner circumferential wall 434b contacting with each other, the outer circumferential wall 434a and the inner circumferential wall 434b may be separated from each other via the vibration receiving portion 433 as in the above modification.

Although the vibration absorption portions 432 and 442 are mounted to each of the rear cover 403a and the front cover 404 in the eighth embodiment, they may be mounted only to one of them. For example, the vibration absorption portion 432 may be mounted only to the rear cover 403a or the vibration absorption portion 442 may be mounted only to the front cover 404.

Although the void 425 is formed in the rotor 411 in the eighth embodiment, the present invention may be applied to a rotor without the voids 425.

Although the stator 406 is of the SC coil having the inserted segments SG in the eighth embodiment, the present invention may be applied to a stator around which a coil made of a copper cable or the like is wound.

Figure 55:
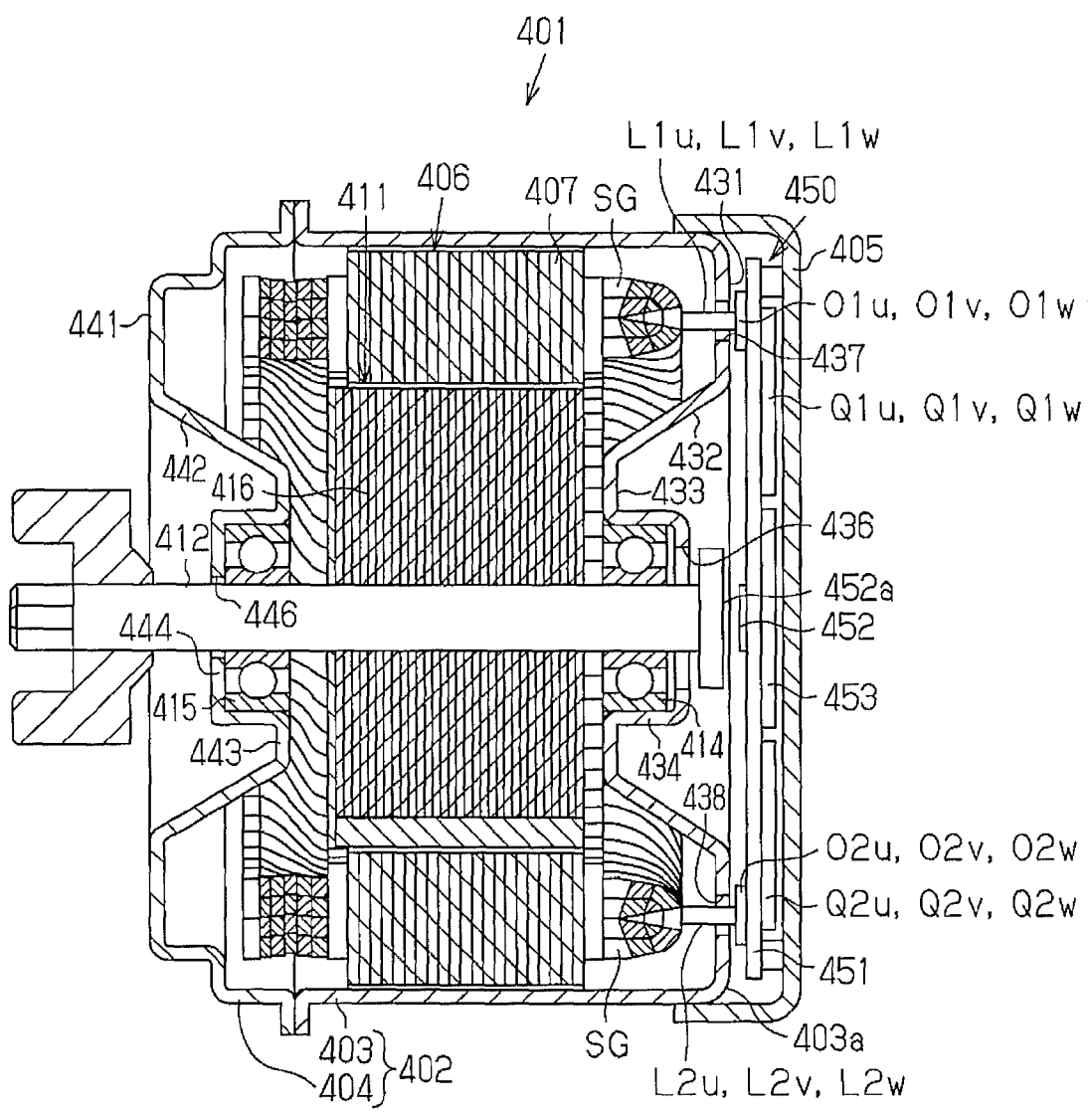
FIG. 55 is a cross-sectional view of the brushless motor according to a modification.
Figure 56:
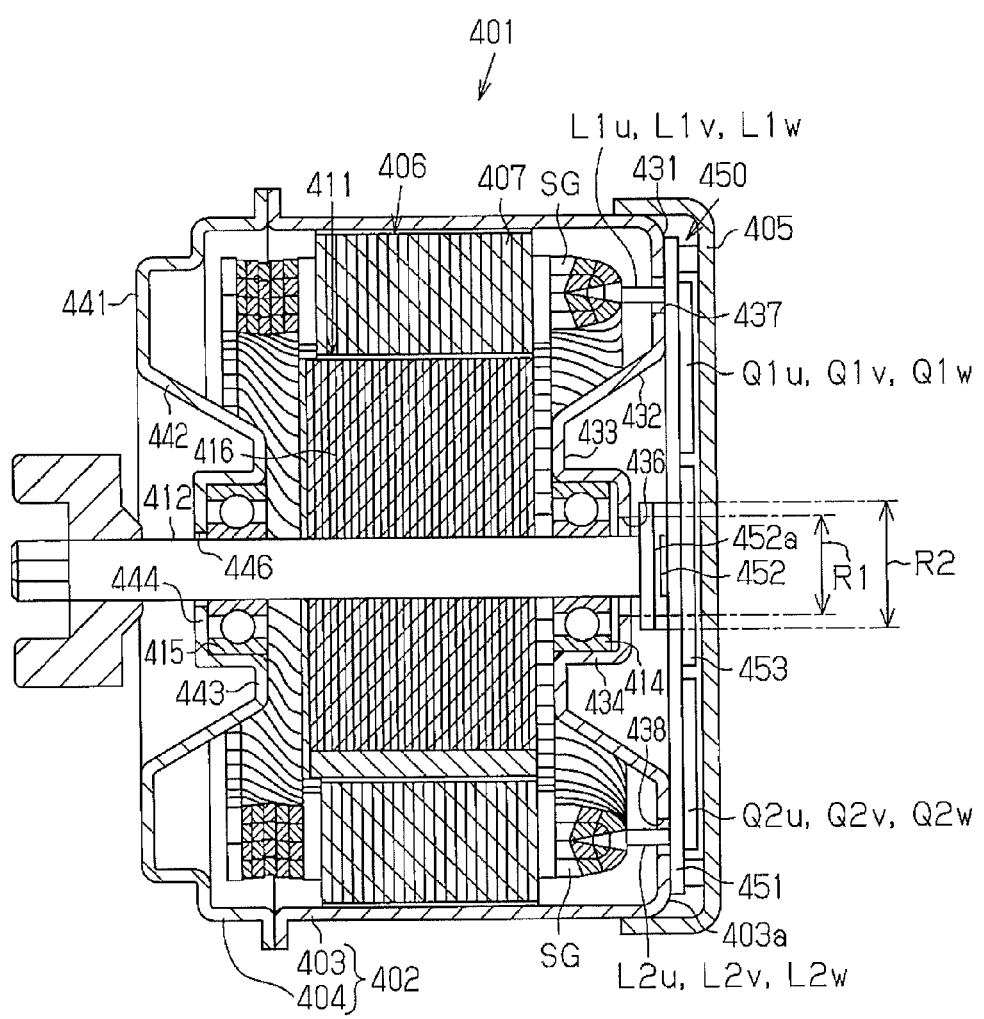
FIG. 56 is another cross-sectional view of the brushless motor according to a modification.

Although the position of the detection magnet 452a is not referred to in particular in the eighth embodiment, as shown in FIG. 55 or 56, the detection magnet 452a is preferably mounted to a position which is axially on the front side of the flat portion 431 (bottom surface of the tubular housing 403). As a result, the rear end portion of the rotary shaft 412 does not project beyond the rear end of the flat portion 431, so that the axial overall length of the motor 401 can be reduced.

Although not referred to in particular in the eighth embodiment, as shown in FIG. 56, for example, the circuit board 451, on which the rotation sensor 452 is disposed, preferably abuts against the flat portion 431 axially in configuration. This configuration enables reducing the axial overall length of the motor 401 as compared to the configuration (see FIG. 53), in which the flat portion 431 and the circuit board 451 are separated from each other. Further, even if the various circuit elements such as the rotation sensor 452 and the ECU 453 on the circuit board 451 generate heat, it can be radiated from the tubular housing 403 (motor case 402) because it abuts against the flat portion 431.

Although not referred to in particular in the eighth embodiment, as shown in FIG. 56, for example, a hole diameter R1 of the through hole 436 is preferably smaller than the diameter R2 of the detection magnet 452a. In such a configuration, the through hole 436 can be brought close to the rotary shaft 412 so that magnetic flux leaking from the magnets MG of the stator 406 to the side corresponding to the rotary shaft 412 may return to the magnets MG via the tubular housing 403 from the end face of the through hole 436, so that the site where the detection magnet 452a is fixed is inhibited from being magnetized. As a result, it is possible to inhibit the magnetic field of the detection magnet 452a from being distorted by the influence of the magnetized rotary shaft 412.

The above first through eighth embodiments may be modified as follows.

In the above first through eighth embodiments, to minimize the wiring length of the leads, the receiving terminals T1u, T1v, and T1w for each phase of the first system three-phase Y-connection coil are disposed in the order of the W1-phase, the V1-phase, and the U1-phase in one circumferential direction, while the receiving terminals T2u, T2v, and T2w for each phase of the second system three-phase Y-connection coil are disposed in the order of the U2-phase, W2-phase, and the V2-phase in one circumferential direction.

Alternatively, the receiving terminals T2u, T2v, and T2w for each phase of the second system three-phase Y-connection coil may be disposed in the order of the W2-phase, V2-phase, and the U2-phase in one circumferential direction in line with the receiving terminals T1u, T1v, and T1w for each phase of the first system three-phase Y-connection coil.

In this case, in FIG. 7, the receiving terminal T2w of the W2-phase and the neutral point terminal T0wa of the second system three-phase Y-connection coil are formed of the segments SG inserted into the slots S of slot Nos. 23 and 29. That is, over the segments SG inserted into the slots S of slot No. 23 and 29, the coupling conductor portion OSc of the wave-winding outer conductor OS and the coupling conductor portion ISc of the lap-winding inner conductor IS are separated from each other. After the above connection, the split end continuous to the third conductor portion ISo of the inner conductor IS is set as the receiving terminal T2w of the W2-phase, while the split end continuous to the first conductor portion OSi of the outer conductor OS is set as the neutral point terminal T0wa of the W2-phase.

Further, the receiving terminal T2v and the neutral point terminal T0va of the V2-phase are formed of the segments SG inserted into the slots S of slot Nos. 27 and 33. That is, over the segments SG inserted into the slots S of slot No. 27 and 33, the coupling conductor portion OSc of the wave-winding outer conductor OS and the coupling conductor portion ISc of the lap-winding inner conductor IS are separated from each other. After the above connection, the split end continuous to the third conductor portion ISo of the inner conductor IS is set as the receiving terminal T2v of the V2-phase, while the split end continuous to the first conductor portion OSi of the outer conductor OS is set as the neutral point terminal T0va of the V2-phase.

Further, the receiving terminal T2u and the neutral point terminal T0ua of the U2-phase are formed of the segments SG inserted into the slots S of slot Nos. 31 and 37. That is, over the segments SG inserted into the slots S of slot Nos. 31 and 37, the coupling conductor portion OSc of the wave-winding outer conductor OS and the coupling conductor portion ISc of the lap-winding inner conductor IS are separated from each other. After the above connection, the split end continuous to the third conductor portion ISo of the inner conductor IS is set as the receiving terminal T2u of the U2-phase, while the split end continuous to the first conductor portion OSi of the outer conductor OS is set as the neutral point terminal T0ua of the U2-phase.

In this case also, it is possible to dispose the receiving terminals T2u, T2v, and T2w of each phase outside of the neutral point terminals T0ua, T0va, and T0wa in the radial direction. At the same time, it is possible to dispose the receiving terminals T1u, T1v, and T1w for each phase of the first system three-phase Y-connection coil and the receiving terminals T2u, T2v, and T2w for each phase of the second system three-phase Y-connection coil can be disposed on the mutually opposite positions with an angular interval of 180 degrees in the circumferential direction.

Further, accordingly, it is possible to externally draw out the receiving terminals T1u, T1v, and T1w of the first system three-phase Y-connection coil and the receiving terminals T2u, T2v, and T2w of the second system three-phase Y-connection coil at the horizontally symmetrical positions in the axial direction of the brushless motor.

In this case, the output terminals O1u, O1v, and O1w for the first system three-phase coil and the output terminals O2u, O2v, and O2w for the second system three-phase coil which are formed on the circuit board horizontally symmetrically can be permitted to respectively face the receiving terminals T1u, T1v, and T1w of the first system three-phase Y-connection coil and the receiving terminals T2u, T2v, and T2w of the second system three-phase Y-connection coil over the shortest distance.

Therefore, it is possible to shorten the leads L1u, L1v, and L1w as well as L2u, L2v, and L2w interconnecting the receiving terminals T1u, T1v, and T1w as well as T2u, T2v, and T2w and the output terminals O1u, O1v, and O1w as well as O2u, O2v, and O2w, thereby saving on space and reducing resistance losses.

In addition, the leads L1u, L1v, and L1w as well as L2u, L2v, and L2w for the receiving terminals T1u, T1v, and T1w as well as T2u, T2v, and T2w for each phase to be drawn out in the axial direction can be externally drawn out toward the circuit board in the housing box in the radial direction. Therefore, it is possible to form the output terminals O1u, O1v, and O1w as well as O2u, O2v, and O2w for connection of the leads L1u, L1v, and L1w as well as L2u, L2v, and L2w at the outer circumferential portion of the circuit board of the drive device.

Accordingly, it is possible to provide a compact layout of the various types of circuit elements such as the rotation sensor, the electronic control unit (ECU), the first switching transistors Q1u, Q1v, and Q1w, and the second switching transistors Q2u, Q2v, and Q2w, which are mounted on the circuit board, thereby miniaturizing the housing box, which houses the drive device.

In the above first through eighth embodiments, the motor case is formed of the tubular housing having the bottom portion (rear cover) and the front cover. Alternatively, the motor case may have a tubular portion that has an opening both in the rear side and the front side, a front cover that blocks the front opening of the tubular portion, and a rear cover that blocks the rear opening of the tubular portion. In this case, the rear cover has first and second housing recesses as well as first and second through holes formed in it.

In the above first through eighth embodiments, the rear cover has had the first and second housing recesses formed in it and the first and second through holes formed in it at portions that are in the first and second housing recesses and face the receiving terminals, respectively. Alternatively, the rear cover does not need to have the first and second housing recesses formed in it.

Figure 20:
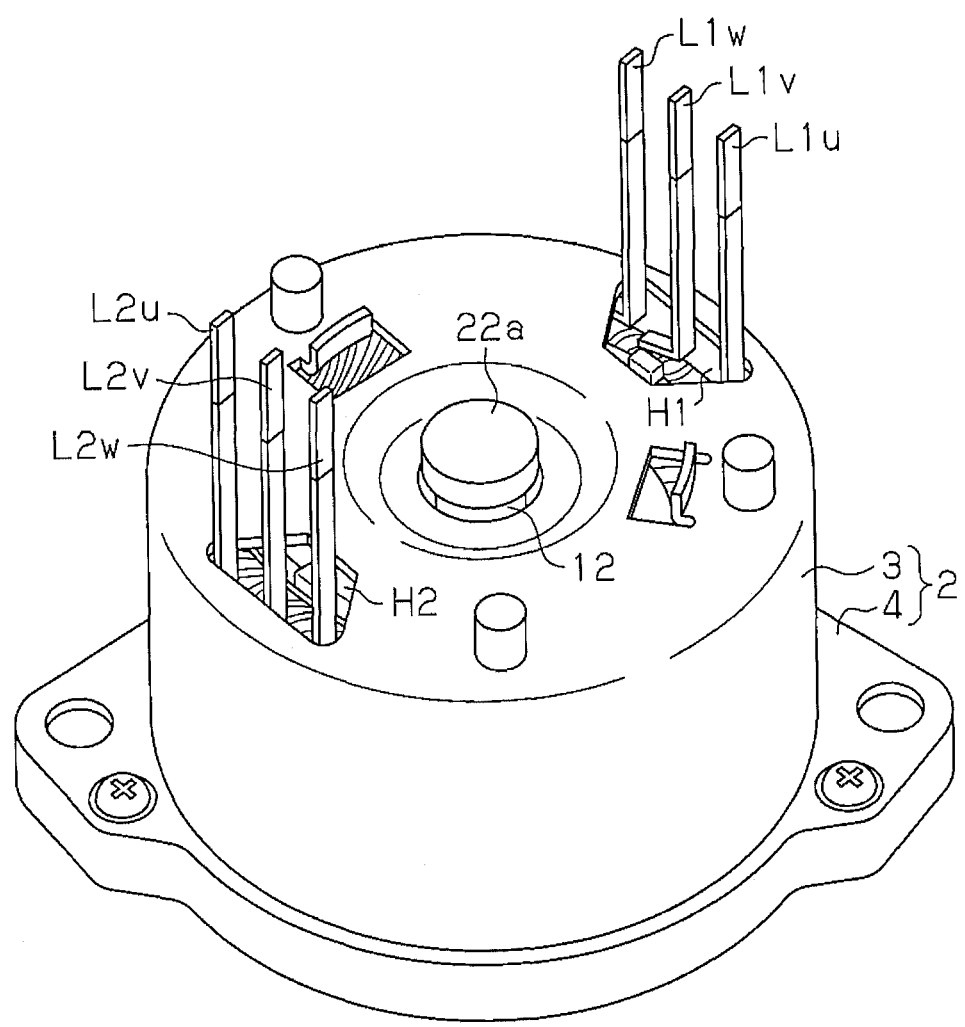
FIG. 20 is a view showing a modification of the present invention.

In this case, as shown in FIG. 20, the radial widths of the first and second through holes H1 and H2 through which the leads L1u, L1v, and L1w as well as L2u, L2v, and L2w of the first system three-phase coil and the second system three-phase coil are formed large toward the central axis so that the neutral lines L1n and L2n can be visually checked in the axial direction. In this case, the neutral lines L1n and L2n expanding toward the rear cover side can be permitted to axially escape through those first and second through holes H1 and H2, thereby miniaturizing the axial size of the motor correspondingly.

In the above first through eighth embodiments, one of the pair of split ends of the coupling conductor portion OSc of the outer conductor OS that continues to the first conductor portion OSi of the outer conductor OS is set as the neutral point terminal, while one of the pair of split ends of the coupling conductor portion ISc of the inner conductor IS that continues to the third conductor portion ISo of the inner conductor IS is set as the receiving terminal.

Alternatively, for example, the split end continuous to the first conductor portion OSi of the outer conductor OS may be set as the receiving terminal, while the split end continuous to the third conductor portion ISo of the inner conductor IS may be set as the neutral point terminal. In this case, the receiving terminal for each phase is radially disposed inside the slot S more than the neutral point terminal for each phase. Accordingly, in a case where the output terminal w for each phase which is formed on the circuit board is formed around the midsection of the circuit board because of the restrictions in terms of the wiring layout, the leads do not intersect with the neutral line disposed outside. As a result, the wiring length of the leads can be minimized.

Although the number of the slots S is set to sixty in the above first through eighth embodiments, the present invention is not limited to it; the number of the slots S may be changed appropriately, for example, to forty-five.

In the above first through eighth embodiments, the coupling conductor portion OSc of the wave-winding outer conductor OS is separated from the coupling conductor portion ISc of the lap-winding inner conductor IS to electrically interconnect the split end continuous to the fourth conductor portion OSo of the outer conductor OS and the split end continuous to the second conductor portion ISi of the inner conductor IS. In this case, the split end continuous to the first conductor portion OSi of the outer conductor OS is set as the neutral point terminal, while the split end continuous to the third conductor portion ISo of the inner conductor IS is set as the receiving terminal. Alternatively, a first one-side segment in which lead portions are formed integrally which are of the same format as the split end continuous to the third conductor portion ISo of the inner conductor IS and axially extend to continue to the third conductor portion ISo may be used to set the lead portions as the receiving terminals T1u, T1v, and T1w as well as T2u, T2v, and T2w for each phase. Further, a second one-side segment in which lead portions are formed integrally which are of the same format as the split end continuous to the first conductor portion OSi of the outer conductor OS and axially extend to continue to the first conductor portion OSi may be used to set the lead portions as the neutral point terminals T0u, T0v, and T0w as well as T0ua, T0va, and T0wa for each phase.

In this case, if the lead portions of the first one-side segment are used as the receiving terminals, the leads L1u, L1v, and L1w as well as L2u, L2v, and L2w correspond to the receiving terminals T1u, T1v, and T1w as well as T2u, T2v, and T2w, respectively.

Although, over the SC coil, the wave-winding outer conductors OS and the lap-winding inner conductors IS are coupled alternately in the circumferential direction in the first through eighth embodiments, only the wave-winding inner conductors IS may be coupled circumferentially or only the lap-winding outer conductors OS may be coupled circumferentially.

In the first through eighth embodiments, each of the receiving terminals is fitted with the lead extending parallel with the central axis and connected to the corresponding output terminal at its lead distal end. In this case, the receiving terminal may be formed integrally with the SC coil (in other words, it may function as a receiving terminal fitted with leads by directly extending the end of the SC coil directly in the axial direction) or a receiving terminal separated from the SC coil may be connected to the SC coil.

Although the five magnets MG are provided in the first through eighth embodiments, the present invention is not limited to it; the number of them may be two, three, or more. The number of the slot S of the stator may be changed appropriately.

Although the motor is of the brushless type in the first through fourth, and seventh and eighth embodiments, it may be a brush motor.

Although the consequent-pole type rotor is of a so-called surface permanent magnet motor (SPM) type in the first through eighth embodiments, the present invention may be applied to an interior permanent magnet motor (IPM) type rotor.

Although the brushless motor is an EPS-use motor for use in the electric power steering device (EPS) in the first through eighth embodiments, the present invention may be applied to any other power window motor, wiper driving motor, or the like.

The invention claimed is:

1. A motor comprising:
 a motor case having a tubular portion, a front cover mounted to a first axial end of the tubular portion, and a rear cover mounted to an opposite, second axial end of the tubular portion;
 a rotor, which is disposed in the motor case and has a rotary shaft; and
 a stator disposed in the motor case, the stator having a plurality of teeth, which extend toward a central axis of the rotary shaft and are disposed in a circumferential direction at equal intervals, slots, each of which is formed between a circumferentially adjacent pair of the teeth and extends toward the central axis, and U-shaped segments inserted into the slots in parallel with the central axis in such a manner that distal ends of the segments projecting out of the slots are interconnected electrically, thereby forming a segment conductor (SC) coil including the plurality of segments disposed in the circumferential direction,
 wherein the SC coil has receiving terminals of a control circuit adjacent to the rear cover, which have leads drawn out from the receiving terminals and extending in parallel with the central axis, and corresponding neutral point terminals,
 each of the receiving terminals and its corresponding neutral point terminals are disposed on the distal end of the corresponding segment of the plurality of segments,
 a neutral line interconnects the neutral point terminals, and the leads are disposed more inside than the receiving terminals in the radial direction of the slot, and within a width that includes the neutral line in the circumferential direction, and the leads do not intersect with the neutral line in a direction parallel with the central axis, and
 the rear cover includes a housing recess that faces the neutral line, and the rear cover defines a through hole in the housing recess, the leads being adapted to pass through the through hole to be connected to receiving terminals of the control circuit adjacent to the rear cover.

2. The motor according to claim 1, wherein the leads are drawn out from an opposite side to joints between the distal ends of the segments in direction of the central axis.

3. The motor according to claim 1,
 wherein the SC coil is one of the SC coils for a plurality of phases,
 the segments include a plurality of conductor portions stacked in a radial stack position in the slot, and
 the receiving terminals of the SC coils for the plurality of phases are drawn out from conductor portions that are at the radial stack position and toward the central axis.

4. The motor according to claim 3,
 wherein the SC coil is one of a plurality of SC coils, the SC coils form a first three-phase Y-connection coil and a second three-phase Y-connection coil,
 each of the segments includes first, second, third, and fourth conductor portions, the first and fourth conductor portions being coupled to each other at their respective proximal ends to thereby form a wave-winding outer conductor, the second and third conductor portions being coupled to each other at their respective proximal end portions to thereby form a lap-winding inner conductor contained in the outer conductor, the first and second conductor portions being a first group of conductor portions, the third and fourth conductor portions being a second group of conductor portions, the first and second groups being inserted into adjacent slots of a common phase, and the first through fourth conductor portions being inserted into the slots in the order of the first, second, third, and fourth conductor portions from inside to outside radially,
 each of the SC coils is formed by interconnecting a distal end of the first conductor portion inserted into the first slot of an adjacent pair of the adjacent slots, and the distal end of the second conductor portion inserted into the second slot of the same pair of slots and interconnecting the distal end of the third conductor portion inserted into the first slot and the distal end of the fourth conductor portion inserted into the second slot, the two SC coils for each of the phases being shifted from each other by a slot pitch, and
 the three-phase SC coils of each of the three-phase Y-connection coil each have a receiving terminal and a neutral point terminal, the three-phase receiving terminals being drawn out from the conductor portions at the radial stack position in the direction of the central axis.

5. The motor according to claim 4, wherein, in one of the plurality of segments of each of the SC coil, proximal end portions of the first and fourth conductor portions of the wave-winding outer conductor form a pair of outer split ends, and end portions of the second and third conductor portions of the lap-winding inner conductor form a pair of inner split ends, such that the outer split end of the fourth conductor portion and the inner split end of the second conductor portion are interconnected electrically, the inner split end of the third conductor portion forms the receiving terminal for each phase, and the outer split end of the first conductor portion forms the neutral point terminal for each phase.

6. The motor according to claim 5, wherein the leads integrally extend from the receiving terminal.

7. The motor according to claim 5, wherein the three receiving terminals on each of the three-phase Y-connection coils are provided adjacent to each other in the circumferential direction, and a group of the receiving terminals on the first three-phase Y-connection coil and a group of the receiving terminals on the second three-phase Y-connection coil are disposed at positions that are on the mutually opposite sides with an angular interval of 180 degrees in the circumferential direction.

8. The motor according to claim 7, wherein the receiving terminals on the first three-phase Y-connection coil are disposed in the order of a W-phase, a V-phase, and a U-phase in one circumferential direction, and the receiving terminals on the second three-phase Y-connection coil are disposed in the order of the U-phase, the W-phase, and the V-phase in one circumferential direction.

9. The motor according to claim 7, wherein the receiving terminals on the first three-phase Y-connection coil are disposed in the order of a W-phase, a V-phase, and a U-phase in one circumferential direction, and the receiving terminals on the second three-phase Y-connection coil are disposed in the order of the W-phase, the V-phase, and the U-phase in one circumferential direction.

10. The motor according to claim 4, wherein a housing box is provided on the side where the receiving terminals are drawn out in the central axial direction, the housing box containing a drive device, which controls the motor by detecting rotational speed of the motor, and the drive device including a circuit board mounted with circuit elements, and the receiving terminals being connected to the circuit board.

11. The motor according to claim 1, wherein
the rotor has magnetic poles, the number of which is 2×p (where p is the number of magnetic pole pairs), and a rotor core, a plurality of magnets disposed in equal intervals in the circumferential direction of the rotor core, and core magnetic pole portions, each of which is formed integrally with the rotor core and disposed between an adjacent pair of the magnets via a void from those magnets,
the number of the teeth is represented by 2×p ×m ×n, (where m is the number of the phases of the SC coil, and n is a positive integer); and an opening angle of the magnets is different from that of the core magnetic pole portions.

12. The motor according to claim 11, wherein the opening angle of each magnet and that of each core magnetic pole portion are set such that a circumferential positional relationship between circumferential two ends of each magnet with respect to the teeth is different from the circumferential positional relationship between the circumferential two ends of each core magnetic pole portion with respect to the teeth.

13. The motor according to claim 11, wherein the opening angle of the magnets and that of the core magnetic pole portions are set such that a circumferential positional relationship between circumferential two ends of each magnet with respect to a gap between each circumferentially adjacent pair of the teeth is different from the circumferential positional relationship between the circumferential two ends of each core magnetic pole portion with respect to the gap between each circumferentially adjacent pair of the teeth.

14. The motor according to claim 1,
wherein the rotor is a consequent rotor having magnetic poles, the number of which is 2×p (where p is the number of magnetic pole pairs), and has first and second magnetic poles alternately disposed on it in the circumferential direction,
the number of the teeth is 2×p ×m ×n, (where m is the number of the phases of the SC coil and n is a positive integer), and
the rotor includes a rotor core and a small-magnetism and light-weight portion, which is formed in the rotor core and has smaller specific gravity and smaller magnetism than the rotor core.

15. The motor according to claim 14, wherein the rotor core includes:
a shaft-fixed tube portion, which is fixed to the rotary shaft;
a magnet-fixed tube portion, which is disposed around the shaft-fixed tube portion and separated from the shaft-fixed tube portion by a predetermined distance in such a manner that the first and second magnetic poles are alternately disposed at equal pitches in the circumferential direction on a position close to the stator of the magnet-fixed tube portion; and
bridging portions, which are circumferentially disposed with equal pitches between the shaft-fixed tube portion and the magnet-fixed tube portion and couple the shaft-fixed tube portion and the magnet-fixed tube portion to each other, and wherein the small-magnetism and light-weight portion is a void formed between each adjacent pair of the bridging portions.

16. The motor according to claim 1, wherein,
the rotor has magnetic poles, the number of which is P, and has different magnetic poles alternately disposed in the circumferential direction,
the SC coil is one of the plurality of SC coils, the SC coils forming first and second coils the number of phases of which is m, and the number of the slots being s,
the two SC coils for each phase are shifted from each other by a pitch corresponding to a phase difference angle, in electric angle, of (360×P)/(s×2) between each adjacent pair of the slots, in each of the phases, the two SC coils being supplied with signals having a phase shift of this phase difference angle, and
the stator is configured such that a magnetic skew between the stator and the rotor is twice the phase difference angle between the slots as an electric angle.

17. The motor according to claim 16, wherein the number m is three and the phase difference angle is 30 degrees.

18. The motor according to claim 1, wherein
the rotor has different magnetic poles alternately disposed in the circumferential direction of the rotor, the SC coil is one of a plurality of SC coils, and the SC coils form first and second three-phase Y-connection coils,
the two SC coils for each of the phases are shifted from each other by an electric angle of 30 degrees, and the stator is configured such that a magnetic skew between the stator and the rotor is 60 degrees in electric angle.

19. The motor according to claim 1, wherein
the rotor is a consequent rotor having magnetic poles, the number of which is 2×p (where p is the number of magnetic pole pairs), and has different magnetic poles alternately disposed in the circumferential direction,
the number of the teeth is 2×p ×m ×n, (where m is the number of the phases of the SC coil and n is a positive integer), and
at least one of the rear cover and the front cover includes:
a flat portion, which extends radially inward from an outer circumferential edge of the one of the covers to a radial position that is inside of a radial inner circumferential end of the stator; and
a bearing housing portion having an opening that is at a radial midsection of the one of the covers and closer to the rotor than the flat portion in the central axial direction, wherein the bearing housing houses a bearing that rotationally supports the rotary shaft through the opening.

20. The motor according to claim 19, wherein a distal end of the opening in the bearing housing portion is positioned between the magnetic pole and the rotary shaft in the radial direction.

21. The motor according to claim 19, wherein a rear-side tip surface of the rotary shaft is fitted with a detection magnet for detecting rotation of the rotary shaft.

22. The motor according to claim 1, wherein
the rotor has magnetic poles, number of which is 2×p (where p is the number of magnetic pole pairs), and has a rotor core, a plurality of magnets at equal intervals in the circumferential direction of the rotor core, and core magnetic pole portions, which are integrally formed with the rotor core and disposed between each adjacent pair of the magnets via a void separate from those magnets, and
the rotor core is formed by stacking a plurality of rotor core pieces.

23. The motor according to claim 22, wherein the stator includes a stator core formed by stacking a plurality of stator core pieces.

24. A motor comprising:
a motor case having a tubular portion, a front cover mounted to an axial end of the tubular portion, and a rear cover mounted to the other axial end of the tubular portion;
a rotor, which is disposed in the motor case and has a rotary shaft; and
a stator disposed in the motor case, the stator having a plurality of teeth which extend toward a central axis of the rotary shaft and are disposed in a circumferential direction at equal intervals, slots, each of which are formed between a circumferentially adjacent pair of the teeth and extends toward the central axis, and U-shaped segments inserted into the slots in parallel with the central axis in such a manner that distal ends of the segments projecting out of the slots are interconnected by the respective weld portions, thereby forming an SC coil including the plurality of segments disposed in the circumferential direction, wherein
the SC coil has receiving terminals of a control circuit adjacent to the rear cover, which have leads drawn out from the receiving terminals and extending parallel with the central axis, and corresponding neutral point terminals,
each of the receiving terminals and its corresponding neutral point terminal are disposed on the distal end of the corresponding segment of the plurality of segments,
a neutral line interconnects the neutral point terminals, and the leads are disposed more inside than the receiving terminals in the radial direction of the slot, and within a width that includes the neutral line in the circumferential direction, and the leads do not intersect with the neutral line in a direction parallel with the central axis,
the weld portions face the front cover, and the receiving terminals face the rear cover, and
the rear cover defines a housing recess that faces the neutral line, and the rear cover defines a through hole in the housing recess, the leads being adapted to pass through the through hole to be connected to the receiving terminals of the control circuit adjacent to the rear cover.

25. A motor comprising:
a motor case having a tubular portion, a front cover mounted to a first axial end of the tubular portion, and a rear cover mounted to an opposite, second axial end of the tubular portion;
a rotor, which is disposed in the motor case and has a rotary shaft; and
a stator disposed in the motor case, the stator having a plurality of teeth, which extend toward a central axis of the rotary shaft and are disposed in a circumferential direction at equal intervals, slots, each of which is formed between a circumferentially adjacent pair of the teeth and extends toward the central axis, and U-shaped segments inserted into the slots in parallel with the central axis in such a manner that distal ends of the segments projecting out of the slots are interconnected electrically, thereby forming a segment conductor(SC) coil including the plurality of segments disposed in the circumferential direction,
wherein:
the SC coil has receiving terminals of a control circuit adjacent to the rear cover, which have leads drawn out from the receiving terminals and extending in parallel with the central axis, and corresponding neutral point terminals,
each of the receiving terminals and its corresponding neutral point terminal are disposed on the distal end of the corresponding segment of the plurality of segments,
a neutral line interconnects the neutral point terminals, and the leads are disposed more inside than the receiving terminals in the radial direction of the slot, and within a width that includes the neutral line in the circumferential direction, and the leads do not intersect with the neutral line in a direction parallel with the central axis, and
the rear cover defines a housing recess that faces the neutral line, and the rear cover defines a through hole in the housing recess, the leads being adapted to pass through the through hole to be connected to the receiving terminals of the control circuit adjacent to the rear cover, and
the rotor has magnetic poles, the number of which is 2×p (where p is the number of magnetic pole pairs), and a rotor core, a plurality of magnets disposed in equal intervals in the circumferential direction of the rotor core, and core magnetic pole portions, each of which is formed integrally with the rotor core and disposed between an adjacent pair of the magnets via a void from those magnets,
the number of the teeth is represented by 2×p ×m ×n, (where m is the number of the phases of the SC coil, and n is a positive integer), an opening angle of the magnets is different from that of the core magnetic pole portions, the opening angle of each magnet and that of each core magnetic pole portion are set such that a circumferential positional relationship between circumferential two ends of each magnet with respect to the teeth is different from the circumferential positional relationship between the circumferential two ends of each core magnetic pole portion with respect to the teeth, the opening angle of the magnets and that of the core magnetic pole portions are set such that a circumferential positional relationship between circumferential two ends of each magnet with respect to a gap between each circumferentially adjacent pair of the teeth is different from the circumferential positional relationship between the circumferential two ends of each core magnetic pole portion with respect to the gap between each circumferentially adjacent pair of the teeth, and each of the plurality of magnets and each of the core magnetic pole portions faces two or more of the plurality of teeth.

26. A motor comprising:

a motor case having a tubular portion, a front cover mounted to a first axial end of the tubular portion, and a rear cover mounted to an opposite, second axial end of the tubular portion;

a rotor, which is disposed in the motor case and has a rotary shaft; and a stator disposed in the motor case, the stator having a plurality of teeth, which extend toward a central axis of the rotary shaft and are disposed in a circumferential direction at equal intervals, slots, each of which is formed between a circumferentially adjacent pair of the teeth and extends toward the central axis, and U-shaped segments inserted into the slots in parallel with the central axis in such a manner that distal ends of the segments projecting out of the slots are interconnected electrically, thereby forming a segment conductor (SC) coil including the plurality of segments disposed in the circumferential direction, wherein:

the SC coil has receiving terminals of a control circuit adjacent to the rear cover, which have leads drawn out from the receiving terminals and extending in parallel with the central axis, and corresponding neutral point terminals, each of the receiving terminals and its corresponding neutral point terminal are disposed on the distal end of the corresponding segment of the plurality of segments, a neutral line interconnects the neutral point terminals, and the leads are disposed more inside than the receiving terminals in the radial direction of the slot, and within a width that includes the neutral line in the circumferential direction, and the leads do not intersect with the neutral line in a direction parallel with the central axis, and the rear cover defines a housing recess that faces the neutral line, and the rear cover defines a through hole in the housing recess, the leads being adapted to pass through the through hole to be connected to the receiving terminals of the control circuit adjacent to the rear cover, and the rotor is a consequent rotor having magnetic poles, the number of which is 2×p (where p is the number of magnetic pole pairs), and has first and second magnetic poles alternately disposed on it in the circumferential direction, the number of the teeth is 2×p ×m ×n, (where m is the number of the phases of the SC coil and n is a positive integer), the rotor includes a rotor core and a small-magnetism and light-weight portion, which is formed in the rotor core and has smaller specific gravity and smaller magnetism than the rotor core, the rotor core includes:

a shaft-fixed tube portion, which is fixed to the rotary shaft, a magnet-fixed tube portion, which is disposed around the shaft-fixed tube portion and separated from the shaft-fixed tube portion by a predetermined distance in such a manner that the first and second magnetic poles are alternately disposed at equal pitches in the circumferential direction on a position close to the stator of the magnet fixed tube portion, and bridging portions, which are circumferentially disposed with equal pitches between the shaft-fixed tube portion and the magnet-fixed tube portion and couple the shaft-fixed tube portion and the magnet-fixed tube portion to each other, the small-magnetism and light-weight portion is a void formed between each adjacent pair of the bridging portions, and the rotor core has a plurality of magnets disposed in equal intervals in the circumferential direction of the rotor core, and each of the bridging portions is formed on a central position of a circumferential width of the corresponding magnet.

* * * * *

UNITED STATES PATENT AND TRADEMARK OFFICE
CERTIFICATE OF CORRECTION

PATENT NO. : 8,916,999 B2
APPLICATION NO. : 13/335000
DATED : December 23, 2014
INVENTOR(S) : Hiroshi Imai et al.

Page 1 of 1

It is certified that error appears in the above-identified patent and that said Letters Patent is hereby corrected as shown below:

On the Title Page, Item (30), (Foreign Application Priority Data), Delete "Jan. 1," and insert -- Jan. 4, --, therefor.

In the Claims

Col. 43, Line 58, Claim 11, delete "$2 \times p \times m \times n$," and insert -- $2 \times p \times m \times n$, --, therefor.

Col. 44, Line 19, Claim 14, delete "$2 \times p \times m \times n$," and insert -- $2 \times p \times m \times n$ --, therefor.

Col. 45, Line 8, Claim 19, delete "$2 \times p \times m \times n$," and insert -- $2 \times p \times m \times n$ --, therefor.

Col. 46, Line 34, Claim 25, delete "conductor(SC)" and insert -- conductor (SC) --, therefor.

Col. 46, Line 65, Claim 25, delete "$2 \times p \times m \times n$," and insert -- $2 \times p \times m \times n$, --, therefor.

Col. 48, Line 18, Claim 26, delete "$2 \times p \times m \times n$," and insert -- $2 \times p \times m \times n$ --, therefor.

Signed and Sealed this
Seventh Day of April, 2015

Michelle K. Lee
*Director of the United States Patent and Trademark Office*